United States Patent [19]

Babecki et al.

[11] Patent Number: 4,500,960
[45] Date of Patent: Feb. 19, 1985

[54] GEOGRAPHICALLY DISTRIBUTED MULTIPROCESSOR TIME-SHARED COMMUNICATION PROCESSING SYSTEM

[75] Inventors: Glenn R. Babecki, Lawrenceville; Carlos Escolar, East Windsor; Craig M. Garnant, Middletown; Hsin-Kuo Kan, Holmdel; Frank Kaplan, Warren; Hueichi R. Liu, Marlboro; George F. MacLachlan, Tinton Falls; Peter J. Matteo, Eatontown; John F. McDonald, Watchung; John D. Palframan, Aberdeen; Roger T. Tran, Marlboro; Martin J. Welt, Middletown, all of N.J.; Timothy A. Wendt, New York, N.Y.; Gregory S. Yates, Aberdeen; Paul M. Zislis, Holmdel, both of N.J.

[73] Assignee: AT&T Bell Laboratories, Murray Hill, N.J.

[21] Appl. No.: 393,138

[22] Filed: Jun. 28, 1982

[51] Int. Cl.³ .............................................. G06F 15/16
[52] U.S. Cl. ...................................................... 364/200
[58] Field of Search ................................ 364/200, 900

[56] References Cited

U.S. PATENT DOCUMENTS

| 3,732,543 | 5/1973 | Rocher et al. | 370/88 |
| 3,749,845 | 7/1973 | Fraser | 370/80 |
| 3,890,471 | 6/1975 | Hachenberg | 370/88 |
| 4,007,450 | 2/1977 | Haibt | 364/200 |
| 4,031,512 | 6/1977 | Faber | 364/200 X |
| 4,271,507 | 6/1981 | Gable et al. | 370/79 X |

OTHER PUBLICATIONS

Green, "An Introduction to Network Architectures and Protocols", *IBM System Journal*, vol. 18, No. 2, 1979, pp. 202-221.
Rochkind, "Service Concepts Underlying ACS", *ICC '79 Conference Record*, vol. 3, 1979, pp. 38.1.1-38.1.6.
Fotts, ed., "Standard ECMA-72 Transport Protocol", *Data Communications Standards*, Ed. II, Part 3, 1982, pp. 850-897.

Primary Examiner—Thomas M. Heckler
Assistant Examiner—Ronni S. Malamud
Attorney, Agent, or Firm—Roy C. Lipton

[57] ABSTRACT

A geographically distributed multiprocessor system is implemented by locating groups of processors at nodes which are interconnected by way of a transport network and which are connected by way of local lines to customer terminals and hosts. Each processor supports a plurality of processes which communicate with other processes in the same processor by way of internal links and with other processes in other processors by way of combinations of internal links and external communication links. Interface processes exchange data between the internal and external links. A process can initiate a call to any other process and define the communication parameters for exchanging data information by selecting the appropriate internal link and supplying the code defining the communication parameters to the selected internal link. The interface process relays the communication parameter code to the external link when the terminating end process is in the remote processor and processes the code when the terminating end process is the interface process.

6 Claims, 78 Drawing Figures

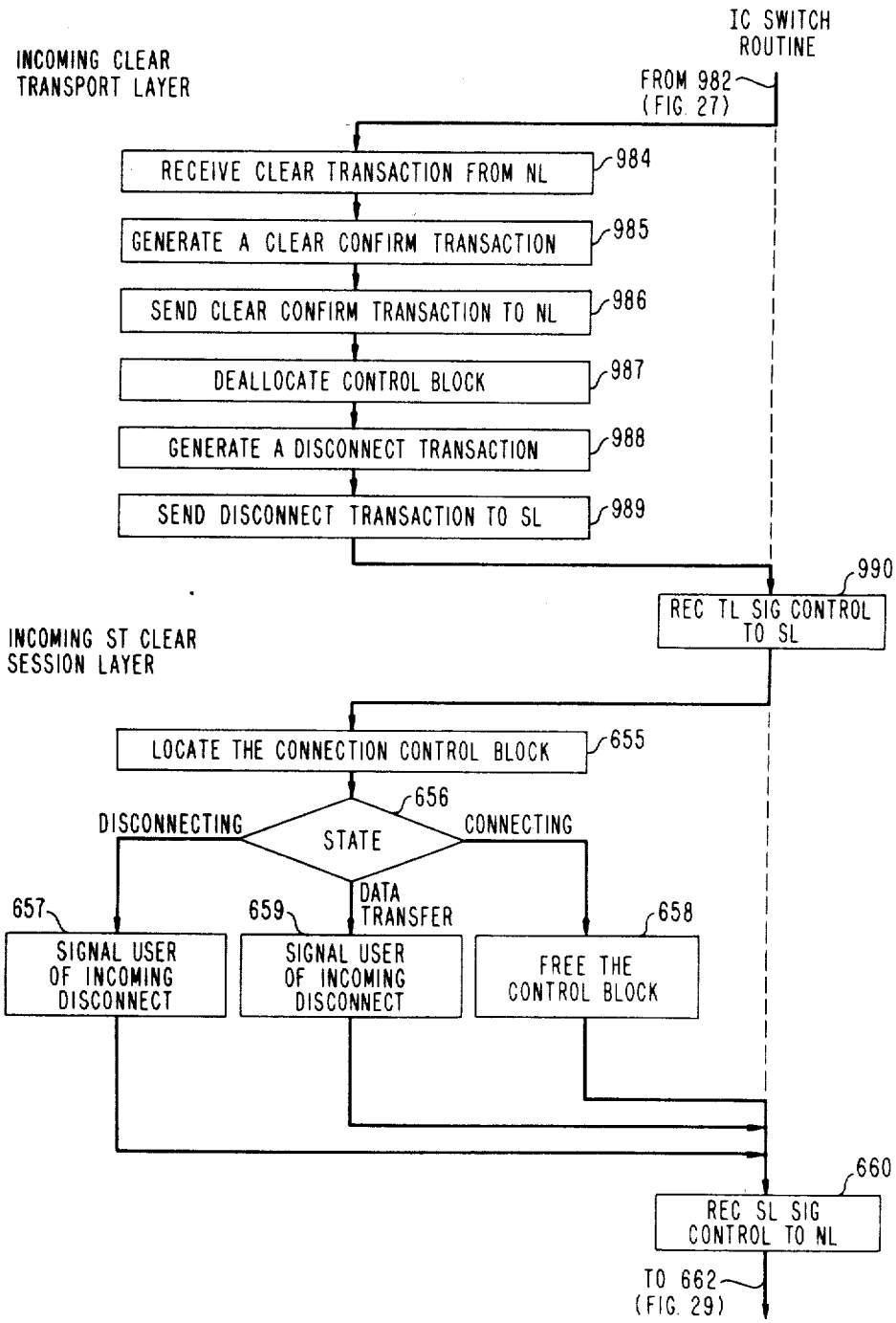

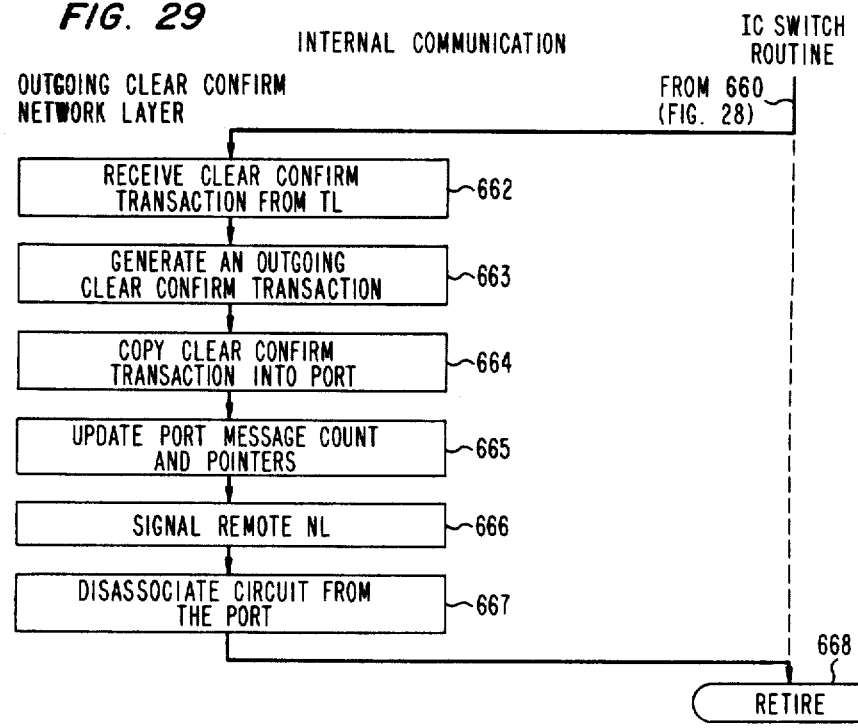
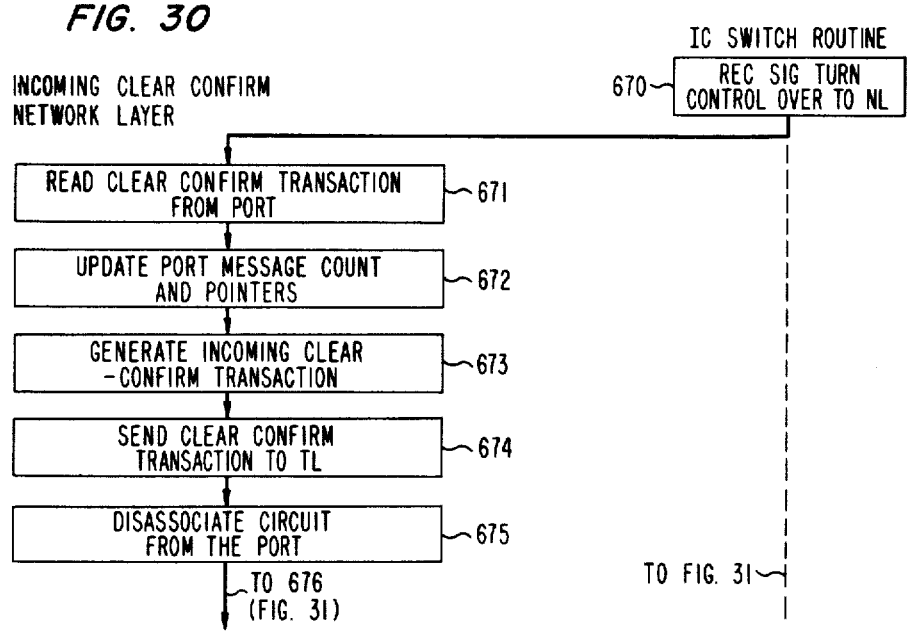

INTERNAL COMMUNICATION

FIG. 40 TRANSPORT NETWORK INTERFACE PROCESS

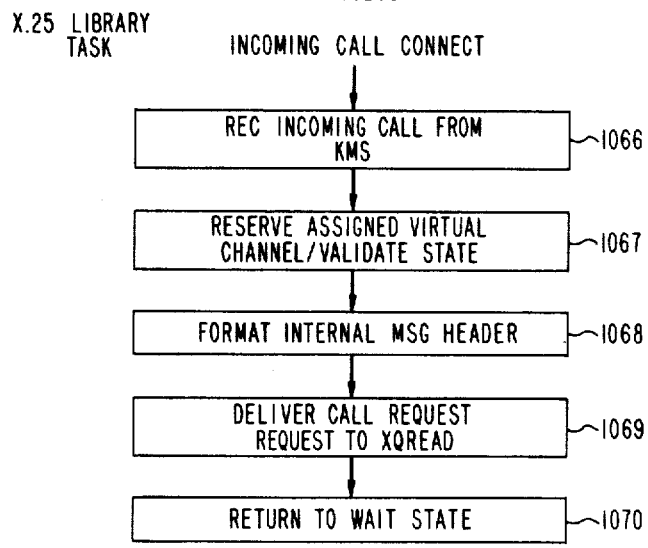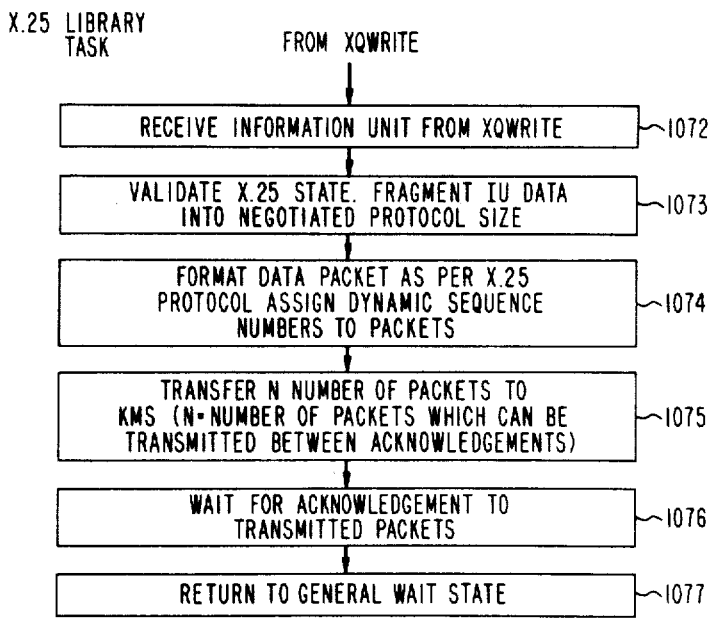

TRANSPORT NETWORK INTERFACE PROCESS
X.25 LIBRARY TASK

X.25 LIBRARY TASK

STATION CALL FACILITY TASK

DATABASE SERVICE

FIG. 59    MESSAGE APPLICATION PROCESS

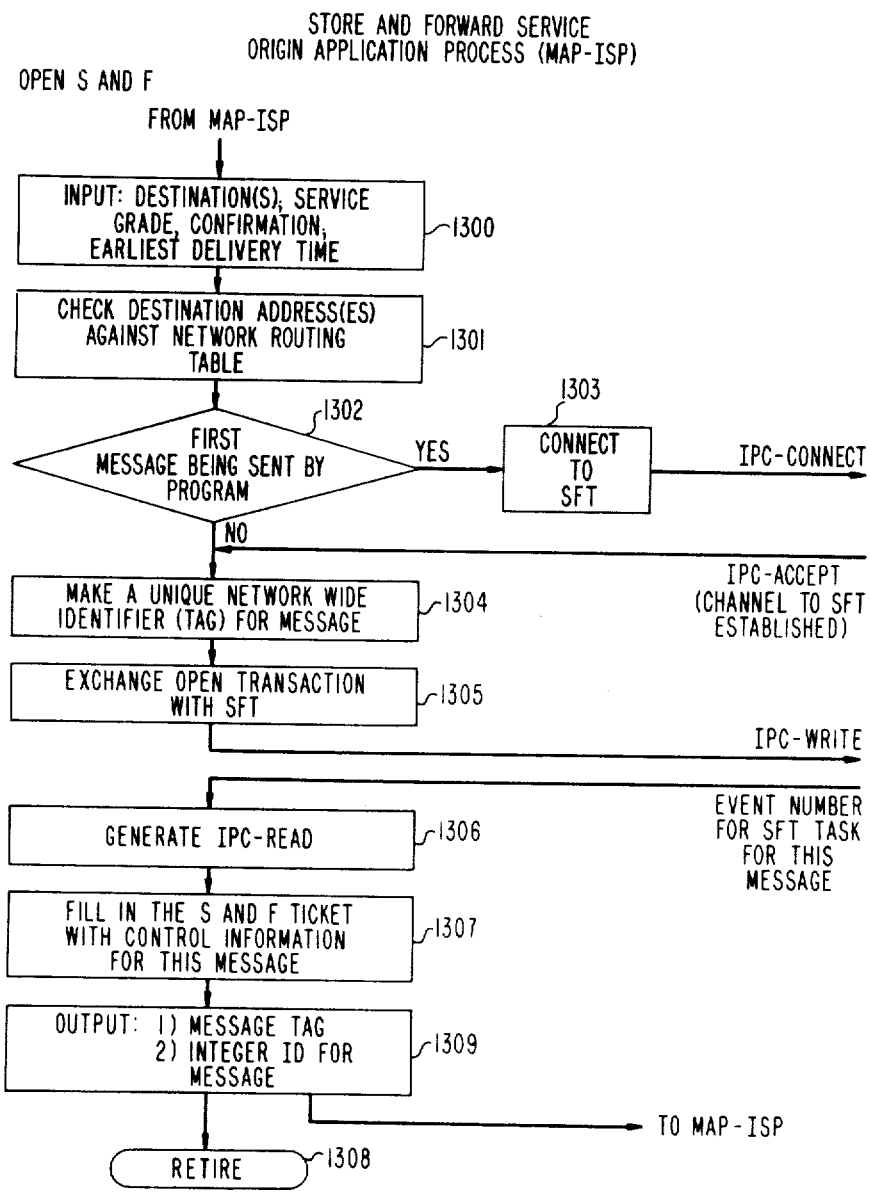

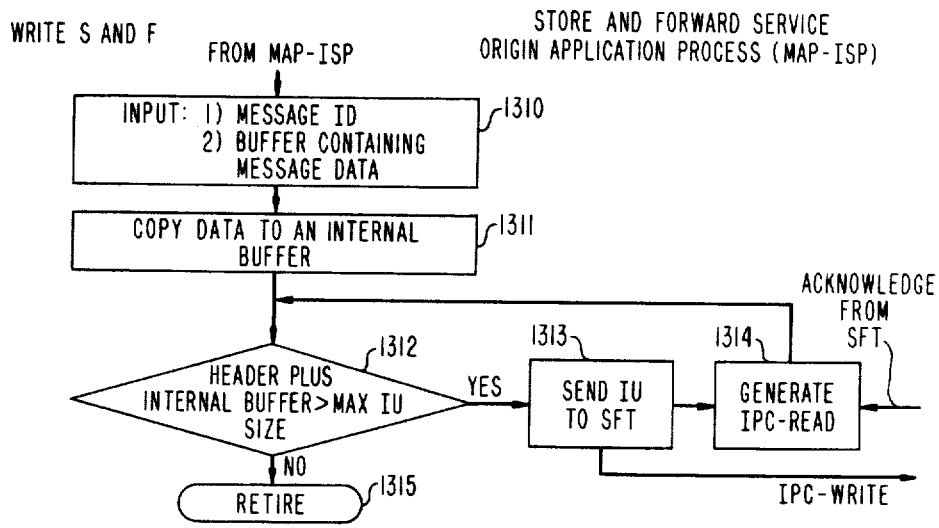
FIG. 63 — WRITE S AND F — STORE AND FORWARD SERVICE ORIGIN APPLICATION PROCESS (MAP-ISP)
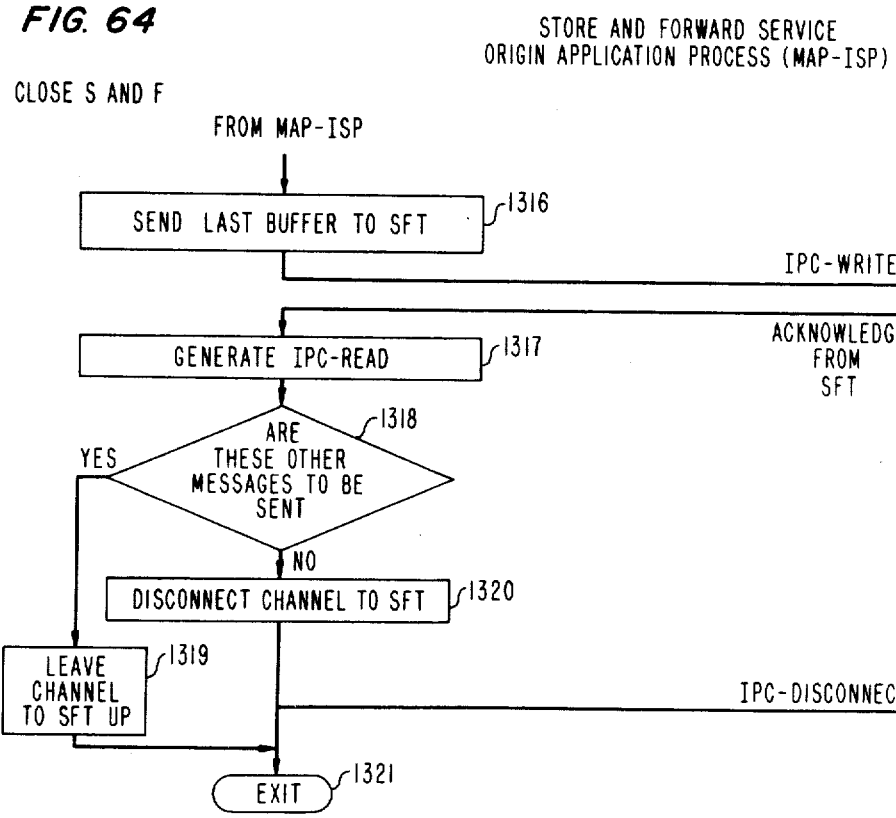
FIG. 64 — CLOSE S AND F — STORE AND FORWARD SERVICE ORIGIN APPLICATION PROCESS (MAP-ISP)

STORE AND FORWARD TRANSFER

MESSAGE CREATION TASK

STORE AND FORWARD TRANSFER

DELIVERY INTERFACE TASK

STORE AND FORWARD DELIVERY

STORE AND FORWARD DELIVERY

FIG. 76
STORE AND FORWARD SERVICE
DESTINATION APPLICATION PROCESS
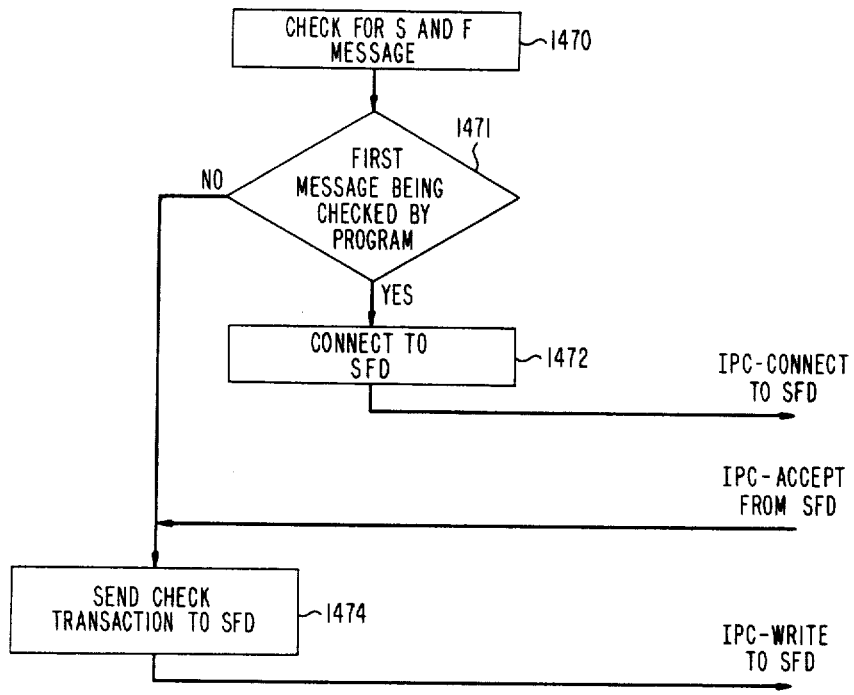
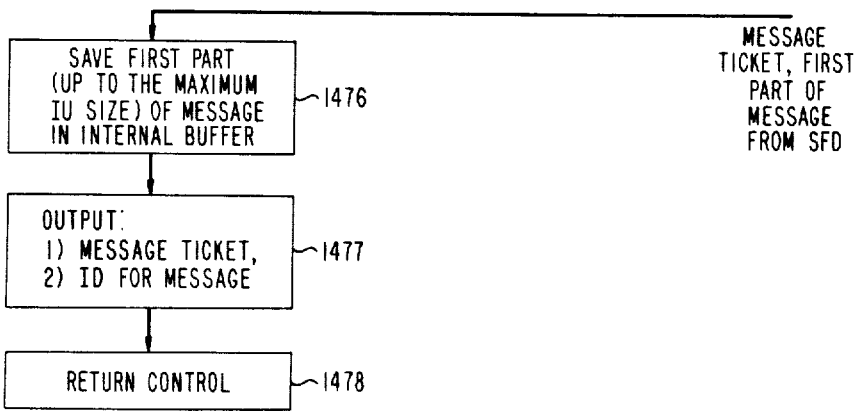

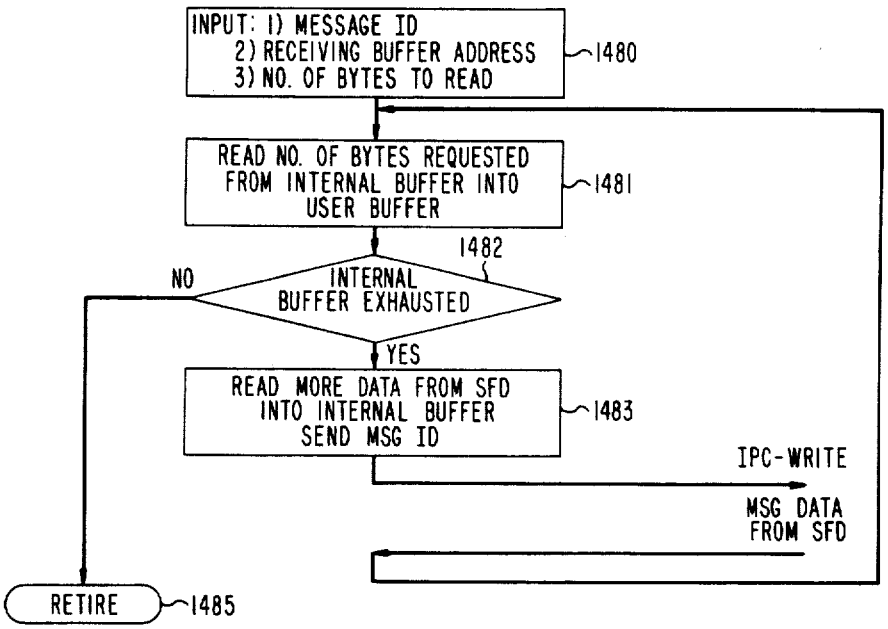
FIG. 77 S AND F READ
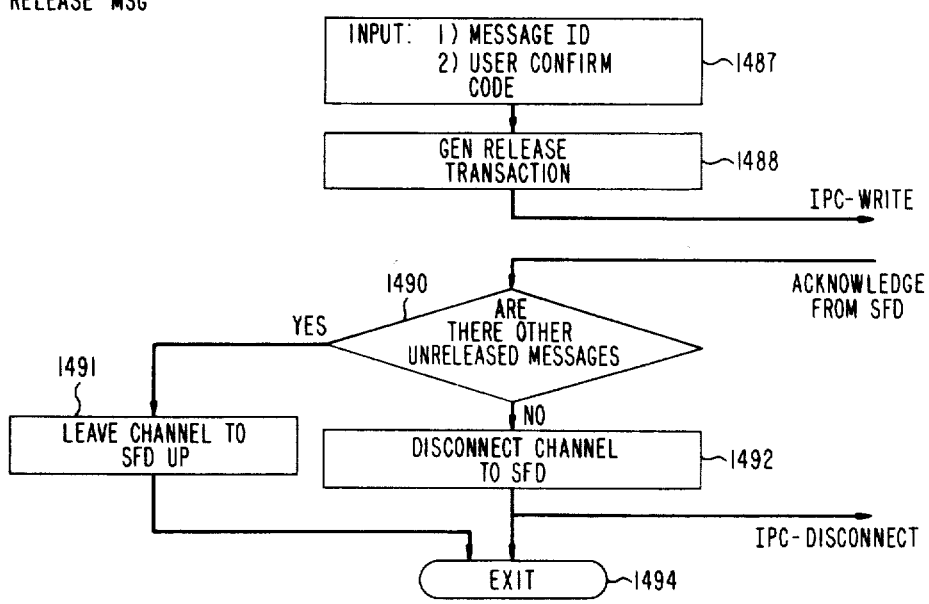
FIG. 78 RELEASE MSG

GEOGRAPHICALLY DISTRIBUTED MULTIPROCESSOR TIME-SHARED COMMUNICATION PROCESSING SYSTEM

TECHNICAL FIELD

This invention relates to integrated data processing and communications services and, more particularly, to a geographically distributed multiprocessor system for providing data processing and communications service.

BACKGROUND OF THE INVENTION

Recent rapid advances in the development of data processors and software implementations are making more and more data processing services available to users. Basic services, such as the processing and manipulation of data in response to instructions and commands and the managing of data including storing such data in records and files, modifying the stored data and reading the stored data are now within economic reach of both small and large users. Typically, the processing is provided by one or more digital computers cooperating with externally connected user devices, such as data terminals, which may provide the data to be manipulated, managed or transferred or the commands and instructions for the data.

Some "users" of data processing services may find it preferable to process data in their own, on-premises, host computer. A single such "user" may have widely geographically separate "subsidiary" locations (such as "outlets" for a manufacturer) and thus have need for processing services at these various locations. One solution is to send all raw data through the common carrier network to the "user" host and return processed data, as needed, to terminals at the "outlet locations". Another solution is to provide distributed processing services at or near the various terminal locations to reduce the carrier network communications between each terminal and the host computer. More specifically, in accordance with the latter solution, it is advantageous to provide local services such as editing of "text", interpretation of commands, creation of forms, accumulation and manipulation of numerical and text data and the like, at locations adjacent or near to the several terminals. The carrier network communication between the host and the terminals is then limited to data after such accumulation, manipulation and editing at the various locations. It has been suggested that the provision of such distributed processing services can be appropriately handled by a service vendor for a plurality user "customers", reducing the cost for each "customer" by time-sharing the usage of processing equipment among such plurality of "customers".

Since each customer has unique and differing processing needs, individualized programs, specially tailored for these needs, must be available for the several customers. It is therefore clear that each distributed processing location (or node) for the above-described service necessarily must accommodate a large number of programs (for a plurality of customers) and each node might preferably comprise a plurality of processors or CPUs, each processor supporting a plurality of programs. As is well known in the art, only one program can actually be "executing" at any given time in a computer. However, if the program currently running should terminate, time-out, or go into a "wait" state pending the occurrence of some "event", such as the completion of any input/output operation, another program is immediately available to begin executing, thus permitting different customer programs the opportunity to time-share computer time.

In discussing the execution of a program, it is important to understand the concept of "processing". A process is the total environment in which a program (or image) executes and has, in addition to the image, three further components, namely: (1) memory space allocated to the process for storing the image, for storing data generated and used by the image and for storing control information; (2) a software context which includes such pieces of information such as priorities and privileges allocated to the process, a unique process identifier, accounting information and so on; and (3) a hardware context which comprises the contents at any instant of time of the general purpose registers within the processor or CPU. Whenever execution of the process is suspended, its hardware context is stored in memory before another process begins execution. When a process is again allowed to execute, its hardware context is restored in the registers so that the process can resume execution at the point it was interrupted without again processing previously manipulated data or reexecuting commands or instructions.

As previously noted, each customer of a service vendor typically has needs and requirements that differ from, in part, and are similar to, in part, the needs and requirements of other customers. To satisfy these diverse customers, it is advantageous for the service vendor to create an individual process to execute each "customized" program developed for the unique needs of each customer and create other processes to execute programs having "universal capabilities" which satisfy common needs of a plurality of customers.

A communication subsystem for transferring data between the several processes is a critical element in an integrated distributed-processing system suitable for diverse time-sharing customers or users. An important attribute in such a communication subsystem is to identify and select process-to-process connections in response to a request from an originating process to call a terminating end-point process which may be in a different processor in the same or in a different node and to provide communication criteria or parameters for the call, such as a rate of data flow and a grade of service. It is therefore advantageous to pass data defining such communication parameters over external communication links between the processors and the nodes (by way of foreign systems such as common carrier networks) so that the end point (users) can process such communication parameter data and intercommunicate within the parameters.

In order to communicate over another (foreign) system, an interface is required to convert the "processed" data to information suitable for conveyance over the "foreign" system. This interface which provides the suitable conversion is necessarily transparent to the communication parameter data provided by (and destined to) the end-point users. This limits the usefulness of the interface since it must be "blind" to the parameter data and thus cannot receive calls as would an end-point user or process. It is an object of this invention to enhance the usefulness of an interface process.

SUMMARY OF THE INVENTION

In accordance with this invention, processes interfacing communication links external to the processor invoke (during call initiation) the application of the data defining the communication parameters to the external link when the terminating end point is accessed by way of such external link and invoke the processing of the communication parameter data when the terminating end point is the interface process. In this manner, the interface process can either provide an interface to the external link or be a terminating end-point user.

It is a feature of this invention that the application and processing invoked by the interface process comprises program code being executed by the interface process to enhance the control the process has over the alternative capabilities of interfacing the external link and terminating calls.

In accordance with a specific embodiment of this invention described hereinafter, a plurality of processors of an integrated geographically distributed communication processing system supports a plurality of processes, an internal communication subsystem for transferring data between processes by way of internal links and an interface process for interfacing an external communication link extending to another processor. When a process requests a connection to another (terminating) process, an internal link is selected and the communication parameter data is passed to the selected link. When the internal link to the interface process is selected, the communication parameter data on the internal link is transferred to the external communication link when the terminating end process is in the remote processor. Alternatively, the communication parameter data is processed by the interface process when the terminating end process is the interface process.

The foregoing and other objects and features of this invention will be more fully understood from the following description of an illustrative embodiment thereof taken in conjunction with the accompanying drawings.

BRIEF DESCRIPTION OF THE DRAWING

FIGS. 9-36 disclose a flow diagram of several processes providing the internal communication capability supported by each processor;

FIGS. 39-48 depict a flow diagram for a transport network interface process;

FIGS. 62-78 disclose flow diagrams of various processes providing a store and forward service capability for the multiprocessor data and communication processing system.

DETAILED DESCRIPTION

System Architecture

Figure 1:
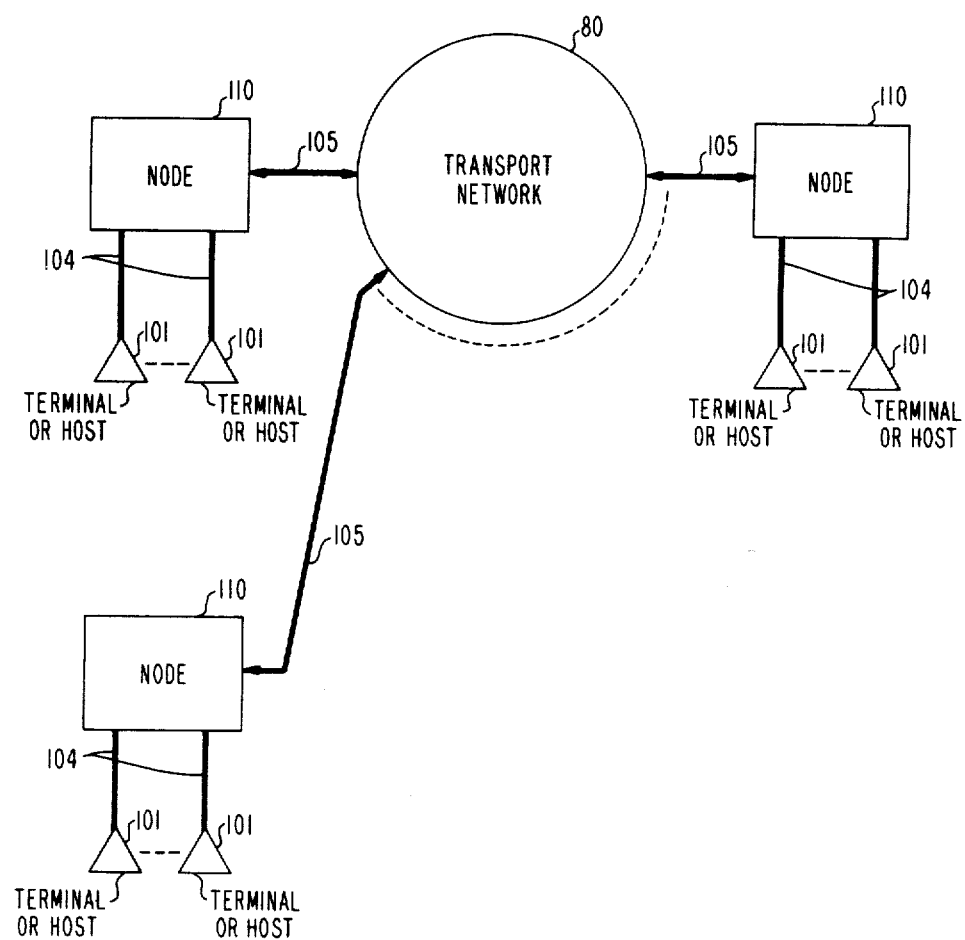
FIG. 1 discloses, in schematic block form, a group of processors at one geographic location (hereinafter called a node) and the manner in which it is connected to customer terminals and hosts and to other nodes by way of a transport network to form an integrated data and communication processing system in accordance with this invention.

A system for providing communication processing services is shown in FIG. 1. In general, the system consists of a plurality of nodes, such as node 110, which nodes are connectable to, and are available for, providing services for data terminals and/or host computers which are symbolically represented in FIG. 1 by terminal or host 101 and are hereinafter individually referred to as terminal 101. Each of terminals 101 may access node 110 by way of a suitable transmission line, such as data line 104. In addition, each of nodes 110 is connectable to a transport network 80 which may comprise a common carrier communication system or, advantageously, a packet switching network for transporting data packets from node to node. The connection between each node 110 and transport network 80 preferably comprises digital line 105 and it is contemplated that node 110 communicates over digital line 105 utilizing a data packet format. Accordingly, each terminal 101 has access to services in each node 110 connectable thereto and, in addition, each node 110 can access other nodes via transport network 80 to provide each terminal further services available in other ones of nodes 110, which further services may include capabilities to communicate with, and send messages to, terminals connectable to the other nodes.

Figure 2:
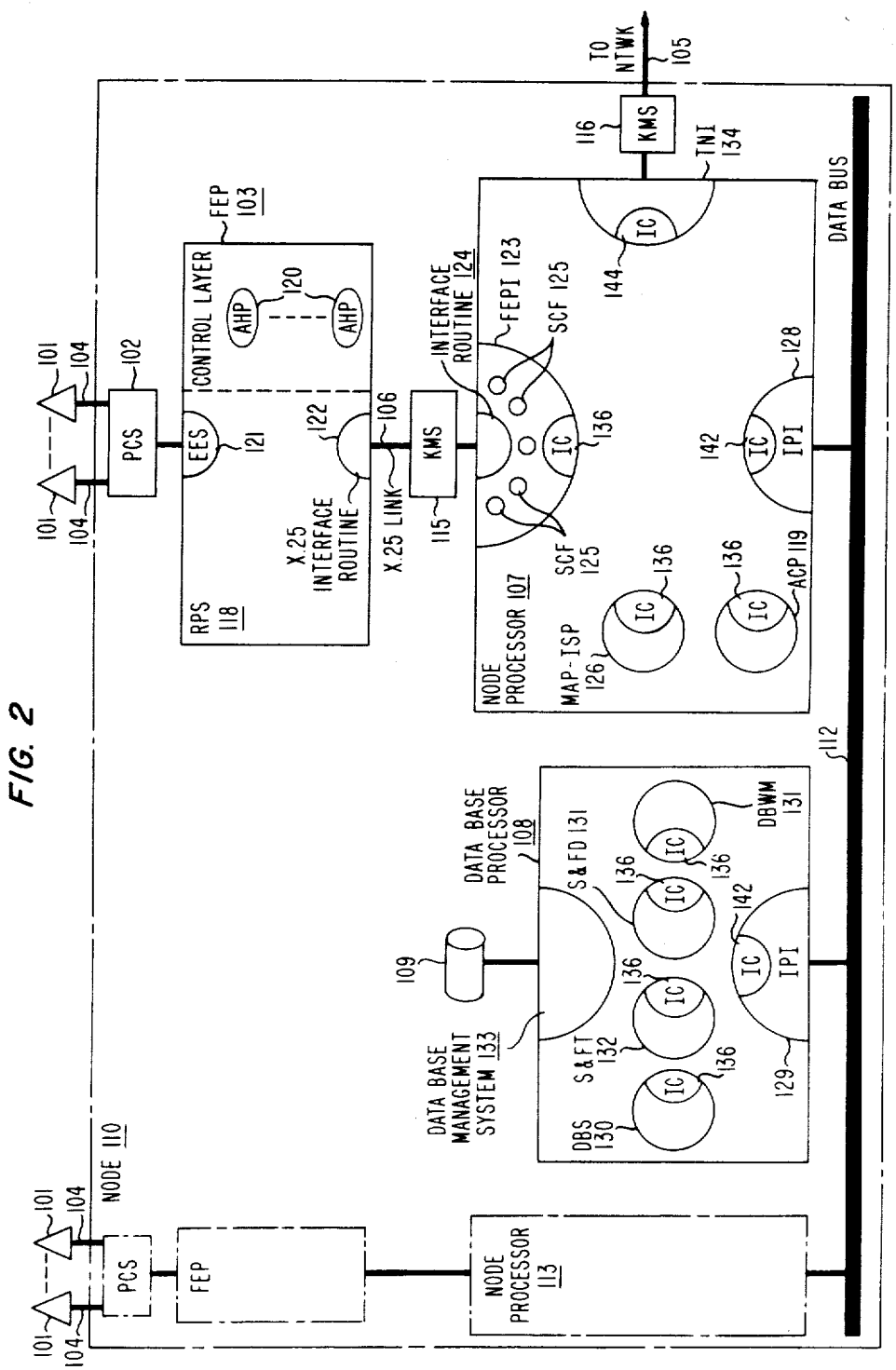
FIG. 2 depicts the details of the various equipments arranged to form a multiprocessor node in accordance with this invention.
Figure 3:
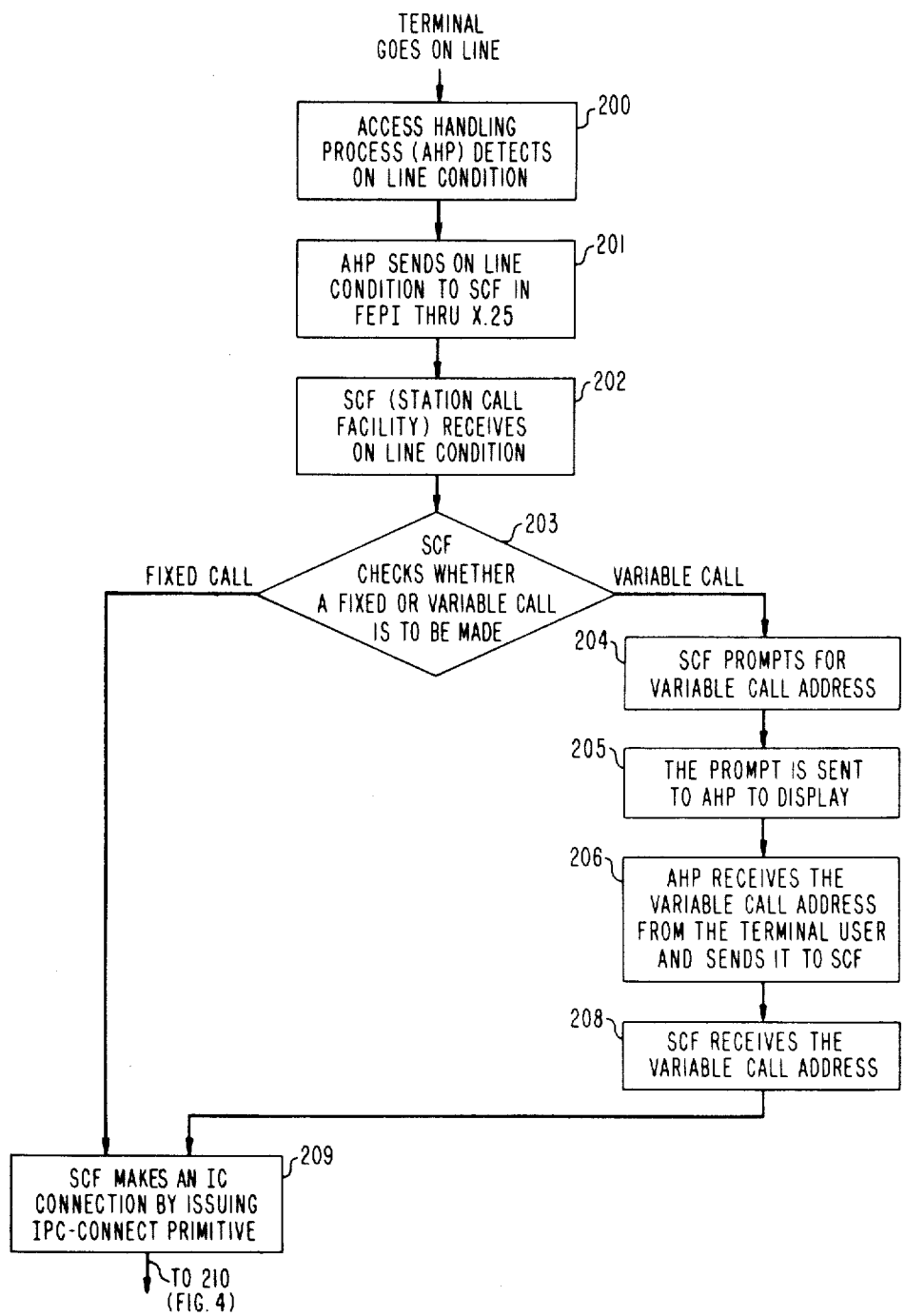
FIGS. 3-8 constitute a flow diagram interconnected as depicted in the several Figures showing the general functions of the integrated data and communication processing system when following a specific scenario.
Figure 4:
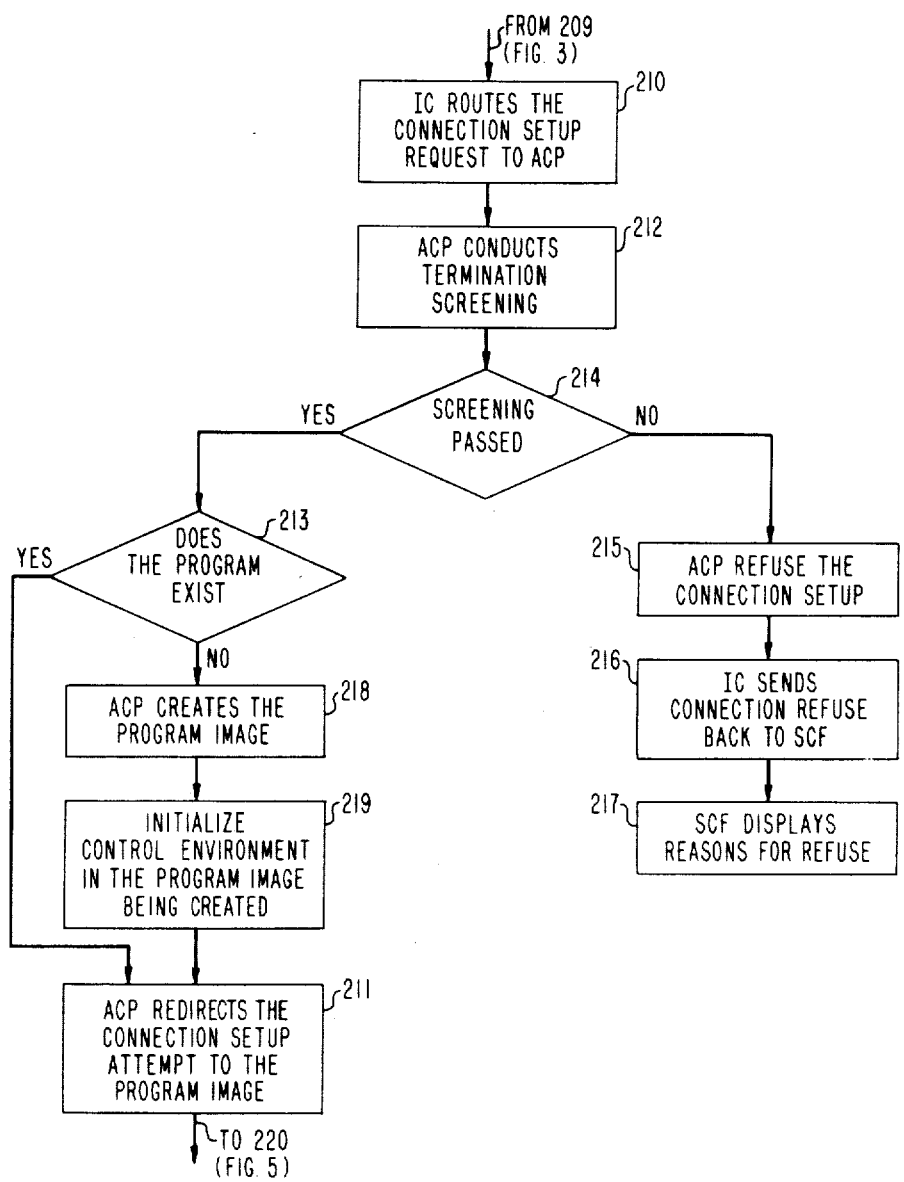
Figure 5:
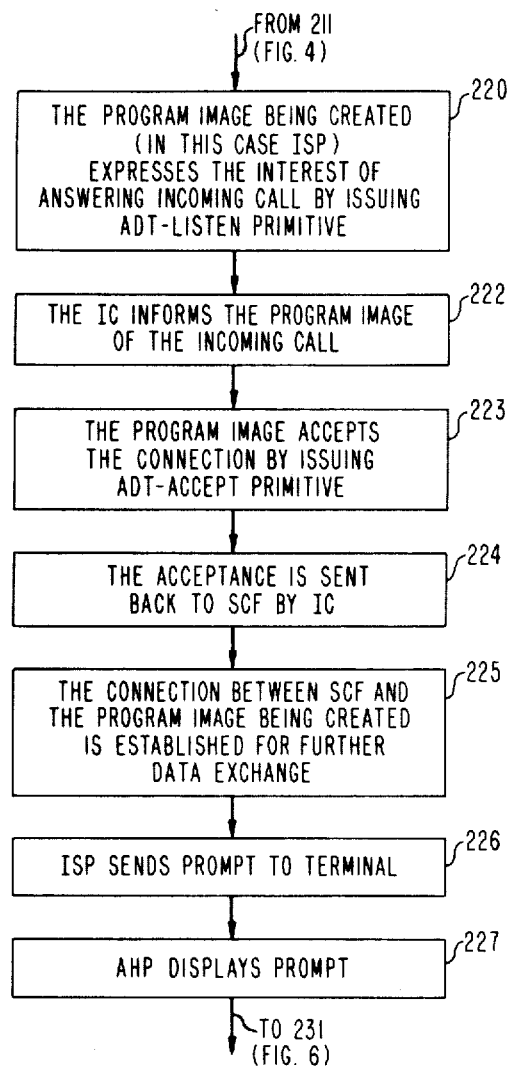
Figure 6:
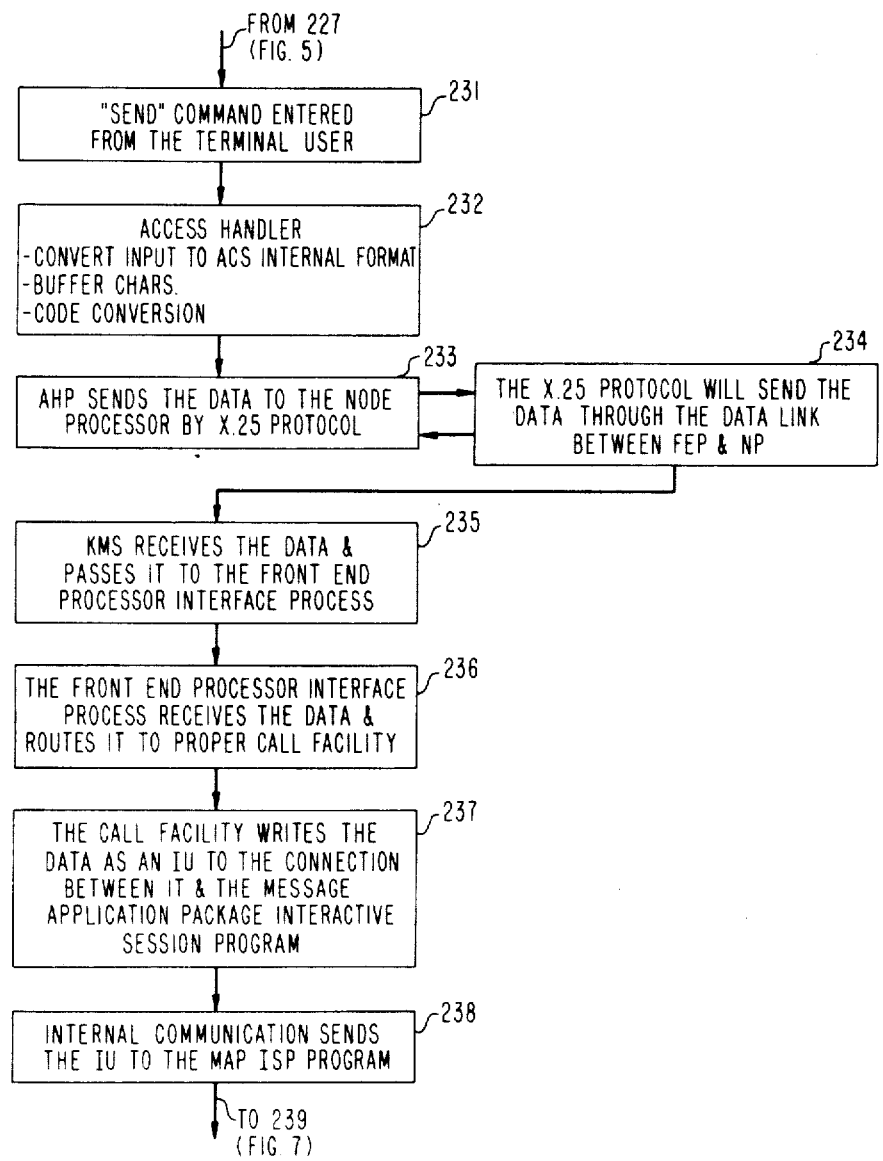
Figure 7:
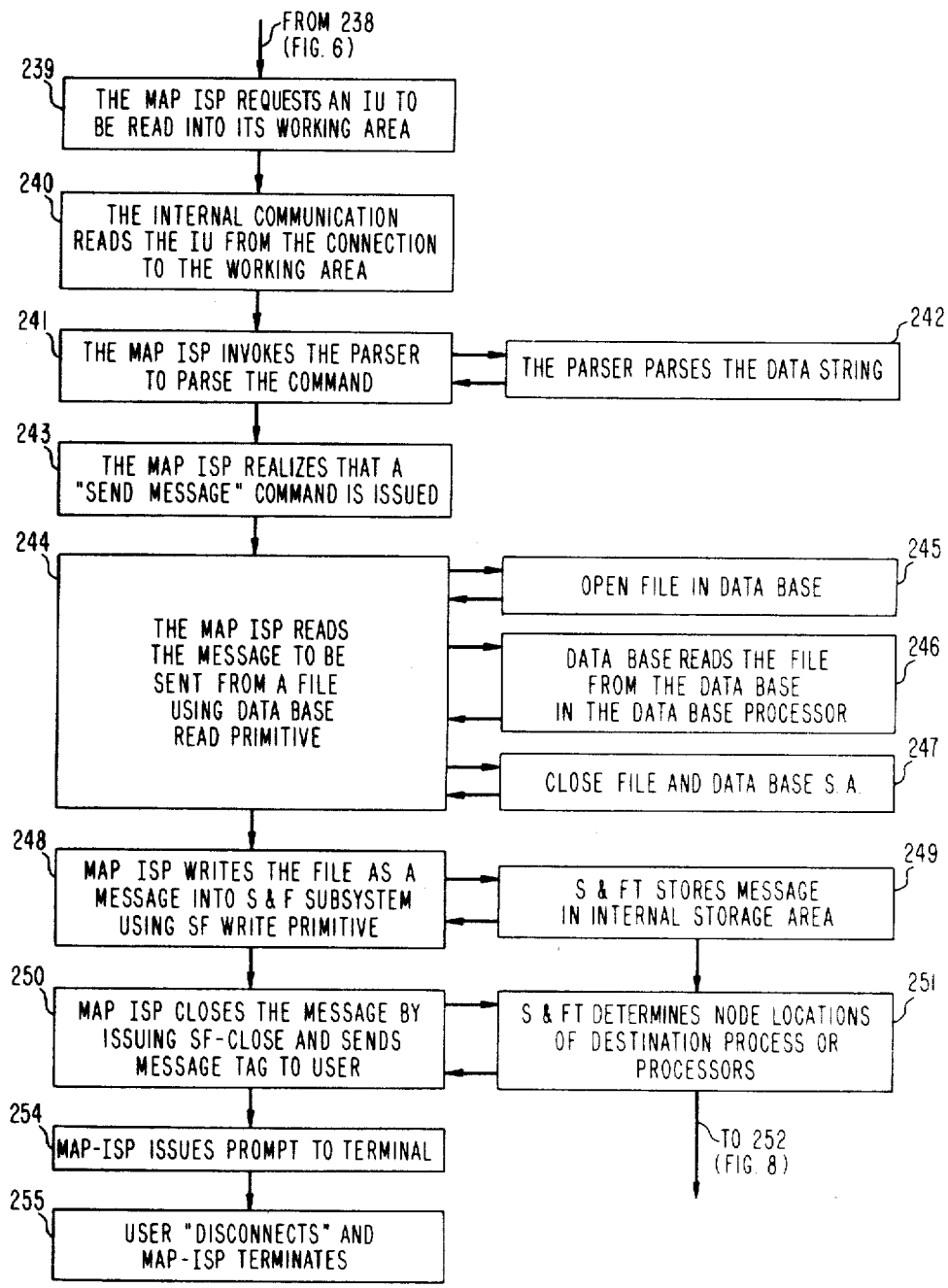
Figure 8:
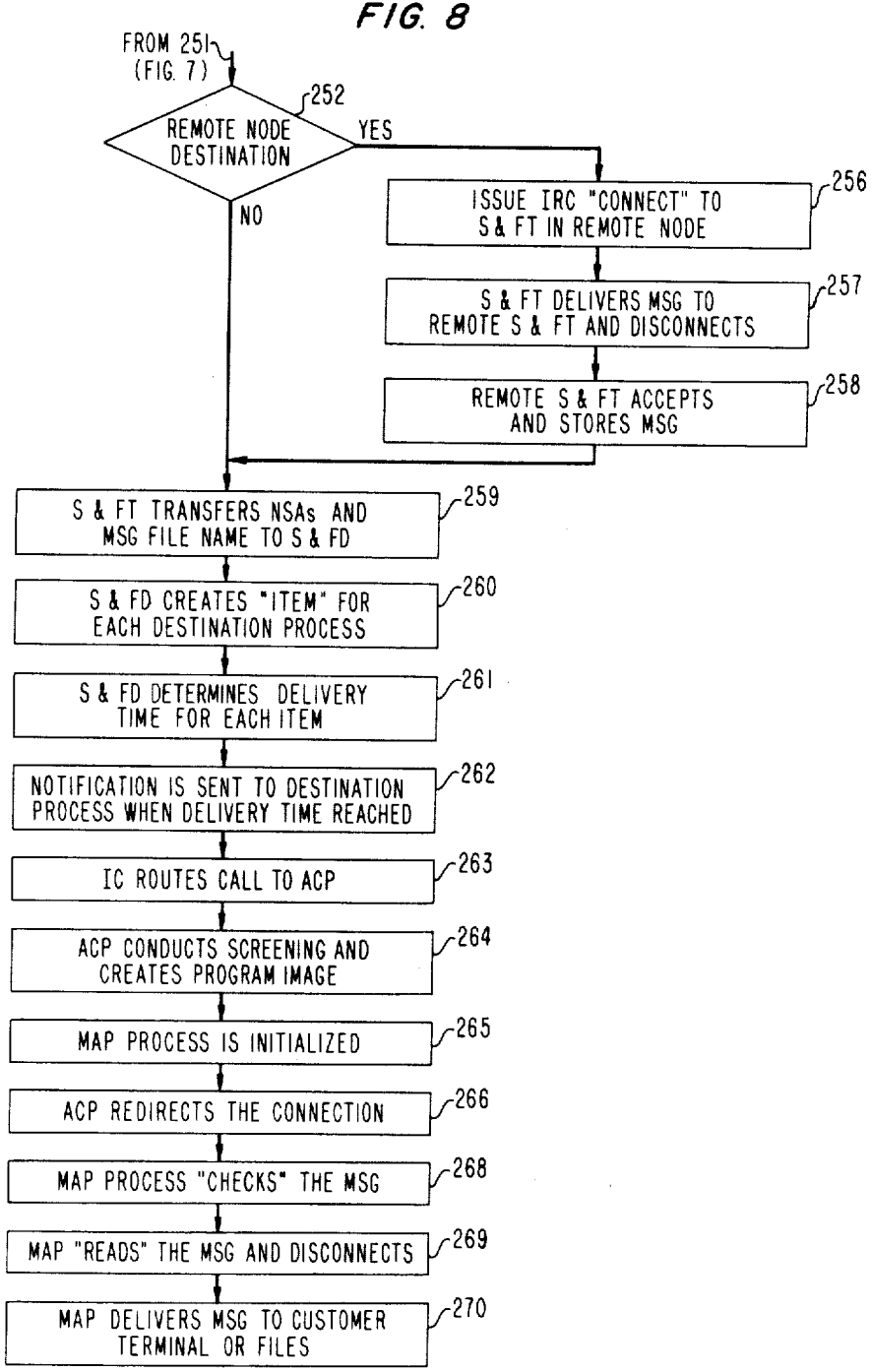

The details of a typical node, such as node 110, is shown in FIG. 2. As noted with respect to FIG. 1, and as seen in FIG. 2, node 110 is connected to and communicates with the various terminals (and/or hosts), such as terminal 101, by way of digital data transmission lines, such as data line 104. In addition, node 110 is connectable to a transport network 80, which connection may be effected by way of digital line 105.

Hardware units in node 110 advantageously include a plurality of computer processors, such as node processors 107 and 113, and a data base processor, such as data base processor 108, all interconnected by way of data bus 112. A suitable processor to implement these processors described above is the VAX 11/780 machine manufactured by Digital Equipment Corporation of Maynard, Mass., supplemented by the VMS software operating system offered by Digital Equipment Corporation. The VAX computer and the VMS operating system are described in *VAX* 11/780 *Architecture Handbook*, *VAX* 11/780 *Hardware Handbook* and *VAX* 11/780 *Software Handbook*, all published by Digital Equipment Corporation.

In node 110, sets or groups of the data lines 104 terminate in microprocessors, such as microprocessor 102 wherein each microprocessor 102 is arranged to communicate with each terminal 101 connected to the other end of each data line 104. A suitable microprocessor is the PCS microprocessor manufactured by International Business Machines Corporation of Rochester, N.Y., and described in U.S. Pat. No. 4,188,665 issued to D. M. Nagel et al. on Feb. 12, 1980. Each PCS microprocessor 102, in turn, is connected to front-end processor 103. It is a principal function of PCS microprocessor 102 to receive and recover data from each data line 104 and originated by the terminal connected thereto, such as terminal 101, assemble such data into a byte format (which identifies such data line) and forward the bytes to FEP 103. In the reverse direction data bytes (identifying such data line) are received from FEP 103, are formatted into a data bit stream format (appropriate for a data line) and are selectively directed over such identified data line 104 to terminal 101.

Each front-end processor, such as FEP 103, communicates with node processor 107 (or node processor 113) by way of a communication link, such as X.25 link 106. It is broadly the function of FEP 103 to receive the data bytes from PCS 102, to assemble the bytes into blocks of data, to process and to packetize such data blocks in a manner described in detail hereinafter and to direct the data packets over data link 106 to node processor 107 via microprocessor 115. In the reverse direction data packets from node processor 107, directed to terminal 101, are passed through microprocessor 115 and over link 106 to FEP 103 which depacketizes the data into blocks, processes the blocks, assembles them into data bytes and sends the data bytes to PCS 102 for conveyance to terminal 101 via data line 104. A suitable processor to implement front-end processor 103 comprises the Series/1 minicomputer manufactured by International Business Machines Corp. Front-end processor 103 is supplemented by the RPS software operating system 118 offered by International Business Machines Corp. The Series/1 minicomputer and the RPS software operating system are described in *Series/1 Digest*, Fourth Edition (1979) published by International Business Machines Corp.

FEP 103 is further provided with various software programs, routines and tasks to provide the above-described and other functions. For example, Extended Execution Support (EES) System 121 is a software system that supplements the RPS operating system of FEP 103, which combination assembles data bytes received from PCS 102 into data blocks and, in the reverse direction, disassembles blocks into corresponding data bytes for transmission to PCS 102. X.25 routine 122 constitutes a software routine package or system that supplements the RPS operating system. Functions performed on outgoing data include link layer protocol consistent with standard X.25 level 2 protocol and packet level functions to packetize the data blocks and pass such packets by way of a "virtual" channel reserved for the terminal over X.25 link 106 to node processor 107. In the reverse direction X.25 routine 122 provides the packet level functions to assemble data packets on each channel on line 106 from node processor 107 and form them into corresponding data blocks and present the depacketized data blocks to various software tasks and routines in FEP 103 and, in addition, performs the link layer (X.25) protocol functions. The protocol and formatting provided by X.25 routine 122 is further described in *Data Communications Standards*, Edition II, Copyright 1982, McGraw-Hill Publication Co., New-York, and more specifically described in "Part 1, International Telegraph and Telephone Consultative Committee (CCITT) Data Communication Recommendations". EES system 121 is a software product offered by the International Business Machines Corp. and further described in *Series/1 Digest* disclosed above.

The RPS operating system 118 of FEP 103 is further supplemented, in accordance with this specific embodiment of this invention, by Access Handler Process (AHP) software task 120. An AHP task 120 is provided in FEP 103 for each of the data lines, such as data line 104. For the present description, it is assumed that data line 104 extends to only one terminal, such as terminal 101, and that therefore AHP 120 need only accommodate a single terminal. It is apparent, however, that data line 104 may comprise a multipoint line and extend to a plurality of terminals and AHP 120 would therefore accommodate a plurality of terminals.

It is a principal function of each AHP task 120 to control the processing of data blocks assembled by EES 121 (from data bytes received from PCS 102), such processing including inserting the network standard address (NSA) of the associated terminal 101 in the data block. As explained hereinafter, with the NSA inserted in the data block, data from the terminal is invariably conveyed by way of a reserved "virtual" channel over line 106 to processor 107. It is a further function of each AHP 120 to select the data in the reverse direction on the reserved channel over link 106 from node processor 107, correspondingly inserting the NSA of the terminal in the data block. Thus, the terminal on the data line associated with the AHP 20 task is interconnected with its corresponding "virtual" two-way channel which extends to node processor 107.

The interconnection to node processor 107 over link 106 is provided by way of processor 115. Processor 115 advantageously constitutes a microprocessor arranged to provide the link layer or level 2 (X.25) protocol interchange with X.25 routine 122 in FEP 103. Accordingly, microprocessor 115 functions in substantially the same way as the link layer protocol functions in X.25 routine 122. A microprocessor suitable for use for implementing microprocessor 115 and providing the above-described functions is the KMS microprocessor manufactured by Digital Equipment Corp. and described in "KMD11-d Reference Manual, KMC11-B X.25 Protocol (LAP and LAP-B) Level 2 Firmware", "KMC11 General Purpose Microprocessor User's Manual", and "VAX/VMS KMD11-D I/O Driver User's Manual", all published by Digital Equipment Corp.

Node processor 107 has various capabilities, such as communicating with the "virtual" two-way channels, accepting and interpreting various commands and requests from the channels, extending calls to other processors in node 110 and in other nodes and carrying out such commands and requests, either solely or in cooperation with other processors. In addition, node processor 107 can call terminals connected to the processor or connected to other processors in node 110 and in other nodes, as described in further detail below. Various software processes in node processor 107 are utilized to supplement the VMS operating system to provide these capabilities, which processes include Application Control Process (ACP) 119, Front-End Processor Interface process (FEPI) 123, Message Application Process Interactive Session Package (MAP-ISP) 126, Interprocessor Interface Process (IPI) 128 and Transport Network Interface process (TNI) 134. Although node processor 107 advantageously is implemented with other software processes, the description thereof is directed to the above-identified processes to fully describe the invention, a description of such other software processes being not necessary for an understanding of the invention.

Each node processor 107 accommodates one or more Front-End Processor Interface processes, each such process terminating an individual link 106 (connected to the interface process via KMS 115). Front-End Processor Interface process 123 initiates, terminates and manages connections between each of terminals 101 (via channels on the connected link 106) and other ones of terminals 101 connected to the same or other processors and connections between the terminals 101 and application processes (such as MAP-ISP 126) in node processor 107 or in other node processors (in node 110 or in other nodes). More specifically, FEPI 123 creates, manages and terminates two-way communication paths to enable terminal 101 to communicate with an application process or a remote terminal and to enable an application process or a remote terminal to communicate with terminal 101. Elements of FEPI 123 involved in these functions include Interface Routine 124, a portion of Internal Communication (IC) Subsystem 136 which is depicted in FIG. 2 as part of FEPI 123 and Station Call Facility (SCF) tasks 125.

Interface Routine 124 disassembles the incoming data packets from microprocessor 115 on each channel on link 106 (from FEP 103) and forms them into blocks of data, hereinafter called information units (IU). Each IU is passed to an SCF 125 task which is individual to the channel (and is therefor individual to one of the terminals). In the reverse direction, each IU from an individual SCF 125 is assembled into data packets by Interface Routine 125 and the data packets are passed via microprocessor 115 to the channel on link 106 corresponding to the individual SCF 125 and thus are destined for the associated terminal.

One of the principal capabilities of SCF task 125 is to extend (two-way) calls (from the individual terminal 101) to various application processes in node processor 107 or in other processors in the same or other nodes. Another SCF task 125 capability is to extend calls to other Station Call Facility tasks in the same or other FEPI 123 processes in node processor 107, in node processor 113 or in a processor in another node. Alternatively, other SCF tasks and application processes may extend a two-way call to SCF task 125, thus providing the capability of extending a call to the terminal associated with SCF task 125. SCF task 125 also has the capability of taking down (disconnecting) any of the above-mentioned calls or connections.

A request by a terminal user to run an application program (such as a program in MAP-ISP 126) may advantageously be first forwarded by SCF task 125 in FEPI 123 to the Application Control Process (ACP) 119. ACP 119 initially determines whether the particular terminal user is authorized to access the application program in question and assuming that the user has such authorization determines whether a process containing the application program presently exists in the node processor. In the event that the program does not exist, ACP 119 calls the VMS operating systems to create the application process (such as MAP-ISP process 126) that will contain the program the user desires to run. ACP 119, upon determining that the process is already in existence or alternatively upon determining that the process has been created, redirects the call to the application process thus forming a two-way call (or virtual connection) between SCF task 125 and the application process and permitting communication between such process and the associated terminal user. A more detailed description of a suitable application control process and a method of creating, initializing, scheduling and executing processes (including application processes) are disclosed in further detail in D. A. Zave.

In addition to the above-described connections, processes in the same processor, in general, may create similar two-way (virtual) connections between them. The formation of virtual connections between end-point user processes is provided by a capability called an Interprocess Communication (IC) Subsystem. In this embodiment, the IC Subsystem is distributed in and constitutes a portion of the several end-point user processes, such user processes including ACP 119, FEPI 123 and MAP-ISP 126, wherein the Subsystem portion is identified as IC Subsystem 136. (It is noted that the IC Subsystem is also distributed in other processors and thus included in Store and Forward Transfer (S&FT) process 132, Store and Forward Delivery (S&FD) process 131, Data Base Server process 130 and Data Base Work Manager process 131 in data base processor 108).

Each IC Subsystem 136 in each user process is substantially identical to the IC Subsystem 136 in each other user process. Capabilities of each IC Subsystem 136 in each user process include forming a virtual two-way connection (or intraprocessor link) with an IC Subsystem portion in another user process in the same processor, writing data information units (IUs) into and reading data from the formed connection, exchanging housekeeping and protocol information with the other IC Subsystem portion and disconnecting the formed connection.

Each process is provided with a unique system-wide identity or address called a Network Standard Address (NSA). When a process initiates a call to another process, it specifies to its IC Subsystem 136 the NSA of this other terminating end-point process. As discussed hereinafter, this provides the capability of forming a virtual two-way connection with any other process in any other processor in the system, utilizing these same capabilities of IC Subsystem 136. Certain of the processes, such as those processes providing application functions for "customers" or terminal users, may also require certain communication parameters, such as control of the data flow rate or "affirmative" data delivery assurance. IC Subsystem 136 provides three layers of communication control for routing, redirecting and disconnecting calls and for passing and controlling outgoing and incoming data between the end-point processes through the formed connection. More specifically, outgoing commands, such as call requests and data from the user process, are first passed to a "session layer" in IC Subsystem 136. The "session layer" supports the interface to the user process, checks the arguments directed to the formation and control of the interconnection and provides assurance that the data is passed through the connection (or formed) in accordance with the communication protocols defined by the user. The commands and data are then passed to a "transport layer" that specifies system-defined and end-to-end service, such as generating sequence numbers and defining flow control information. It is to be noted that both the user process and the system may define their own flow control information in accordance with the needs of each, in which case, the system requirements prevail unless the user process requires a flow slower than the system requirement.

After passing through the "transport layer", the commands and data are passed to a "network layer" which refers to a system routing table to select or identify a specific connection (or intraprocessor link) to another end-point process which, as noted above, is identified by its NSA. (It is noted here that for calls to processes in other processors, the intraprocessor link to a process interfacing an appropriate external communication link will be selected.) The "network layer" also moves the data to the intraprocessor link thus identified.

Incoming commands and data to the IC Subsystem of any user process is first passed through the "network layer" which moves the commands and data from the connection and then through the "transport layer" which provides the corresponding "system" end-to-end services as the outgoing side and then finally through the "session layer" which supports the interface to the process receiving the data. Accordingly by virtue of IC Subsystem 136, a user process (which includes such a subsystem) can complete a connection to anoher user process in the same processor and exchange, on a two-way basis, necessary control and protocol information for both the user processes and the system communication "network" together with any data that the processes desire to interchange.

A process in one processor (such as MAP-ISP 126 in node processor 107) can call a process in another processor (such as Data Base Work Manager process (DBWM) 131 in data base processor 108). The virtual connection created by this call is extended through IPI 128 in node processor 107, data bus 112 and IPI 129 in data base processor 129. As described in detail hereinafter, IPI 128 and IPI 129 provide interfaces with data bus 112 to form connections and to pass IUs between the two processes. IPI 128 and IPI 129 are provided with interprocess communication subsystem capabilities (depicted as IC 142) which are substantially identical to the corresponding IC capabilities that IC Subsystem 136 provides for its user processes. Accordingly, any user process in any node processor, such as node processor 107, may connect to and exchange data with a data bus interface process (such as IPI 128) in the same manner as the user process connects with and communicates with another user process in the same processor. Thus, for example, a user process may desire to communicate with IPI 128 for purposes such as monitoring or testing portions of the process.

In addition to the above-described interprocess communication capability, each data bus interface process is arranged to forward a call from a user process in the same processor to a process in another processor by way of data bus 112. In this case, the "network" layer of the IC Subsystem of the calling process (when referring to the routing table and utilizing the NSA of the remote process) selects or identifies an internal link to the interface process. The "network layer" of IC Subsystem 142 of the data bus interface process is then arranged to move incoming commands and data from the connection and then transfer such incoming commands and data to a channel on data bus 112 without the commands and data passing through the "transport" and "session" layers. In the other direction, incoming calls and data from data bus 112 are read by IC Subsystem 142 of IPI 128 and then transferred directly to the "network layer" of IC Subsystem 142. The network layer, in response to an incoming call from the data bus, refers to the routing table to identify the next link to the called end-point processor. The call is thus extended and data is thereafter moved to this final link in the connection with the terminating end-point user process without passing through the transport and session layers of the IC Subsystem of IPI 128. IC Subsystem 142 of IPI 129 correspondingly extends calls and transfers incoming data from processes in data base processor 108 directly from its "network layer" to data bus 112 and in the reverse direction extends calls and transfers data from data bus 112 to the outgoing "network layer" without passing through the "transport" and "session" layers. Accordingly, when a call is made and when a connection is formed between an end-point user process in one processor, such as processor 107, to an end-point user process in another processor, such as processor 108, the "session" and "transport" layers of the IC Subsystem of each such end-point user process "communicates" with the "transport" and "session" layers of the other end-point user process without intervention of the "transport" and "session" layers of the bus interface processes. The "network" layer protocol for defining the route and moving the data into and out of the connection are exchanged, however, between each end-point user process and the corresponding bus interface process in the same processor. Consequently, with respect to forming interprocessor connections, the two end-point user processes in different processors exchange protocol information (in part) at the "session" and "transport" layer levels in the same manner as though they are in the same processor.

An end-point user process (such as S&FT 132) can call an end-point user process in a processor in another node. The virtual connection created by this call is extended through IPI 129, data bus 112, IPI 128 and TNI 134 in node processor 107 and then via KMS 116 and transport network 80 to the other node and the through KMS 116 and TNI 134 in processor 107 in the other node to the appropriate process. KMS 116 constitutes a microprocessor which is substantially identical to KMS 115 and functions to provide the link level or level 2 (X.25) protocol interchange with the corresponding KMS 116 in the remote node. TNI provides the node processor interface with KMS 116 (and the transport network) and assemblies IUs into packets for passage to the transport network and, in the reverse direction, depacketizes the data and reforms it into IUs. IC Subsystem 144 in TNI 134 is otherwise arranged in substantially the same manner as IC Subsystem 142 in the bus interface process, providing the three protocol layers when TNI 134 is an end user process and "bypassing" the transport and session layers when TNI 134 is an intermediate (or interface) process for a connection between processes in different nodes. Consequently, the two end user processes in different nodes can exchange information (via interface processes) in the same manner as though they are in the same processor.

Node processor 107 (and corresponding node processor 113) advantageously service a plurality of application processes; one of such processes, namely, MAP-ISP 126, being depicted in node processor 107. MAP-ISP 126 is arranged to interpret commands and transactions from terminals, such as terminal 101, carry out such commands, call other processes to assist in carrying out such commands or transactions, interpret commands or transactions received from other processes and forward such commands or transactions to terminals, such as terminal 101. It is noted that MAP-ISP 126 also includes IC Subsystem 136 whereby the process may extend calls to or receive calls from other processes. For example, calls from a Station Call Facility 125 in FEPI 123 may be extended to MAP-ISP 126 to form a two-way connection with an associated terminal 101 to receive the above-noted commands and transactions.

Two processes which are arranged to assist MAP-ISP 126 in carrying out commands constitutes Data Base Work Manager (DBWM) process 131 and Data Base Server (DBS) process 130. Data base processor 108 includes a plurality of DBS 130 processes and a single DBWM 131 process. These processes in combination with a suitable data base management system and disc files, such as disc 109, constituting data base service capability. DBWM 131, in response to a call for such service, assigns a data base service, such as DBS 130. DBS 130 is generally arranged to open a data base storage area, open a data base file, write information into, read information out of or modify such open file, close such file and close the data base storage area. A data base management system suitable for use in this arrangement is described in *Communications of the ACM*, Vol. 17, No. 10, "A Back-End Computer for Data Base Management", by R. H. Canaday, R. D. Harrison, E. L. Ivie, J. L. Ryder and L. A. Wehr, October 1974, pp. 575–582. Advantageously, one such data base management system known as SEED is offered by International Data Base Systems, Inc., Philadelphia, PA., and described in *SEED User Manual*, published by International Data Base Systems, Inc., Copyright 1981.

Other processes which are capable of assisting MAP-ISP 126 in carrying out commands and in communicating transactions are store and forward delivery (S&FD) process 131 and store and forward transfer (S&FT) process 132 (both in data base processor 108). S&FT 132 is capable of processing and transferring data messages on a store and forward basis. More specifically, S&FT 132 assembles store and forward messages and headers thereof and transfers these to S&FD process 131 if the message is destined for a process in the same node or, alternatively, transfers the message to a S&FT 132 process in another node if the message is destined for such remote node. S&FD 131 delivers the message to the appropriate destination process or processes (in its local node) as defined by addresses in the message header and parameters such as earliest delivery time.

General Operation

FIGS. 3–8 depict a work flow (flow diagram) of generalized functions that occur within and are provided by the several nodes 110 during the course of one of a number of scenarios that can be accommodated by the communication processing system. The general functions shown in the work flow and described hereafter are advantageously implemented by various processes which, when assembled into data code in the form of routines, tasks, et cetera, and invoked by a processing unit in node 110, provide the broad functions described hereinafter.

In the scenario described hereinafter, a terminal user (at terminal 101) turns on the terminal (goes on-line) and receives a prompt from the system requesting an address (of a process) to be called. The user sends the address of the MAP-ISP application process and the application process returns a prompt and awaits a command from the user. The terminal user then requests that text and header data be retrieved from the user's files in data base processor 108, that such header and text information be assembled into a message and that the assembled message be delivered on a store and forward basis to a locally and/or remotely located process or processes identified in the header. More particularly, in response to the "address" prompt, the terminal user calls the application process (which application process is advantageously MAP-ISP process 126) by sending a "connect" command containing the network standard address (NSA) of the application process. Upon being connected to MAP-ISP 126 and receiving the prompt from this application process, the terminal user sends a "send" command containing the appropriate instructions for retrieving the header and text data from the user's files, for fowarding the assembling message on a store and forward basis and for delivering the message to destination processes defined by NSAs (which, in this case, are contained in the header file).

When the terminal user turns on terminal 101, the resultant on-line condition (or code) is forwarded through PCS 102 to FEP 103. EES 121 assembles the signals with a data block which is passed to the AHP 120 task reserved for the terminal line. AHP 120, as depicted in step 200, detects this on-line condition and determines that the associated terminal 101 has just been turned on. AHP 120 in function step 201 passes this on-line condition code (in data block form) to X.25 routine 122 which packetizes the data and provides the necessary X.25 protocol. The packet then passes over the channel individual to the terminal on link 106 to microprocessor 115 which, as previously described, provides the appropriate protocol interchange. The data is then depacketized and formed into an information unit by interface routine 124 and the information unit (now designating the on-line condition) is forwarded on to the Station Call Facility 125 associated with the terminal. General function step 202 depicts the reception of the on-line condition by SCF 125 advancing the system processing step to decision 203, wherein SCF 125 checks whether the terminal is authorized to make fixed or variable calls.

If the terminal station is authorized to make fixed calls, decision 203 advances the overall system operation to function step 209. Alternatively, if the terminal station is authorized to make variable calls, decision 203 advances the system process to function step 204 wherein Station Call Facility 125 generates a prompt. This prompt is then returned by way of link 106 (that previously carried the on-line condition) and is passed to the AHP 120 task individual to the terminal data line. AHP 120 forwards this prompt back to the terminal line 104 by way of microprocessor 102 for display at the station.

As noted above, the terminal user in response to the prompt (from SCF 125), returns a "connect" command to extend the call to MAP-ISP 126, inserting in the command the NSA of the application process. This command is returned to AHP 120 and the task, as depicted in function step 206, provides the appropriate processing of the command and forwards the command (with the application process NSA) over the previously described channel to SCF 125. SCF 125 receives this variable call (NSA) address, as shown in function step 208. The sequential functions of the communication processing system thereupon advances to general function step 209.

In general function step 209, SCF 125 calls MAP-ISP 126, initiating the call by issuing a "connect" request to the IC Subsystem 136 (in FEPI 123) and designating the NSA of MAP-ISP 126 in the request. IC Subsystem 136 thereupon attempts to route the connection to the application process. In accordance with a preferred embodiment of this present system, to connect to an application process, the connection must first be extended to Application Control Process (ACP) 119. As described in detail in the above-noted application of D. A. Zave and as depicted in function step 212, ACP 119 initially conducts termination screening to determine whether the particular terminal (user) is authorized to access the application program. Assuming that the terminal user does not have such authorization, decision 214 advances the general system operation to function step 215. In function step 215, ACP 119 refuses the connection setup by returning an "abort" back through IC Subsystem 136. This abort is passed back to SCF 125, as depicted in function step 216, terminating the connection to ACP 119. SCF 125, in accordance with function step 217, generates a response for transmission back to the terminal user specifying that the connection has been refused due to lack of authorization.

Assuming now that the terminal user has authorization to run the program, decision 214 advances the system operation to decision 213. As described in the D. A. Zave application, ACP 119 now determines whether the desired program presently exists in node processor 107. Assuming that the application process presently exists, the operation advances directly to general function step 211. Alternatively, if the program is not presently in existence, ACP 119 creates a program image, as depicted in function step 218 and as described in detail in the D. A. Zave application. The control environment for the program image being created is at this time initialized, as depicted in function step 219, and the general system operation advances to function step 211. In function step 216, ACP 119 issues a command to IC Subsystem 136 to "redirect" the connection setup to MAP-ISP 126. This effectively completes the connection from SCF 125 to MAP-ISP 126 by way of the IC Subsystems in FEPI 123 and in MAP-ISP 126.

Although the particular mode of operation described above is contemplated by the inventors, it is of course realized that a process such as MAP-ISP 126 may also be directly accessed by SCF 125 by way of IC Subsystem 136 without the intervention of ACP 119 if termination screening and process creation is not desired or required.

When the program image in MAP-ISP 126 was created, it issues a "listen" request to IC Subsystem 136 to indicate that it is prepared to answer an incoming call. With the connection now redirected to MAP-ISP 126, IC Subsystem 136 thereupon informs the program image of this incoming call from SCF 125 as seen in function step 222. The call is thereupon accepted by the program image, the acceptance being indicated by the issuance of an "accept" request to IC Subsystem 136 as shown in function step 223. The acceptance provided by the program image is thus passed through IC Subsystem 136 and in accordance with function step 224 this acceptance is sent back to SCF 125. This completes the connection between SCF 125 and MAP-ISP 126 by way of the IC Subsystems of the two processes as indicated by function step 225 and with the connection completed MAP-ISP 126 sends a prompt back through the IC Subsystem in accordance with function step 226. Function 227 indicates the reception of the prompt by AHP 120 and this task then forwards the prompt back to the terminal user.

The above-described connection having been made and MAP-ISP having returned the prompt, the terminal 101 user transmits the "send" command (requesting that the message be transferred to a designated process or processes on a store and forward basis) to node 110 via line 104. The next function occurring in node 110, as symbolically identified by function step 231, constitutes the entering of the "send" command in Front-End Processor 103. This is accomplished by microprocessor 102 which communicates with terminal 101 over line 104 and EES routine 121 (in FEP 103) which assembles the command into a data block. The command data block is then passed to the Access Handler Processor 120 associated with the terminal line, as symbolically depicted by function step 232. Access Handler Process 120 inserts the network standard address (NSA) of the terminal, optionally provides code and format conversion, if desired, and buffers the converted character data block for subsequent transmission to node processor 107. The Access Handler Process (AHP) 120, as shown by function step 233, thereafter sends the buffered data block to node processor 107 by way of link 106 utilizing X.25 interface routine 122. As depicted by function step 234, X.25 interface routine 122 packetizes the data and sends the packets, utilizing the standard X.25 protocol, via the appropriate channel on link 106.

On the other side of link 106, KMS microprocessor 115 exchanges the standard protocol with routine 122 and the incoming data is depacketized and assembled into information units (IUs) by interface routine 124, as shown by function step 235.

In function step 236, as described in greater detail hereinafter, the Front-End Processor Interface process 123 routes the IU (which is the above-described "send" command) to the Station Call Facility task 125 which was previously reserved for the terminal. In function step 237, as described in further detail hereinafter, Station Call Facility task 125 "writes" the IU into the IC Subsystem connection previously formed between Station Call Facility task 125 and the Message Application Package Interactive Session Program (MAP-ISP) 126. Accordingly, the information unit is transferred by IC Subsystem 136 of FEPI 123 and MAP-ISP 126, utilizing a multilayer protocol (described hereinafter), which transfer function is depicted as function step 238.

It is presumed, at this time, that MAP-ISP 126 performs function step 239 which, as described in detail hereinafter, constitutes a request that an information unit in the connection be read into its (MAP-ISP) working or buffer area. Function step 240 is thereupon performed wherein the IU is read from IC Subsystem 136 into such work area of MAP-ISP 126.

When the information unit is read into the working area of MAP-ISP 126, the process provides function step 241, which function step involves invoking a parser routine to parse the "send command". Function 242 identifies the operation of the parser routine, parsing the "send" command data string. As described in further detail, this parsing involves composing a data structure for accommodating the command name and arguments for the specific "send" command. MAP-ISP 126 thereupon recognizes this command name in function step 243. The process then selects and initiates function step 244 to invoke a data base read system service which is implemented, in part, as noted above by DBWM 131 and DBS 130. As an initial step of such service, function 245 is invoked to open a file identified in the "send" command (the data base storage area of the user or customer being priorly opened during initialization of the MAP-ISP process).

It is presumed that one or more files defining a message header, defining a message text and storing a mnemonic translation table were previously stored in disc 109 locations and that the file locations for the header and text were included in the "send" command. Accordingly, the first file opened by the data base service is the file containing the message header. Function step 246 of the data base service is then invoked to read out the file and pass the contents into the MAP-ISP 126 working area. Next, function step 247 of the data base service is invoked to close this file. Function 245 is now again invoked, followed by steps 246 and 247, to open a text file, read it out, and close the text file and this sequence is repeated until all text files are read out. If a mnemonic translation is required, function 245 is again invoked, followed by steps 246 and 247, to open the translator file, read it out, and close the file. In step 247, when all files are read out and there is no further need for data base service, the data base storage area is closed. This concludes the data base read service.

As is described in detail hereinafter, the data base read service system also utilizes IC Subsystem 136 in MAP-ISP 126, IC Subsystem 142 in Interprocessor Interface Process 128, Interprocessor Interface Process 129 and IC Subsystem 142 in data base processor 108, TDM bus 112 and IC Subsystem 136 in Data Base Work Manager 131 and Data Base Server 130 to intercommunicate the various requests, instructions and responses between the MAP-ISP 126 process and the DBWM 131 and DBS 130 processes. The data base read system service also utilizes DBWM 131 and DBS 130 to open the files, read out the contents of the files, close the files and close the storage area.

MAP-ISP 126, in accordance with function 248, invokes a store and forward "open" primitive (routine) to form a "connection" with the store and forward system service and then "writes" the header and text files read out of the data base to this connection. This invokes Store and Forward Transfer process (S&FT) 132 which thereupon provides function 249 that stores the header and text, now arranged as a message, in an internal storage area.

MAP-ISP 126, as depicted in function step 250, identifies the end of the transfer of the message to the Store and Forward Transfer process and issues a store and forward "close". MAP-ISP 126, upon closing the message, again becomes available to subsequent commands from the user, issuing a prompt to the user in step 254. When the user, not requiring further service, disconnects, MAP-ISP 126 "terminates".

S&FT 132, upon being issued the store and forward "close", provides function 251 to close the message and initiate a transfer mechanism. This includes determining the node locations of the ultimate destination process and processes. The Store and Forward Transfer process then advances to decision 152 to determine whether an ultimate destination or ultimate destinations are to remote nodes. In the event that at least one of the addressees of the store and forward message is in a remote node, decision 252 advances the transfer process to step 256. In step 256, a connect command is issued to the IC Subsystem of the Store and Forward Transfer process to extend the connection to the corresponding Store and Forward Transfer process in such remote node (or nodes). Upon the completion of such connection, the message is delivered to the remote Store and Forward Transfer process and the local store and forward process thereupon disconnects as depicted in function step 257. In function step 257, the remote Store and Forward Transfer process accepts the message and stores the header and text in an internal storage area. The remote Store and Forward Transfer process is therefore now in the same condition as the originating Store and Forward Transfer process and, in this case, the ultimate destination of the message therein is a process (or processes) in the node local to this remote Store and Forward Transfer process. This advances the system function to function step 259. Alternatively, if the store and forward message is destined to a process in the local node of the originating Store and Forward Transfer process, decision 252 advances the process directly to step 259. Thus, step 259 constitutes the function of the Store and Forward Transfer process (originating or remote) in transferring the message to the Store and Forward Delivery process 131 local to such transfer process. This step involves sending the message file name to S&FD 131 together with the local NSA or NSAs.

The Store and Forward Delivery process in step 260 creates an "item" for each local destination process that will receive the store and forward message. Each item includes information such as the ultimate destination for the message and other parameters such as delivery time for each ultimate destination. In step 261, the Store and Forward Delivery process determines such delivery time for each of the items and, in step 262 notification is sent to the destination process when such delivery time is reached. This notification constitutes a "connect" request forwarded to the IC Subsystem to extend the call to the destination process.

Since the destination process invariably constitutes an application process, the IC Subsystem routes the call to ACP 119 as depicted by step 263. In step 264, ACP 119 conducts the authorization screening and creates the program image and, in step 265, the MAP process is initialized and ACP 119 redirects the connection to connect Store and Forward Delivery process 131 to the created MAP application process. The MAP application process now "checks" for the presence of the message in the Store and Forward Transfer process as depicted in step 268. This includes a command returned to the Store and Forward Transfer process by way of the connection to send an information unit containing message header and/or text information. A message ticket (including all information necessary to handling the message and the message header and text) are thereby transferred from the Store and Forward Transfer process to an internal storage area of the MAP application process. After such delivery, the MAP process disconnects to terminate the connection and, in accordance with data instructions and header information, delivers the message, which delivery may be to a customer terminal identified by the message header and serviced by the MAP process or to data base files of such customer. Accordingly, the communication processing system has delivered the store and forward message to appropriate customer terminals and/or files in accordance with various parameters and addresses contained in instructions in the send command of the originating terminal user and in the header files designated by the terminal user and in the customer's profile stored in the node processor and obtained by MAP-ISP 126 during the program's creation and initialization.

Internal Communication

As discussed above, the capability of a process establishing connections with other processes is implemented by an Internal Communication (IC) Subsystem. This subsystem is part of each end-point process and, when a connection between two end-point processes is formed, the IC Subsystem portion of each end-point process provides the session, transport and network layer functions for the process, as described in detail below. It is noted that the IC Subsystem is also part of interface processes for use when the interface process is an end point. When the interface process is not an end point and used as an interface to connect another process to an external link, the network layer only is utilized.

Figure 9:
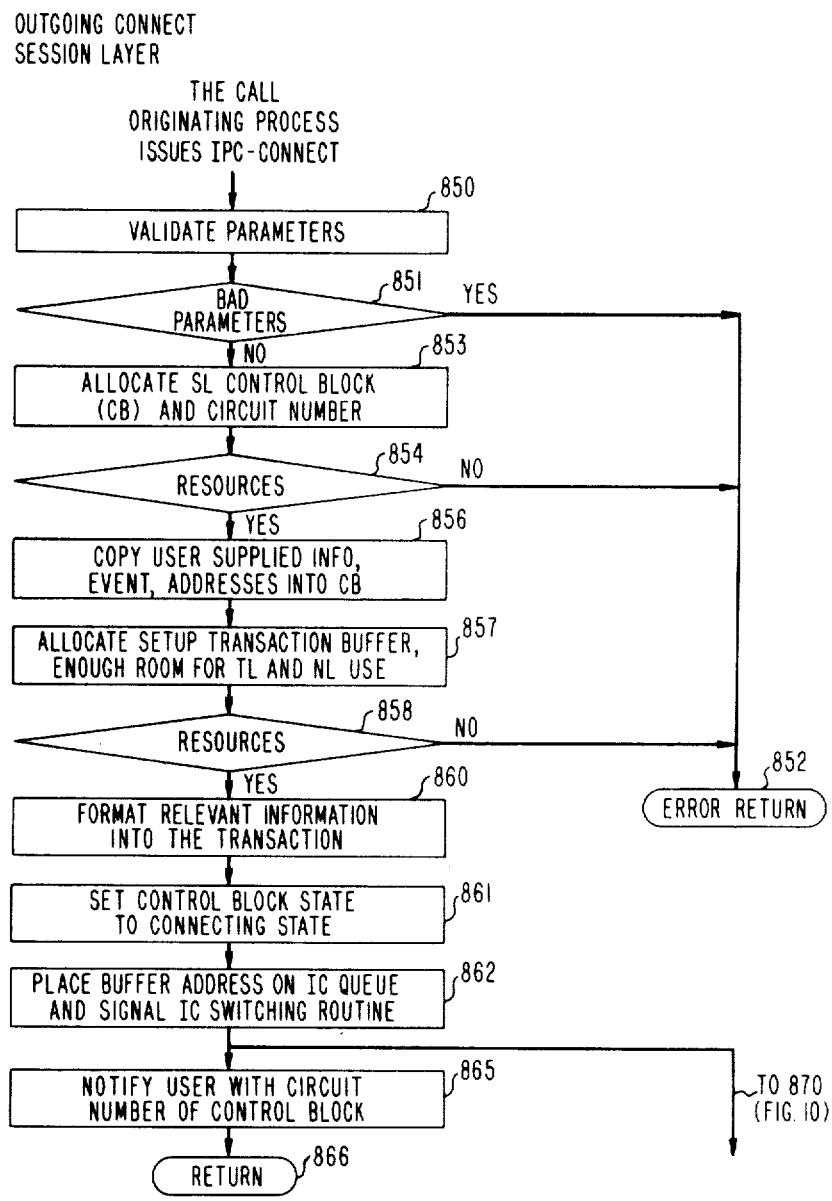

In order to establish a connection, the calling process issues a call to an IPC-Connect routine or primitive (FIG. 9) which provides session layer functions. The calling process also provides both its network standard address (NSA) and the NSA of the called or destination end-point process. In addition, the calling process, upon issuing the call, may provide certain additional parameters. These parameters may include flow control information (window size), a requirement for end-to-end assurance and upper limits of the number of bytes in each information unit (IU) for receiving and sending information.

Upon being invoked, the IPC-Connect (session layer) routine advances to step 850. In step 850, certain parameters are validated, such as the format of the network standard addresses. The routine then advances to decision 851 and decision 851, in turn, advances the routine to step 852 in the event that the validating step indicates that the NSAs have an improper format. In step 852, an error return is generated and returned to the user process to indicate to the user process that the call will not be handled. In addition, control is returned to such user process.

Assuming, however, that the NSAs (and other parameters) have an appropriate format, decision 851 advances the IPC-Connect primitive to step 853. In step 853, an attempt is made to allocate a session layer control block (CB) of memory to store session layer information for this particular connection and, in addition, a circuit number is allocated and placed in the CB (if available) to identify this specific circuit. The routine then advances to decision 854 where a determination is made as to whether resources for this allocation were available.

In the event that resources were not available, decision 854 advances the routine to step 852 where the error return is generated and the control is returned to the user process. Alternatively, if resources are available, decision 854 advances the routine to step 856. In step 856, information supplied by the user process is copied into the CB. This user-supplied information includes the NSAs of the user and the destination endpoint processes and other parameters. The routine then advances to step 857. In step 857, a setup transaction buffer is allocated, the size of the buffer thus allocated including enough room to store connection information that will be provided by this session layer and the subsequently described transport and network layers. The routine then advances to decision 858.

In decision 858, a determination is made as to whether there were adequate resources for the allocated setup transaction buffer. If the resources are inadequate, decision 858 advances the routine to step 852 where an error return is generated and control is returned to the user process. If the resources for the allocated setup transaction buffer are adequate, decision 858 advances the routine to step 860.

In step 860, appropriate transaction information is copied into the setup transaction buffer. It is noted that the setup transaction buffer is structured to store specific types of information in predetermined portions of the buffer. Advantageously, therefore, information such as the NSAs of the user and remote destination processes and the circuit number are inserted in portions of the buffer specifically reserved for this information. User process supplied parameters, such as the upper limit of the number of bytes for sending/receiving each IU, the window size and the requirement (if any) for end-to-end assurance, may also be copied into predetermined portions of the buffer. In addition, data designating this transaction type which, in this case, constitutes a call setup or connect request, is also inserted into the buffer.

After copying the above information into the setup transaction buffer, the routine advances to step 861 where an indication that this circuit is in the connecting state is set into the control block. The routine then advances to step 862 where the buffer address of the setup transaction buffer is placed on an IC queue and a signal is sent to the IC switching routine. The IPC-Connect routine then advances to step 865, the circuit number is obtained from the control block and a notification is returned to the user process, which notification contains the circuit number. The IPC-Connect routine or primitive then advances to step 866 to return a "normal" completion code to the user process.

Figure 10:
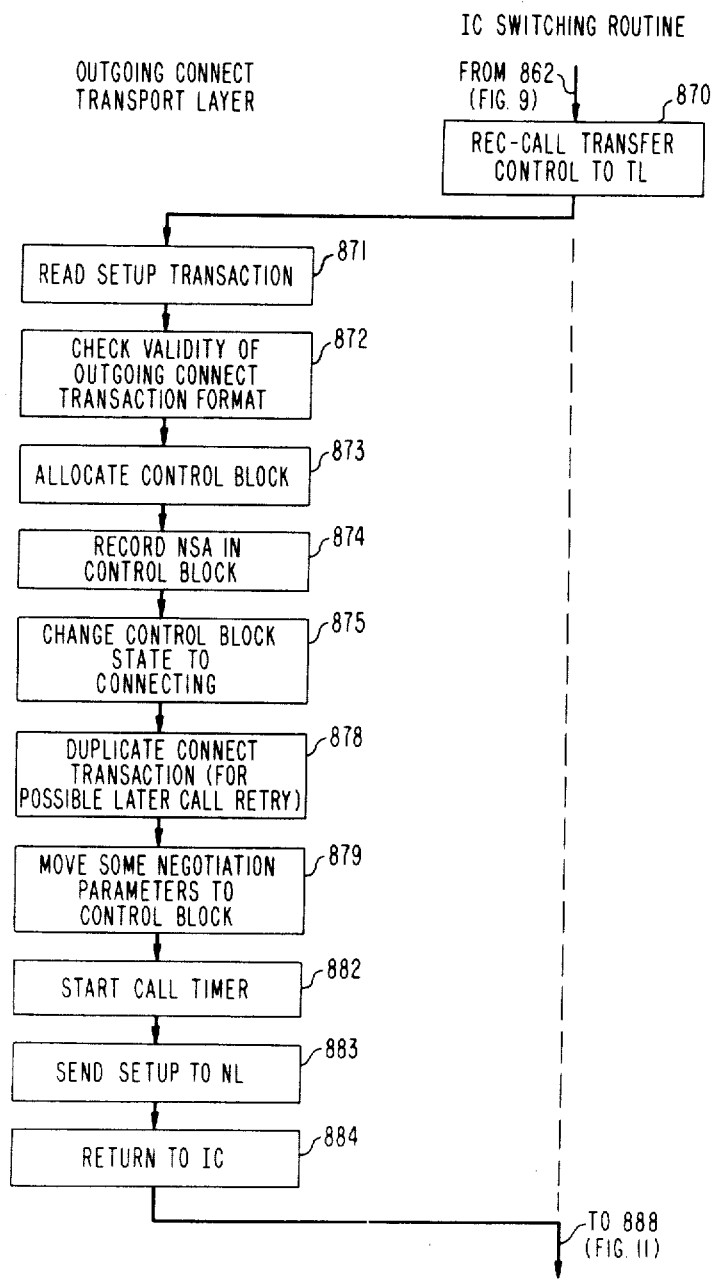

When control is obtained by the IC switching routine from the session layer IPC-Connect routine, the IC switching routine advances to step 870 (FIG. 10). In step 870, the buffer address is obtained from the queue for the transport layer's use and control is passed to the outgoing Transport Layer routine. The outgoing Transport Layer routine, upon being called, advances to step 871. In step 871, the information in the buffer is read out. The routine then advances to step 872. In step 872, the routine notes from the setup transaction buffer that the transaction constitutes a call setup and, upon noting this type of transaction, checks the validity of the other information in the buffer to determine whether the format of the other information is reasonable. Criteria such as the amount of information and content of information may be advantageously used. The routine then advances to step 873.

In step 873, a control block (CB) for the Transport Layer routine is allocated. In step 874, the NSAs of the originating and terminating processes and the circuit number are copied from the setup transaction buffer into the control block. An identification of the state of the transaction layer is set into the control block in state 875, which present state, as previously mentioned, constitutes the call setup or connecting state. At this time, the routine then advances to step 878.

In step 878, the structured information in the setup transaction buffer is copied into a reserve buffer to provide duplicate transaction information. The information is thus saved in the event that there is a later setup retry. The routine thereupon advances to step 879.

In step 879, certain ones of the user parameters are moved from the setup transaction buffer into the Transport Layer routine control block. Such information might advantageously include flow control information (including window size) and a requirement for end-to-end assurance. The routine thereupon advances to step 880 where transport layer parameters, such as the flow control and assurance requirement information, are copied into the setup transaction buffer.

After the Transport Layer routine parameters are copied into the setup transaction buffer, the routine advances to step 882 where a start call timer operation is initiated. The buffer address of the setup transaction buffer is then placed on the IC queue as shown in step 883 and in step 884 the Transport Layer routine returns control to the IC switching task.

If the subsystem is part of an interface process, it is noted that (as described hereinafter) the interface process also passes control to the IC switching routine at this point when processing a connection from a remote machine. (In this event, this IC Subsystem will only provide network layer functions).

Figure 11:
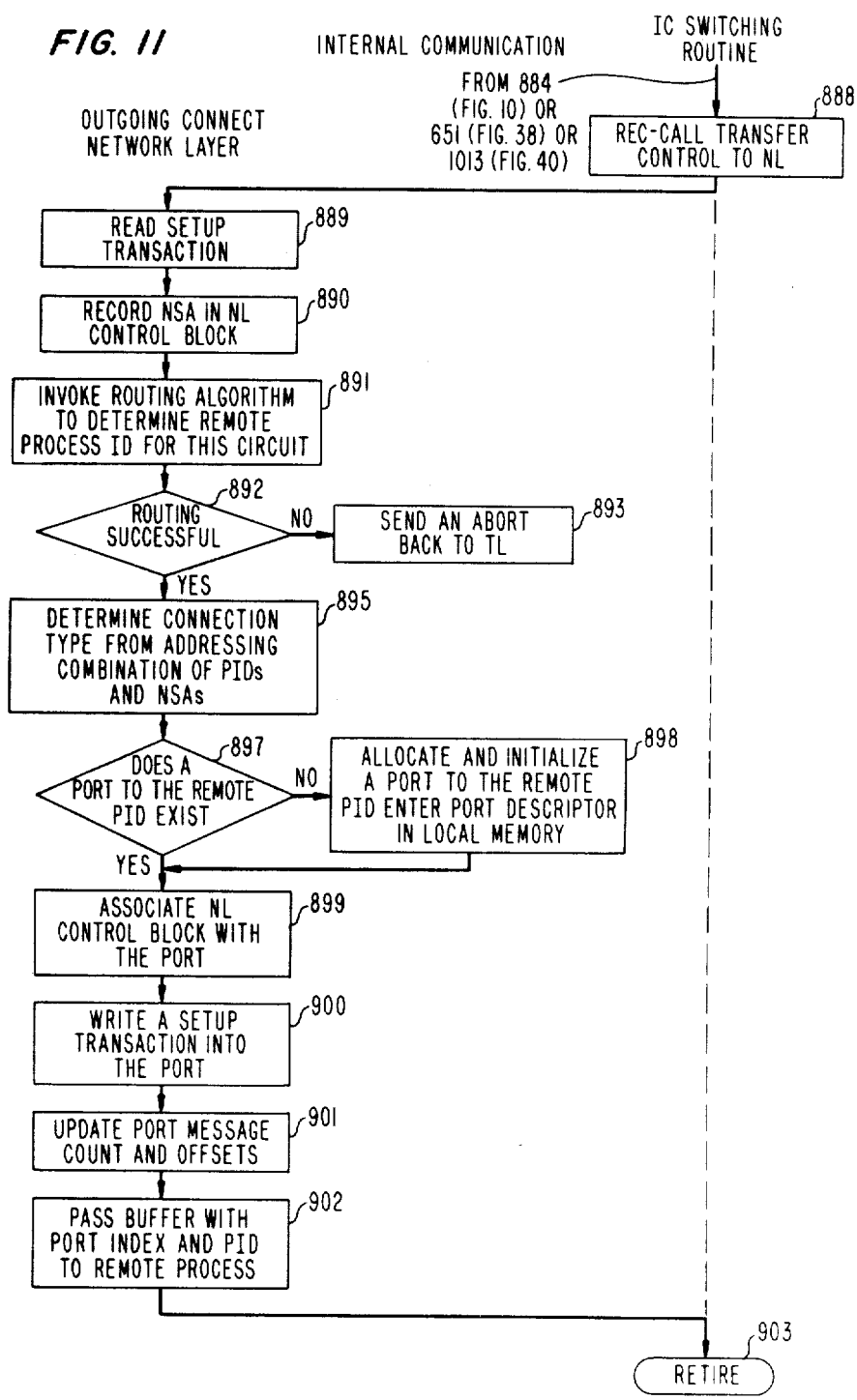

In either of the above events, the IC switching routine, upon obtaining control, advances to step 888 (FIG. 11) where the routine obtains the address of the setup transaction from the queue (or the transaction buffer address from the IPI or TNI interface process) and then transfers control to the Network Layer routine. The Network Layer routine, in turn, advances to step 889 where it reads the transaction. The information from the buffer is then read out and the routine advances to step 890. In step 890, a control block is allocated for the network layer and the NSAs of the end processes are copied from the setup transaction or interface buffer into the Network Layer routine control block and a path descriptor (comparable to the circuit number) is placed in the CB. This advances the outgoing Network Layer routine to step 891.

In step 891, a routing algorithm is invoked to determine the identity (ID) of the process that constitutes the next (or only) link in the connection. More specifically, the NSAs of the terminating end-point and user processes are obtained from the control block and a routing table is accessed to identify an available route between the user and this terminating end-point process. If the terminating end-point process is in the same processor as the user process, the routing algorithm identifies the ID of this terminating end-point process. In the event that the terminating end-point process is in a different processor or machine, the algorithm identifies the ID of the interface process through which the connection will extend.

After invoking the routing algorithm, the Network Layer routine advances to decision 892. In decision 892, a determination is made as to whether the above-described routing has been successful. If there is a lack of success, the routine goes to step 893 to send an abort back to the outgoing Transport Layer routine and return control to the IC switch routine which, in turn, will call such Transport Layer routine. Alternatively, if the routing is successful, decision 892 advances the routine to step 895. In step 895, a determination of the connection type is made by referring to the process IDs and NSAs. More specifically, it is determined whether this connection will go directly to another process in this machine or will go by way of an interface process to a process in another processor or machine. This information is recorded in the Network Layer routine control block.

After the entering of the above-described information, the routine advances to decision 897 where a determination is made as to whether a port to the next process in the link presently exists, which port constitutes buffer memory that will be shared by this outgoing Network Layer routine and the incoming Network Layer routine of the next process. More specifically, this determination is made by comparing the process identity (PID) with the appropriate field of port descriptors in local memory. In the event that a port to the remote process does not exist, shared buffer area is allocated and a port to the PID is thus initialized as depicted in step 898. At the same time, the port descriptor, that is, identification of the PID and the address of the shared buffer, is entered into the local memory. The routine then advances to step 899. Alternatively, if this port is presently in existence due, for example, to another connection existing between the two processes, decision 897 advances the routine directly to step 899.

In step 899, the port to the PID is identified in the Network Layer routine control block. More specifically, a pointer is entered into the control block pointing to the port descriptor which, in turn, points to the address of the port. At the same time, a count in the port descriptor is incremented to indicate to the port that another Network Layer control block is connected thereto. The routine then advances to step 900. In step 900, the information from the setup transaction buffer is written into the port and in step 901 a port message counter and a message pointer are updated. More specifically, the message counter is incremented to indicate an additional transaction in the port and the message pointer is moved to point to the next buffer area in the port available for writing the next transaction.

The routine advances to step 902 which will signal the next process in the link, as identified by the routing algorithm. More specifically, in step 902 a buffer is allocated and the port index is inserted in the buffer. This buffer is then passed to the next process by mapping the buffer into a queue in the address space of such next process, using the PID of the next process as an argument to locate the queue. Control is then returned to the IC Switch routine and in step 903 the IC Switch routine terminates the actions taken by the IC Subsystem of the user process in response to the "connect" request.

Figure 12:
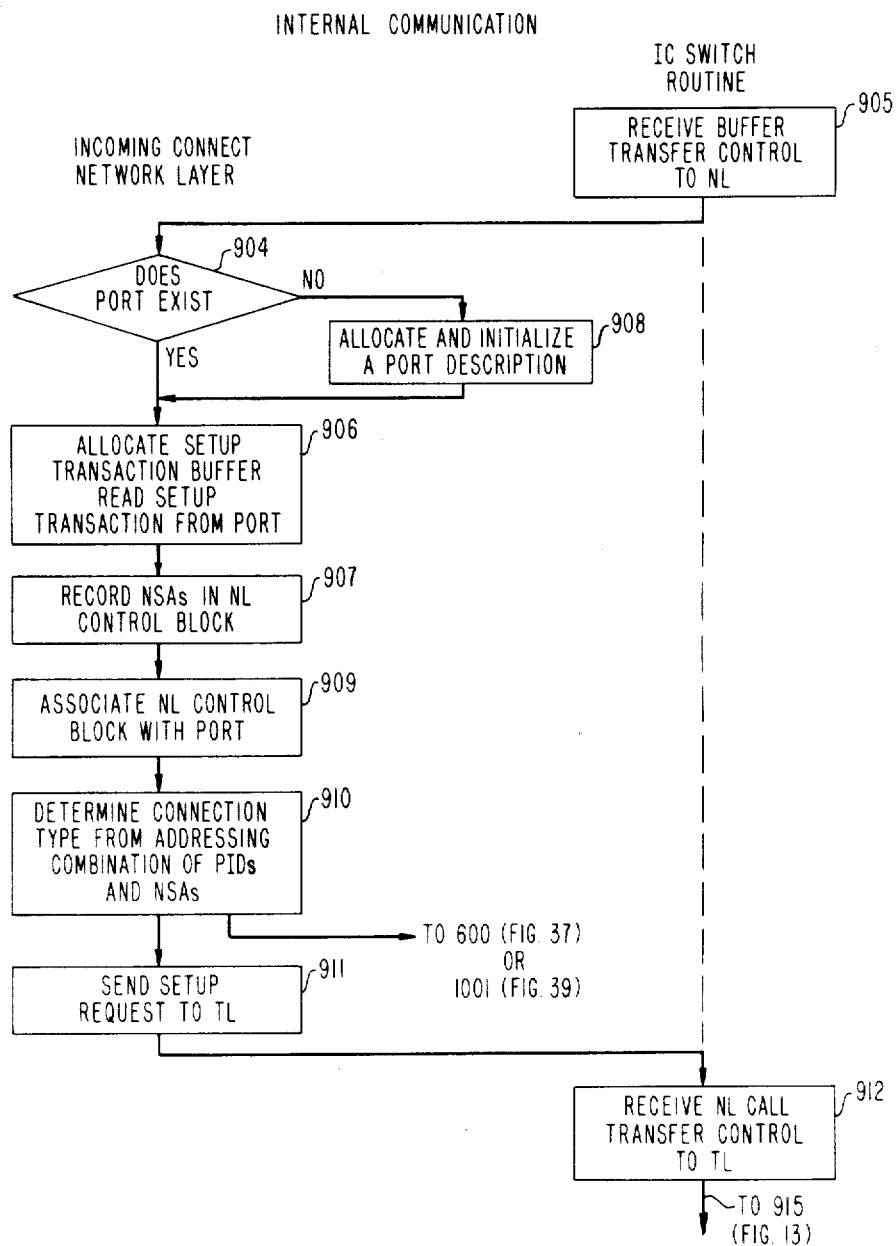

The buffer passed to the next process in the link is received by the IC Switch routine in such text process, awakening the task which advances to step 905 (FIG. 12). The IC Switch routine, in step 905, calls the incoming Network Layer routine and the incoming Network layer initially determines (step 904) whether a port presently exists (which condition would be present if the two processes are involved in another call). If a port does not exist, the routine advances to step 908. In step 908, a port descriptor is allocated and initialized. More specifically, a pointer is created to point to the port identified by the port index that was obtained from the passed buffer. In addition, the ID of the originating (or prior) process is obtained from the setup transaction and copied into the port descriptor with the port index. The routine then advances to step 906.

If a port present exists, decision 904 advances the routine directly to step 906. In step 906, the Network Layer routine allocates a setup transaction buffer, setting aside enough room in the buffer for itself and the transport and session layers. With the port index in the passed buffer available, the incoming Network Layer routine in step 906 copies the transaction contained in the port into the setup transaction buffer. The routine then advances to step 907 and allocates a Network Layer control block. The NSAs in the setup transaction are then copied into the Network Layer control block. Upon completion of the copy of the NSAs the routine advances to step 909. In step 909, the control block is associated with the port by providing a pointer to point at the port descriptor.

After associating the control block with the port, the routine advances to step 910. In step 910, a determination is made of the connection type by reference to the source and destination NSAs and PIDs. More specifically, it is determined whether or not this call is passing through the IC subsystem of an interface process which is an intermediate link to an end process or is presently within a destination or ultimate end process (it being noted that an interface process can be an end process). In the event that this is an interface (IPI or TNI) process which terminates an intermediate link, the routine will then pass control to the Network Layer Interface taks of such interface process, as described in more detail hereinafter. Alternatively, if the IC subsystem is in an ultimate destination process, this routine will then advance by way of a second branch to step 911. In step 911, the address of the setup transaction buffer is placed in the IC queue. The Network Layer routine then returns control to the IC switch, which in step 912 obtains the transaction buffer address and calls the Transport Layer routine.

Figure 13:
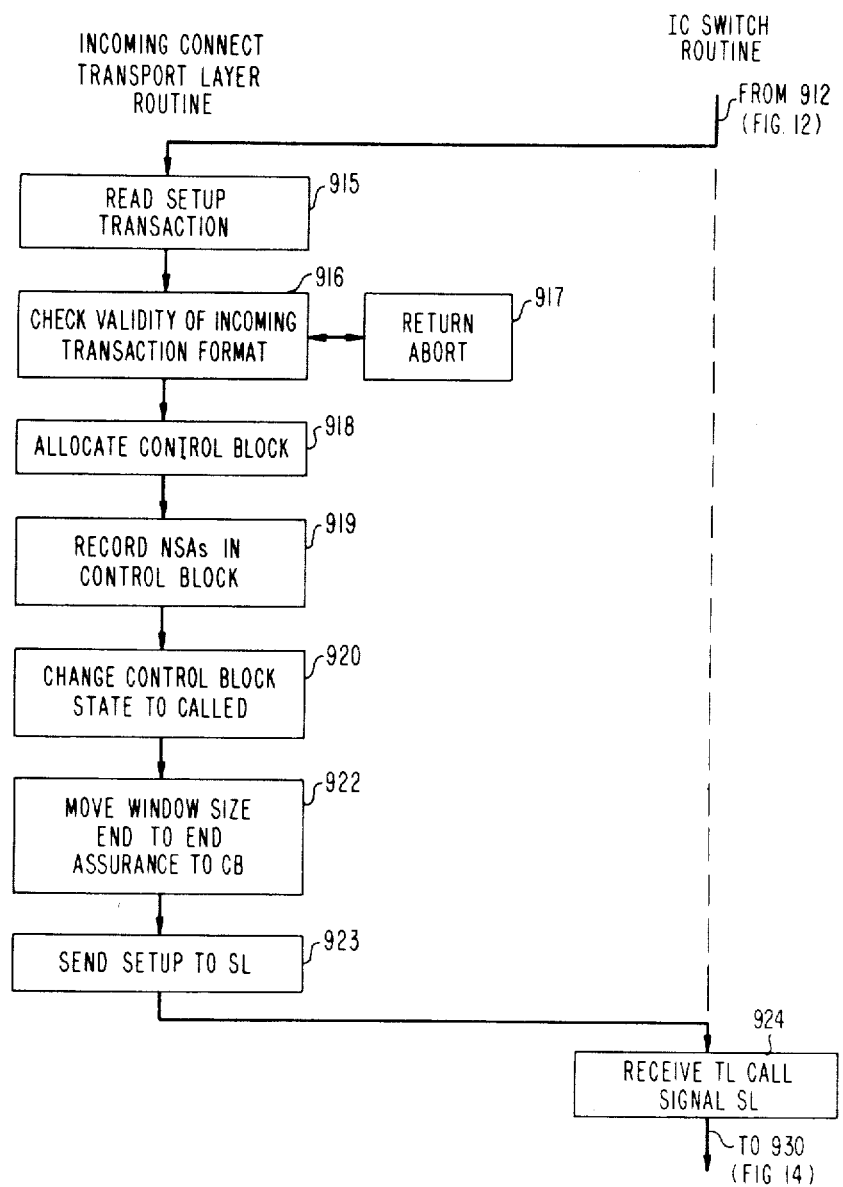

The Transport Layer routine, upon being called, advances to step 915 (FIG. 13). In step 915, the Transport Layer routine reads out the setup transaction. The routine then advances to step 916 where it determines whether the format of this setup transaction is valid. In the event that the format is not within appropriate validity criteria, an abort is returned to the Network Layer routine in step 917 and the routine is terminated by returning control to the IC switch. Assuming, however, that the format is appropriate, the routine advances to step 918 where a control block is allocated. In step 919, the NSAs are then copied from the setup transaction into the control block. The routine advances to step 920 and in step 920 the state of the control block is set to "called". After the called state is set into the control block, the routine advances to step 922.

In step 922, negotiating parameters obtained from the setup transaction are copied into the control block. More specifically, parameters such as the window size and end-to-end assurance requirement are written into the control block. The routine then advances to step 923 where the address of the setup transaction buffer is placed in the IC queue and thereafter control is returned to the IC Switch routine. The IC Switch routine in step 924 then proceeds to obtain the address of the setup transaction buffer and call the Session Layer routine.

Figure 14:
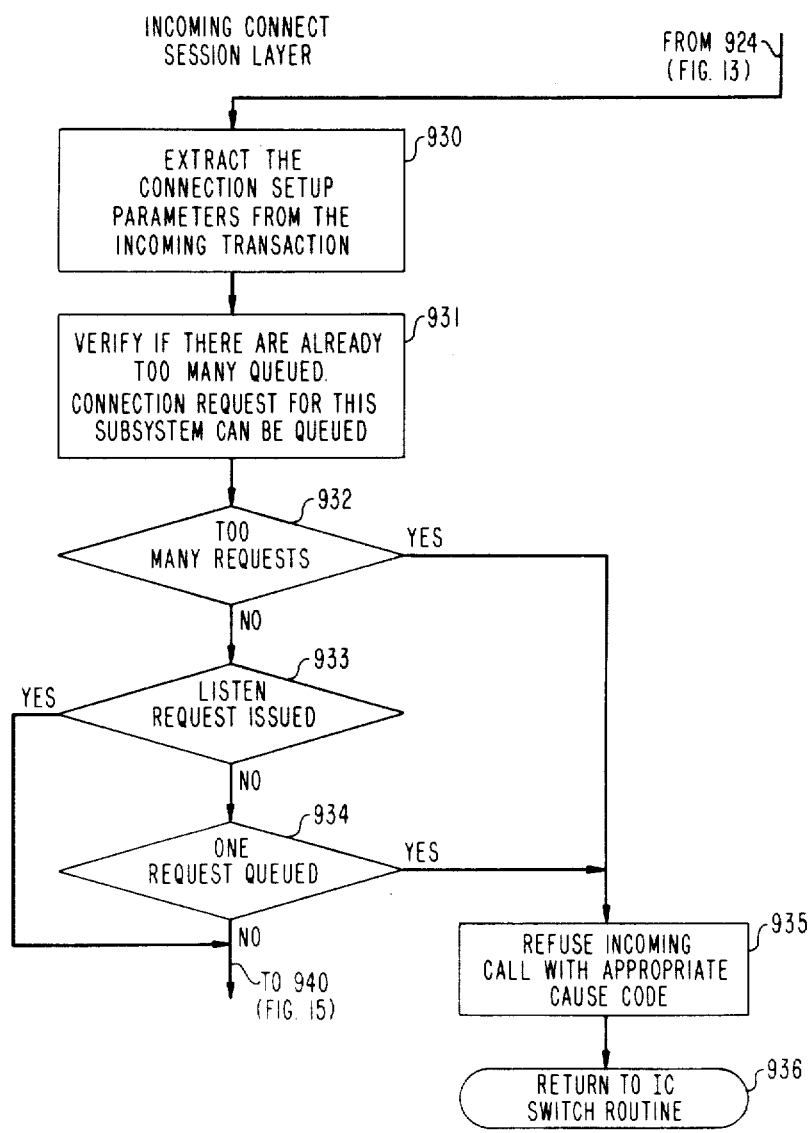

When the Session Layer routine is called, it advances the routine to step 930 (FIG. 14). In step 930, the incoming Session Layer routine extracts the transaction information from the queue, which information includes, for example, the various negotiation parameters such as the window size and the end-to-end assurance requirement. The incoming Session Layer routine then advances to step 931 to determine the number of connection requests that are presently queued for the session layer of this process. When that determination is made, the routine advances to decision 932. In accordance with decision 932, if there are too many requests presently queued for this connection, the routine advances to step 935. In step 935, the incoming call is refused and an appropriate refuse response is returned to the outgoing Transport Layer routine. The Session Layer routine then goes to step 936 which will return control to the IC switch, the IC switch in this case terminating the operation of the IC Subsystem.

Assume now that there are a limited number of queued requests which are fewer than a selected threshold. In this case, decision 932 advances the Session Layer routine to decision 933. In step 933, the routine determines whether or not this user process has issued an IPC-Listen request (described below). If an IPC-Listen request has not been issued, the Session Layer routine advances to decision 934. If at least one unsatisfied request is presently queued, decision 934 advances the routine to step 935 wherein a refuse is returned to the Network Layer routine, as previously described, and control is returned to the IC Switch routine to end the call by terminating the operation of the IC Subsystem.

Figure 15:
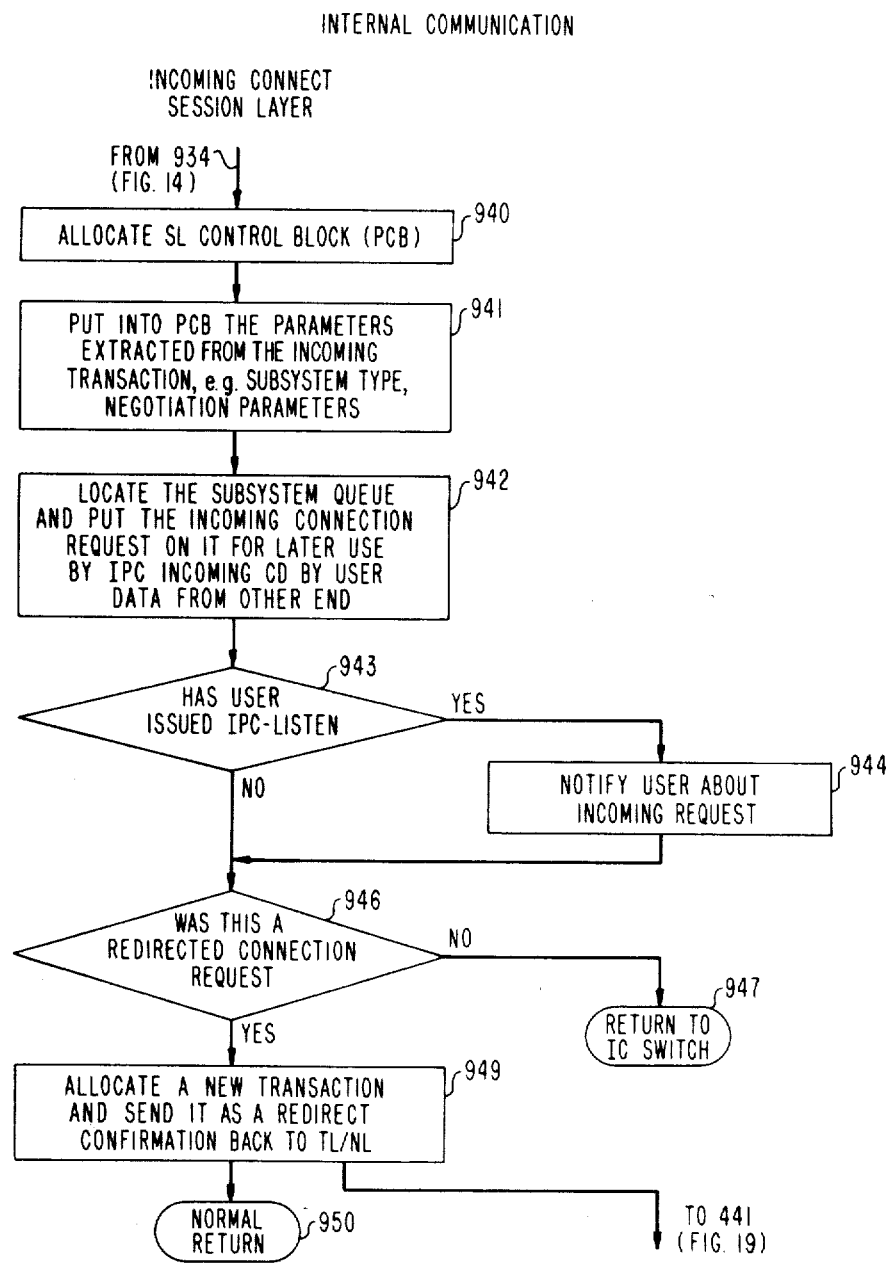

Assuming that the user process has issued a "listen" request or alternatively, if such a request has not been issued by no other requests are queued and waiting, then either decision 933 or decision 934 advances the Session Layer routine to step 940 (FIG. 15).

In step 940, a control block is allocated for the Session Layer routine. The routine advances to step 941 and at this time information from the incoming setup transaction (such as negotiation parameters) is copied from the transaction buffer into the control block. The routine then advances to step 942 and in step 942 the incoming connection request is placed on the SL subsystem queue for later use by the user process. More specifically, the information will be subsequently used hereinafter by the IPC incoming CD routine invoked by the user process. This information, as placed on the queue, will include the NSAs, the negotiating parameters and the circuit number. In addition, certain user data may also be included (such as data provided to open up the database which is described in detail hereinafter). After all of this information is placed on the SL subsystem queue, the routine advances to decision 943. In decision 943, a determination is made as to whether the user process has issued an IPC-Listen request. If such a request has been issued, decision 943 advances the routine to step 944. In step 944, the user process is notified that the incoming connection request has been placed on the SL subsystem queue. The routine then advances to decision 946. Alternatively, if the user process has not issued an IPC-Listen request, decision 943 advances the routine directly to decision 946.

Decision 946 determines whether or not this is a "Redirected" connection request (described in detail below). In the event that this does not constitute a "Redirect" request, the routine advances to step 947. Step 947 returns control to the IC switch whereupon the routine terminates and returns control to the IC Switch routine for normal termination. At this point, the request awaits removal from the subsystem queue by the IPC incoming CD primitive.

Assume now that this constitutes a Redirect Connection request. In that event, decision 946 advances the routine to step 949. Under this condition a new transaction buffer is allocated and a "redirect confirmation" is copied into the buffer. The buffer address is then placed on the Transport Layer routine queue. The routine then advances to step 950 where it returns to the IC Switch routine for normal termination.

Figure 16:
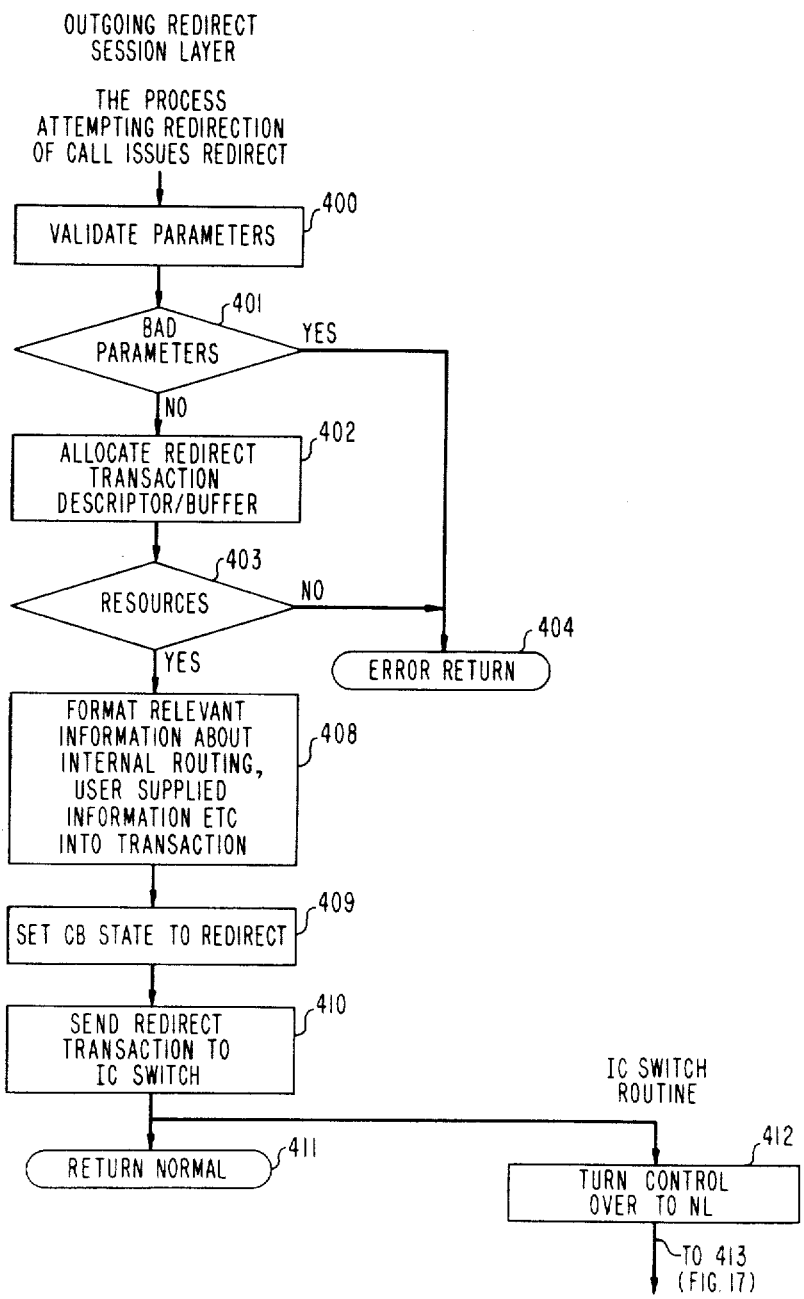

As previously noted, when an application process is called, the call connection is initially directed to ACP process 119 which, in part, determines whether the application process is in existence and, in the absence thereof, initiates the creation of the program image of the application process. Thereafter, the ACP process redirects the previously setup connection to the application process (MAP-ISP 126, for example) and drops out of the connection. The resultant connection is therefore between the originating user process and the application process. "Redirection" can also be initiated by other (called) processes (DBWM 131, for example) to redirect calls to other types of terminating end-point processes (such as DBS 130). In any event, the (called) process initializes this redirecting of the connection by invoking a "redirect" primitive in its IC Subsystem 136 (which primitive may be considered as constituting the internal communication session layer). This advances the primitive to step 400 (FIG. 16).

In step 400, the "redirect" primitive validates the parameters of the command issued by the (called) process. This validation step can be considered as being substantially identical to the previously described validating step 850 provided by the outgoing-connect Session Layer routine of a process making a call differing only in that there may be minor differences in the substance of the parameters. The routine (or primitive) then advances to decision 401.

In decision 401, a determination is made as to whether the parameters validated are appropriate. If they are inappropriate, decision 401 advances the routine to step 404 where an error and abort command is generated and returned to the (called) process, terminating at the same time the "redirect" routine. alternatively, if the parameters are appropriate, decision 401 advances the routine to step 402.

In step 402, a redirect transaction descriptor-buffer is allocated with enough buffer area for the redirect command and for header data that will be inserted by the several layers. The routine then advances to decision 403 where a determination is made as to whether or not there were adequate resources for the buffer. If the resources are inadequate, decision 403 advances the routine to step 404 where an error message is generated and returned to the user process and the connection is aborted. Alternatively, if there are adequate resources, decision 403 advances the routine to step 408.

In step 408, user process supplied information in the command is "formatted" into the redirect transaction descriptor-buffer, such formatting and the information thus formatted being substantially identical to the format and information provided in the previously described step 860 in the outgoing-connect Session Layer routine. Step 408 of the "redirect" primitive differs, however, in that the ultimate end-point process ID, which is supplied, in this case, by the redirecting (called) process, is at this time inserted in the redirect transaction descriptor-buffer. The routine now advances to step 409 and in this step the state of the control block (priorly allocated and formatted during call setup) is set to "redirect". The routine now advances to step 410 and in step 410 the address of the transaction descriptor-buffer is placed on the IC queue. At the same time, the IC Switch routine is signaled and the routine advances to step 411 where it returns "normal" to user process.

The IC Switch routine, upon being signaled, advancs to step 412. In step 412, the IC switch task proceeds to obtain the address of the transaction descriptor-buffer from the queue and then turn over control to its outgoing "redirect" Transport Layer routine. This advances the Transport Layer routine to step 413.

Figure 17:
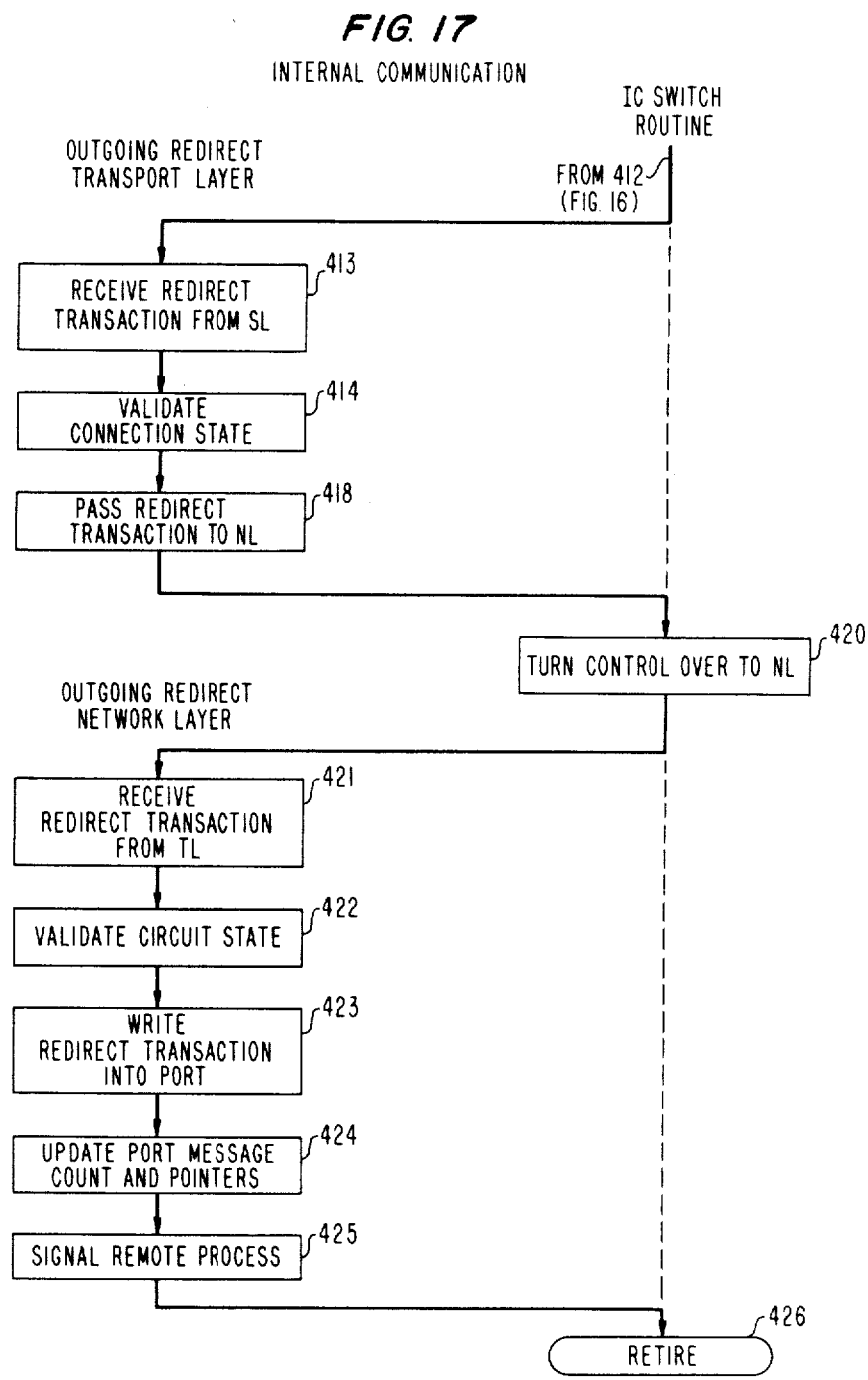

In step 413 (FIG. 17), the outgoing "redirect" Transport Layer routine reads the "redirect" transaction. This advances the routine to step 414 which validates that the present state of the transport Layer control block is the "connect" or "setup" state and changes the state to "redirect". The routine then advances to step 418 and the buffer address of the redirect transaction descriptor is placed on the IC queue and control is passed back to the IC switch.

In step 420, the IC switch task now obtains the buffer address of the descriptor from the queue and turns control over to its outgoing-redirect Network Layer routine. This advances the routine to step 421. In step 421, the redirect transaction descriptor is obtained from the buffer. The routine then advances to step 422 and the present state (setup or connection) of the Network Layer control block is validated and the control block is set to the new "redirect" state. The routine thereupon advances to step 423.

In step 423, the identification of the shared port used in the original connection setup is made and the "redirect" transaction is written into the port. The routine thereupon advances to step 424 where the port message count and the port pointers are updated (in a manner similar to the previously described updating step 901 in the outgoing setup or connection Network Layer routine). At this point, the outgoing redirect Network Layer routine advances to step 425 wherein it signals the remote process at the other end of the connection which, in this case, is the process originally setting up the connection and passes a buffer with the port index and the port ID to this originating process. The outgoing redirect Network Layer routine then returns control to the IC Switching routine which, in step 426, proceeds to retire and terminate the IC Subsystem functions.

Figure 18:
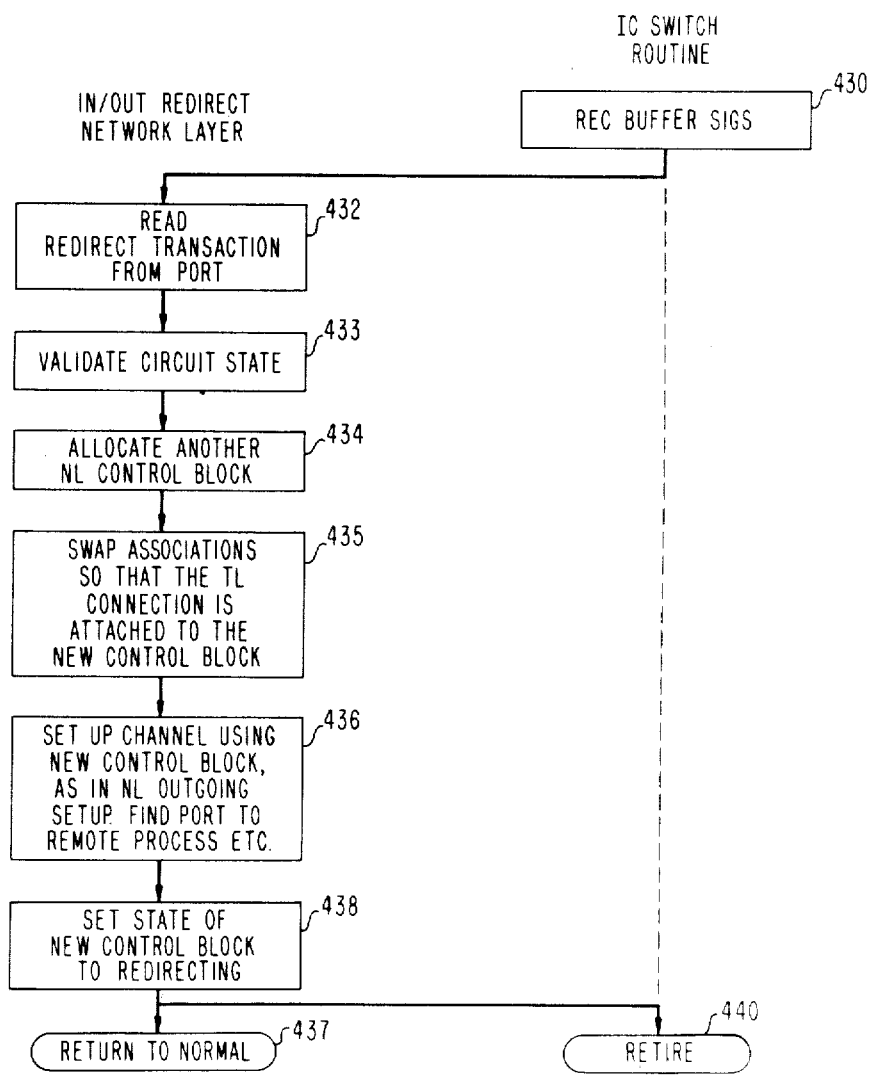

In the originating or source process, the IC Switch routine is awakened by the signal received from the process originating the "redirect" request. The IC Switch routine, in step 430 (FIG. 18), then turns over control to its incoming/outgoing redirect Network Layer routine. The Network Layer routine thereupon advances to step 432 wherein it obtains the passed buffer identifying the port ID and containing the port index. In step 432, the Network Layer routine allocates a transaction buffer and, utilizing the port identification from the passed buffer, proceeds to read the transaction from the port into the allocated transaction buffer. The routine then advances to step 433 where it validates that the control block is presently in the "setup" state and changes this state to "redirect requested". At this time the routine advances to step 434 where it proceeds to allocate another Network Layer control block (in addition to the CB allocated during call setup). The routine then advances to step 435.

In step 435, the old path descriptor in the old control block is swapped into the new control block. This will prepare an arrangement for the Transport Layer control block to be now associated with the new control block. At this point, the routine advances to multiple step 436 which corresponds to steps 891–902 in the outgoing Network Layer routine previously described. More specifically, in step 436 the routing algorithm is invoked to determine the remote process ID for this circuit, a connection type is determined and the Network Layer control block is associated with a port shared with such remote process. The "redirect" transaction is thereupon written into the port and the message counter and pointers are updated, the remote process is signaled and a buffer with the port ID and the port index is passed to the remote process. Meanwhile, the Network Layer routine advances to step 438 where the routine sets the state of the new control block to "redirecting". Control is then passed back to the IC switching routine which in step 440 retires. The routine then advances to step 437 where it returns to normal.

The IC switching task in the ultimate destination end-point (callee) process, upon receiving the signal and the passed buffer, awakens and passes control to its incoming Network Layer routine. The Network Layer routine thereupon institutes a series of steps which are identical to the steps taken by the incoming Network Layer routine during the call setup state. Control is then passed on through the incoming Transport Layer routine and incoming Session Layer routine which correspondingly proceed through the same function steps as previously described for the incoming Transport Layer routine and the incoming Session Layer routine during call setup. Consequently, the transaction is passed to the callee or terminating end-point process (in the event that is has issued a "listen" request). As a consequence, the terminating end-point process is now notified that there is an incoming call and that a connection has now been prepared from the originating end-point process to the callee or terminating end-point process, subject to the callee's acceptance.

Figure 19:
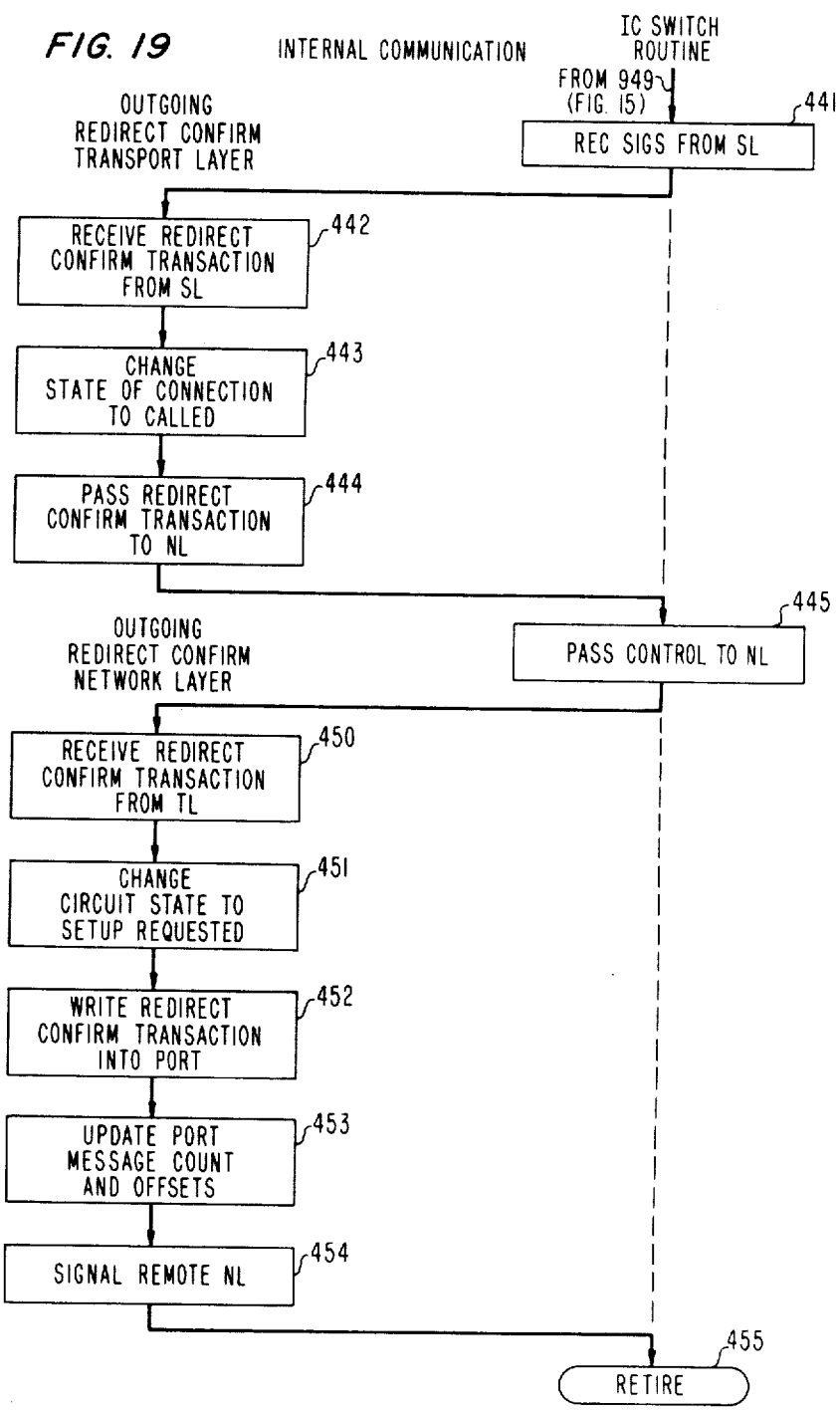

As previously noted, with respect to decision 946 of the incoming-connect Session Layer routine, a determination is made as to whether the transaction constitutes a "redirect-connection" request. In this case, the request is a "redirect-connection" request and decision 946 advances the Session Layer routine to step 949 where a new transaction buffer is allocated, a "redirect confirmation" transaction (command) is generated and placed in the buffer, the buffer address is placed on the IC queue and control is returned to the IC Switch routine. The IC Switch routine, in turn, as depicted in step 441 (FIG. 19), obtains the buffer address from the IC queue and then turns control over to its outgoing-redirect-confirm Transport Layer routine.

The outgoing-redirect-confirm Transport Layer routine, in step 442, obtains the confirmation transaction and identifies this transaction type. In step 443, the Transport Layer routine then changes the state of the connection in its control block to "called". Then, in step 444, the Transport Layer routine places the buffer address of the confirmation transaction on the IC queue and turns control back to the IC switch. In step 445, the IC switch obtains the buffer address and passes control to the outgoing-redirect-confirmation Network Layer routine.

In step 450, the outgoing Network Layer routine obtains the transaction. In step 451, the Network Layer routine changes the state of the connection (as identified in its control block) to "setup requested". The Network Layer routine then advances to step 452 where it writes the confirmation transaction into the port that it now shares as part of the connection between the callee or terminating end-point process where the routine runs and the originating end-point process. In step 453, the Network Layer routine updates the port message counter and pointers. The routine advances to step 454 where it passes a buffer identifying the port ID and port index to the remote originating end-point process and returns control to the IC switch routine which in step 455 retires.

Figure 20:
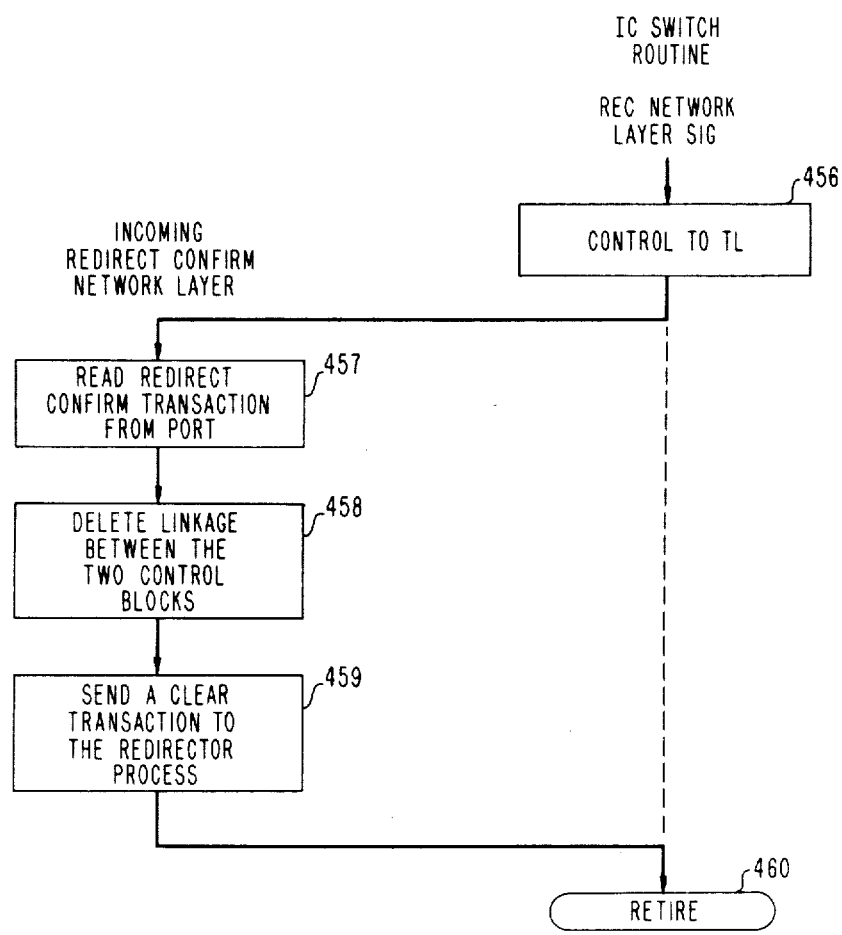

At the caller (originating) end-point process, the IC Switch routine picks up the signal from the network layer of the callee process. This awakens the task which in step 456 (FIG. 20) obtains the address of the port from the passed buffer and passes control to the incoming-redirect-confirmation Network Layer routine. The Network Layer routine in step 457 allocates a transaction buffer and reads the transaction from the port into the allocated buffer. The routine now advances to step 459 where it deletes any association between the two Network layer control blocks of the "originating" and the "redirecting" processes to preclude subsequent information from passing between the process requesting the "redirect" and the originating end-point process. At the same time, a "clear" command or transaction is generated and passed on to the process requesting the "redirect". This will result in the remote "redirect" requesting process clearing and disconnecting the connection, as explained in more detail hereinafter. At this point, the Network Layer routine returns control to the IC Switch routine which in step 460 retires.

Figure 21:
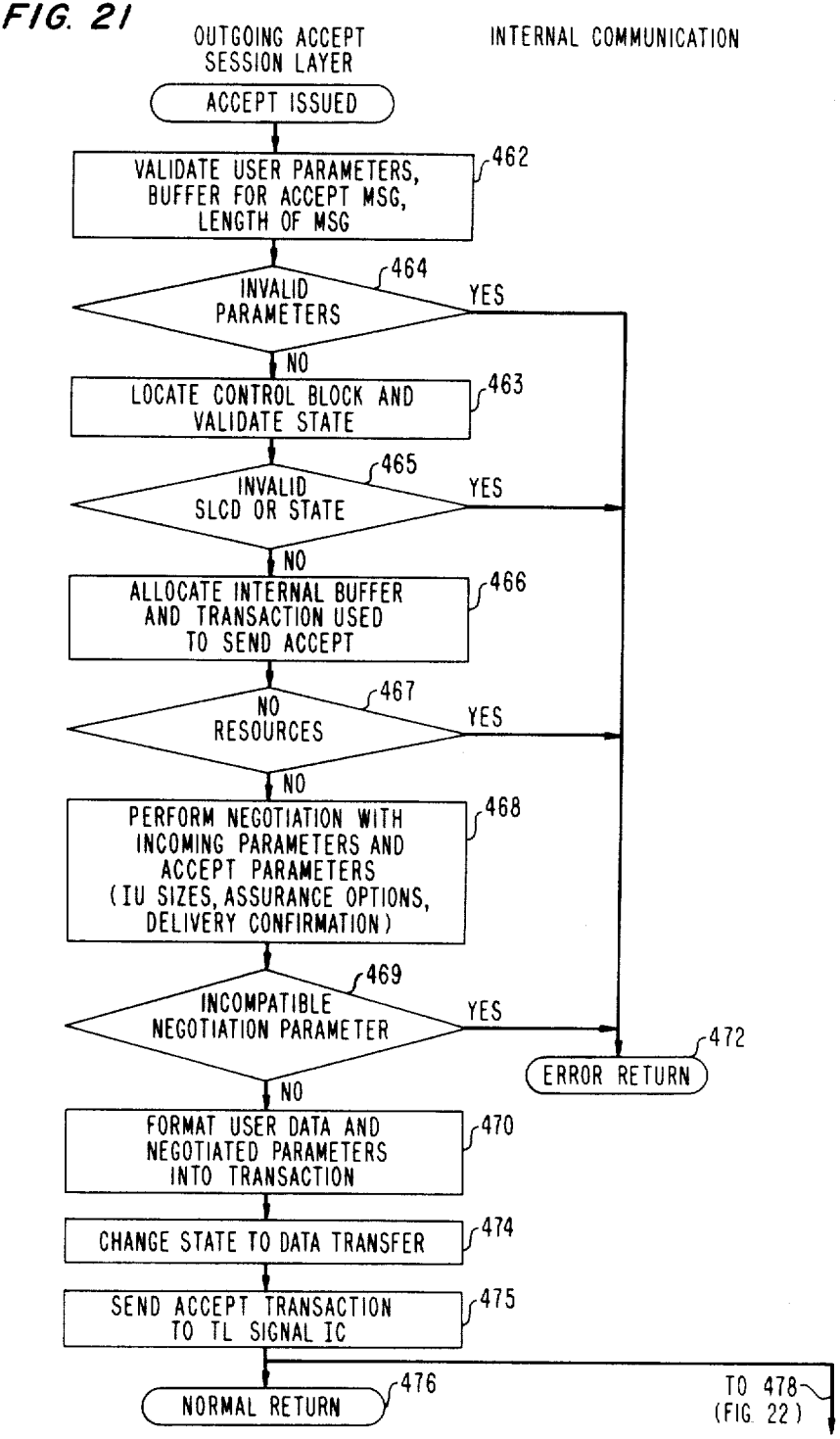

When a terminating end-point process has allocated a buffer for storing a received "connect" request or a "redirect" request, has issued a "listen" request and has received an incoming "connect" or "redirect" transaction from its session layer, it accepts this incoming request by issuing an "accept". This invokes an "Accept" primitive which constitutes the outgoing Session Layer. The primitive upon being invoked advances to step 462 (FIG. 21).

In step 462 this Session Layer primitive (or routine) verifies certain parameters provided by the "accepting" process. For example, in this step the Session Layer routine verifies that it has received an appropriate location for the user buffer for storing the "connect" (or "redirect") transaction and has been supplied a buffer for defining the length of the transaction or message. The routine then advances to decision 464 which determines whether these parameters are within acceptable limits. If the parameters are invalid, the routine proceeds to step 472 which generates an error indicating message to be returned to the user process. In addition, step 472 terminates the routine.

Assuming that the parameters are within the proper limits, decision 464 advances to step 463. In step 463, the Session Layer control block is located and the present (connect) state is validated. In decision 465, it is determined whether the control block is in the appropriate state and, if the state is inappropriate, the routine advances to step 472 which returns an error message, as described above. Assuming that the control block is in the appropriate state, the routine advances to step 466. In step 466, the Session Layer routine allocates a transaction buffer, generates a transaction (accept) message and writes the user supplied message into the buffer. In decision 467, if there are inadequate resources for the transaction buffer, the routine advances to step 472 where the error message is generated and returned as described above. If the resources are adequate, decision 467 advances the routine to step 468.

In step 468, the above-described parameters received from the originating end process are examined and compared with parameters received from the accepting terminating end (user) process. These include such parameters as the size of the information unit, various assurance options and delivery confirmation. In step 468, a determination is made as to whether there is compatibility of the negotiating parameters of the originating end and terminating end processes. If these parameters are incompatible, decision 469 advances the routine to step 472 where an error message is generated and returned to the accepting process. Alternatively, if the parameters are compatible, decision 469 advances the routine to step 470 where user data including the negotiated parameters are formatted into the transaction buffer. The routine then advances to step 474 where the state of the control block is changed to "data transfer". In step 475, the address of the transaction buffer is placed on the IC queue and the IC Switch routine is signaled. The routine in step 476 then returns to normal.

Figure 22:
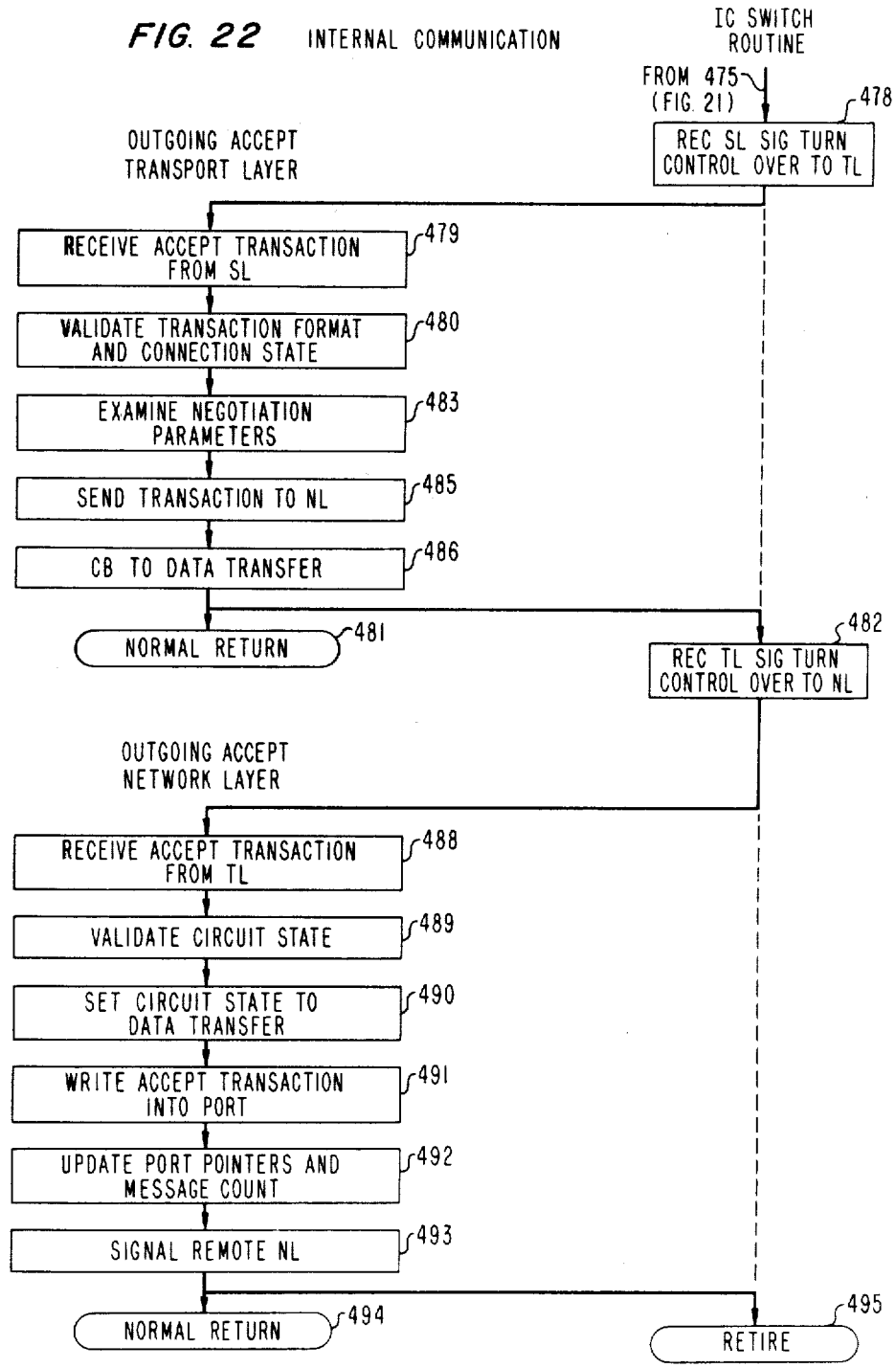

The IC Switch routine in step 478 (FIG. 22) is awakened by the signal from the session layer. In step 478, the routine obtains the buffer address of the "accept" transaction from the queue and turns control over to its outgoing accept Transport Layer routine. This advances the Transport Layer routine to step 479 where, when control is transferred to it, it obtains the accept transaction. The routine then advances to step 480 to validate the transaction format and confirm the present state in the control block (which present state, as described above, is either "connect" or "redirect"). The routine then advances to step 483 where it extracts certain of the negotiated parameters from the transaction (such as end-to-end assurance, delivery confirmation and/or window size). The routine then advances to step 485 and, in this step, places the address of the transaction buffer on the IC queue and turns control back to the IC Switch routine. Thereafter, in step 486, the Transport Layer routine changes the state of the control block to "data transfer" and, in step 481, returns to normal.

The IC Switch routine, upon being returned control, goes to step 482. In step 482, it proceeds to obtain the address of the transaction buffer from the queue and pass control to its outgoing accept Network Layer routine. This advances the outgoing accept Network Layer routine to step 488. In step 488, the Network Layer routine obtains the transaction from the buffer. In step 489, the Network Layer routine validates the state of the connection defined by the control block. In step 490, it changes this state to "data transfer". The routine then advances to step 491 and, in this step, writes the "accept" transaction into the port shared by the terminating end process (which is the user process) and the originating end process. In step 492, it updates the port message and the port pointers. In step 493, the remote originating end process is signaled via a buffer passed to the remote process identifying the shared port address. Control is then returned to the IC Switch routine and in step 494 the Network Layer routine returns to normal. In the meantime, in step 495, the IC Switch routine, upon obtaining control, proceeds to retire.

Figure 23:
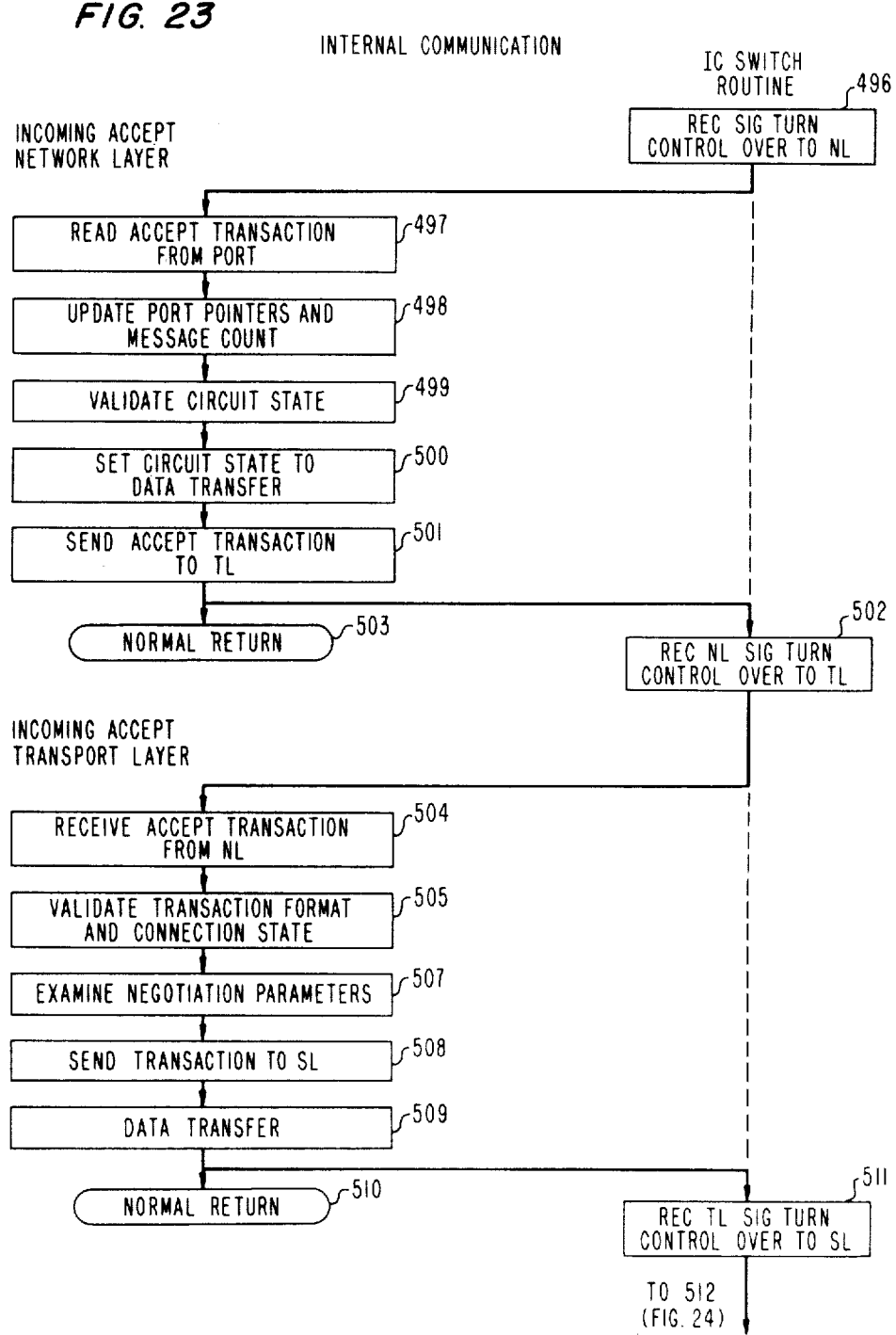

At the remote originating end-point process, the IC Switch task is awakened by the signal from the accepting process. The IC Switch routine in step 496 (FIG. 23) proceeds to turn control over to its incoming accept Network Layer routine and the Network Layer routine advances to step 497. In step 497, a transaction buffer is allocated and the transaction in the port is written into this transaction buffer. In step 498, the port pointers and message counter are updated. The control block circuit state ("connect" or "redirect") set into the control block is validated in step 499. This circuit state is changed to "data transfer" in step 500. The routine then advances to step 501 where it places the address of the transaction buffer on the IC queue, passes control back to the IC Switch routine and advances to step 503 where it returns to normal.

The IC switch task upon regaining control advances to step 502 and, in this step, obtains the address of the transaction buffer from the queue and transfers control to its incoming accept Transport Layer routine. This advances the Transport Layer routine to step 504 where it obtains the transaction. In step 505, the format of the transaction is validated as is the connection state in the control block. In step 507, negotiation parameters in the transaction are examined; end-to-end assurance, delivery confirmation and window size parameters are extracted and placed in the control block. The address of the transaction buffer is then placed on the session layer queue in step 508. The routine then advances to step 509 where it changes the "connect" state in the control block to "data transfer". The routine then advances to step 510 where it returns to normal and sends control back to the IC Switch routine.

Figure 24:
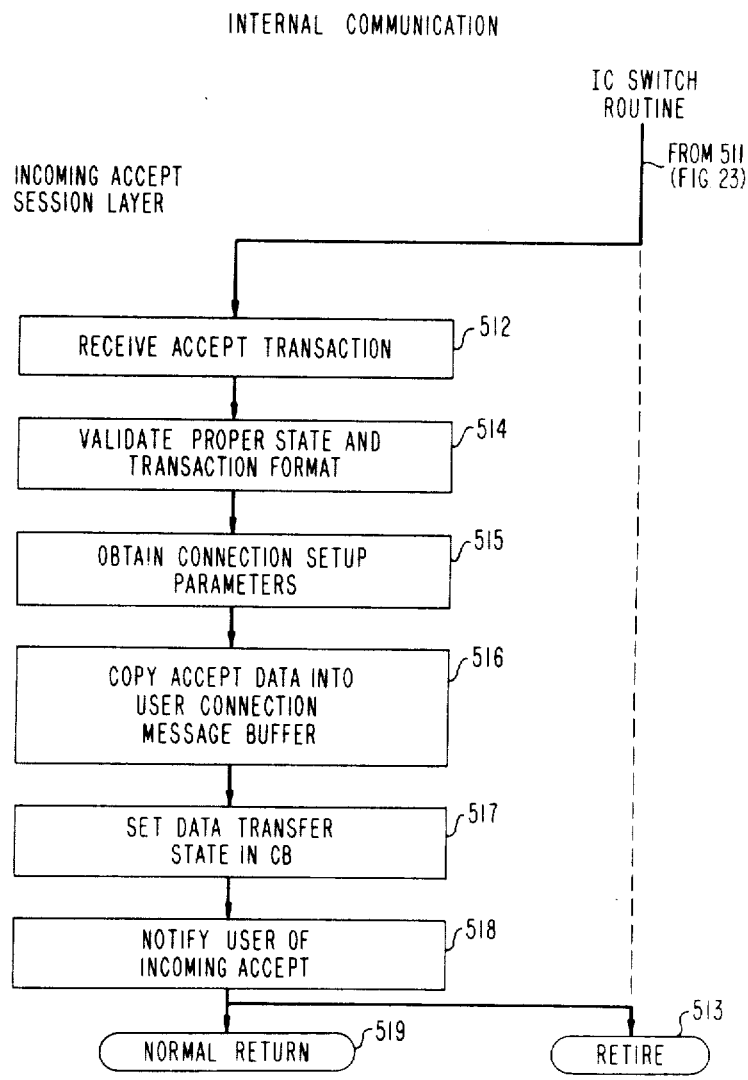

The IC Switch routine, upon returning control, obtains the transaction buffer address and passes control to the incoming accept Session Layer routine as depicted in step 511. This advances the incoming accept Session Layer routine to step 512 (FIG. 24) where it obtains the transaction from the buffer. In step 514, the Session Layer routine validates the format of the transaction and identifies that the connection state of the control block is appropriate. In step 515, the Session Layer routine examines the negotiation parameters and copies these parameters into its control block. In step 516, the Session Layer routine then writes the transaction data into the message buffer supplied by the user process. The Session Layer routine then advances to step 517. In step 517, the control block state is set to "data transfer". The routine then advances to step 518 where the user process is notified that the "accept" transaction has been received. The routine then advances to step 519 which returns the routine to normal and also returns control to the IC Switch routine, which retires in step 513.

Figure 25:
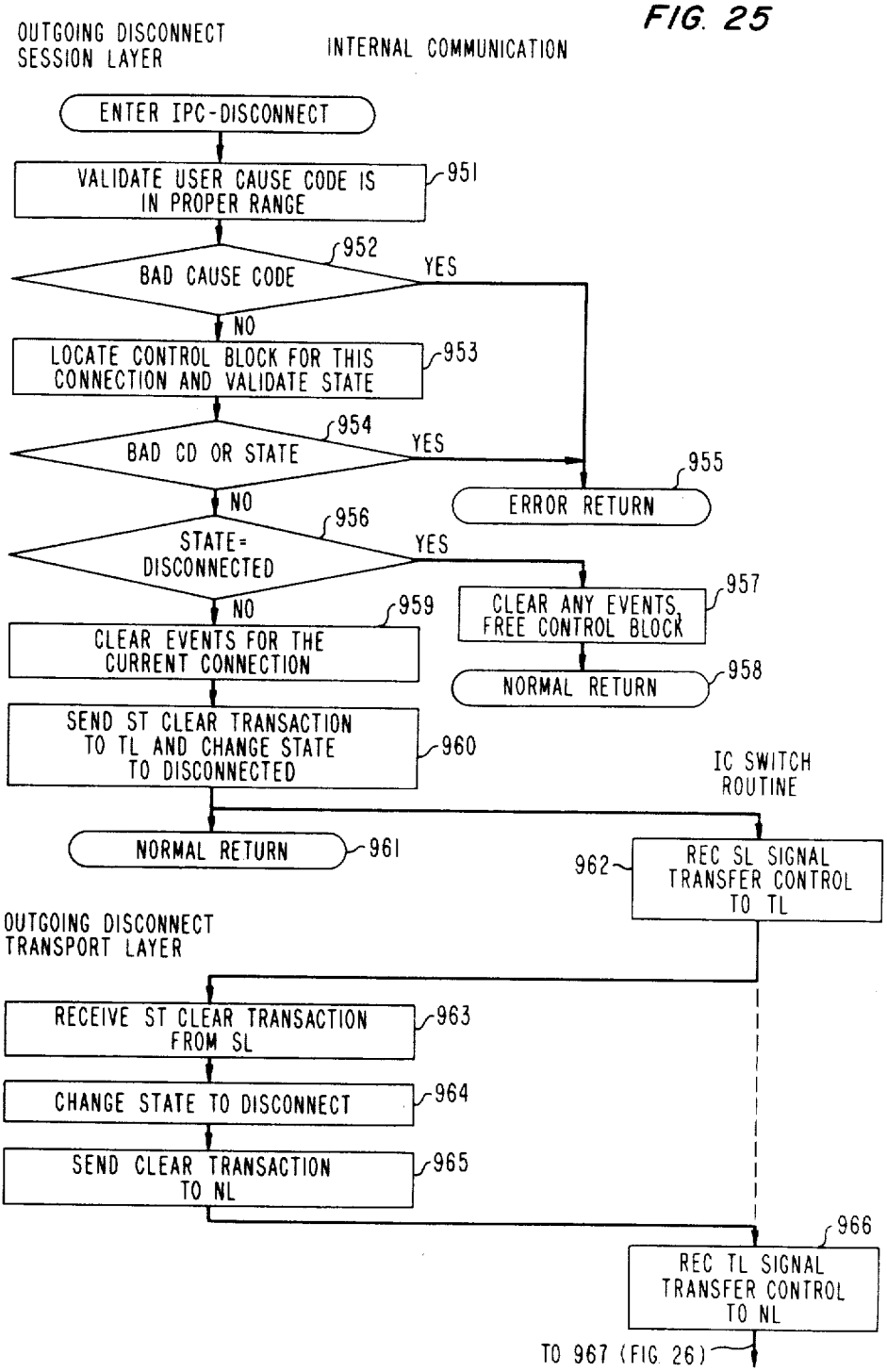

Either one of the end-point processes will desire to terminate the connection after the communication session has been completed or if there has been an error condition arising during a transaction. To terminate the connection, the user process issues a "disconnect" primitive specifying an optional cause code. This primitive constitutes the outgoing Session Layer routine. Upon being invoked, the Session Layer routine advances to step 951 (FIG. 25).

In step 951, the Session Layer routine confirms that the cause code calling for the disconnect is within an appropriate range. The routine then advances to decision 952. If the code is beyond the proper range, decision 952 advances the routine to step 955 where an error response is returned to the user process and the routine retires. Alternatively, if the cause code is in the appropriate range, decision 952 advances the routine to step 953.

In step 953, the Session Layer control block for this particular connection is located and the state of the connection is identified. The routine then advances to decision 954 where it is determined whether this is the appropriate connection descriptor for this connection and whether the connection is in the appropriate state to provide the "disconnect" function. If these conditions are inappropriate, the task advances to step 955 which returns the error message to the user process and retires the routine. Alternatively, if the connection descriptor and the connection state are appropriate, decision 954 advances the routine to decision 956.

In decision 956, it is determined whether the connection is already in the "disconnect" state due, for example, to a prior disconnection from the remote process. If the connection is in the "disconnect" state, decision 956 advances the Session Layer routine to step 957. In step 957, the Session Layer routine is cleared of any events, such as the generation or maintaining of any signaling to the user. In addition, the Session Layer control block is freed and the routine advances to step 958 to provide the normal return. Alternatively, if the state of the connection is not presently "disconnected", decision 956 advances the routine to step 959.

In step 959, all events for this current connection that are or may be returned to the user are cleared. The routine then advances to step 960. In step 960, an STCLEAR transaction is generated and placed in the transaction buffer, the buffer address is sent to the IC queue, the IC Switch routine is signaled and the Session Layer control block state is changed to "disconnected". The Session Layer routine then advances to step 961 where it provides the normal return.

When the IC Switch routine or task receives the signal from the Session Layer routine, it awakens and advances to step 962. In step 962, the IC Switch routine obtains the transaction buffer address from the queue and transfers the control to its outgoing disconnect Transport Layer routine. This advances the outgoing disconnect Transport Layer routine to step 963. In step 963, the routine reads the transaction from the buffer. The routine then advances to step 964 where it changes the state of the Transport Layer control block to "disconnect". The routine then advances to step 965 and, in this step, places the transaction buffer address in the IC queue and returns to the IC Switch routine. The IC Switch routine, upon regaining control, advances to step 966.

Figure 26:
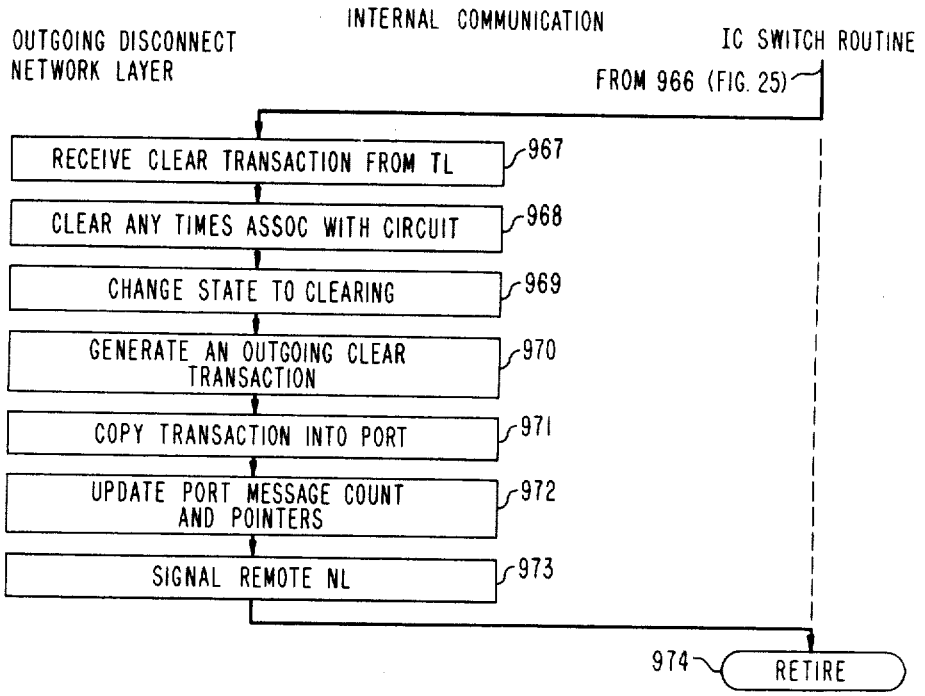

In step 966, the IC Switch routine obtains the buffer address from the queue and transfers control to its outgoing disconnect Network Layer routine. This advances the Network Layer routine to step 967 (FIG. 26). In step 967, the routine obtains the transaction from the buffer and advances to step 968. All of the timers associated with this connection are cleared in step 968 and, in step 969, the state of the Network Layer control block is changed to "clearing". The routine then advances to step 970 where an "outgoing clear" transaction is generated and, in step 971, the transaction is copied into the port shared by the two processes connected by this link. The port message count and the pointers are updated in step 972 and, in step 973, the remote process is signaled via the passed buffer and, in addition, control is returned to the IC Switch routine. The IC Switch routine, upon regaining control, thereupon retires in step 974.

Figure 27:
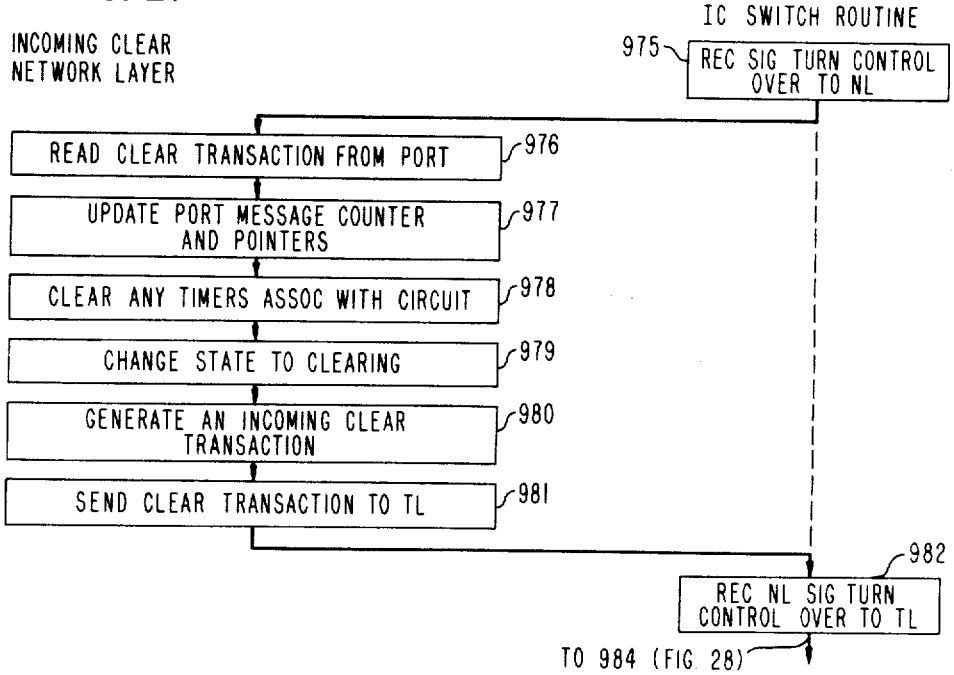

The IC Switch routine of the remote process in this connection picks up the signal from the outgoing disconnect Network Layer of the other process and, upon being thus awakened, advances to step 975 (FIG. 27). In step 975, the IC Switch routine obtains the passed buffer and transfers control to its incoming disconnect Network Layer routine and the Network Layer routine advances to step 976. In step 976, the transaction is obtained from the shared port. The port message count and pointers are updated in step 977 and, in step 978, all timers associated with the connection are cleared. The routine then advances to step 979 where the state of the Network Layer control block is changed to "clearing". In step 980, an "incoming clear" transaction is generated and placed in a transaction buffer. In step 981, the address of the transaction buffer is placed on the IC queue and control is returned to the IC Switch routine.

The IC Switch routine in step 982 turns control over to the incoming clear Transport Layer routine and this routine reads out the transaction in step 984 (FIG. 28). The Transport Layer routine then advances to step 985 where it generates a "clear confirm" transaction and places this transaction in a newly allocated buffer. In step 986, the address of this buffer is placed on the IC queue. In step 987, the Transport Layer control block is freed up and the "clear" transaction received from the Network Layer routine is changed to a "disconnect" transaction in step 988. The buffer address for this "disconnect" transaction is placed on the IC queue in step 989 and control is returned to the IC Switch routine.

The IC Switch routine in step 990 obtains the buffer address and signals the incoming STCLEAR Session Layer routine and the Session layer routine advances to step 655 where it obtains the transaction from the buffer and locates the Session Layer control block for this connection. The routine then advances to decision 656 where a determination of the present state set into the control block is made. If the control block state is presently in the "connect" state, the routine advances to step 658 and, in step 658, the control block is freed. The routine then returns control to the IC Switch routine. Alternatively, if the Session Layer control block is presently in the "data transfer" state, decision 656 advances the routine to step 659 wherein the user process is signaled that an incoming "disconnect" transaction is being received in this connection. After the user is signaled, the Session Layer routine returns control to the IC Switch routine. In the event that the Session Layer control block is in the "disconnecting" state, the user in step 657 is signaled that an incoming "disconnect" has been received. Since this might occur if the user had priorly sent the "disconnect", the decision is left to the user process to determine what next step will be taken. The Session Layer routine then returns control to the IC Switch routine. In all of these events, when control is returned to the IC Switch routine, it advances to step 660.

In step 660, the IC Switch routine obtains the "clear confirm" transaction buffer address placed there by the Transport Layer and turns control over to its outgoing clear confirm Network Layer routine. This advances the Network Layer routine to step 662 (FIG. 29). In step 662, the Network Layer routine obtains the "clear confirm" transaction from the buffer and, in step 663, generates an outgoing "clear confirm" transaction. This transaction is placed in the shared port in step 664 and, in step 665, the port message count and the pointers are updated. A buffer is then passed to the remote process in step 666 identifying the address of the port. Thereafter in step 667, the routine disassociates the circuit from the port by nulling the port address in the CB. Control is then returned to the IC switch and, in step 668, the IC Switch routine retires.

Figure 31:
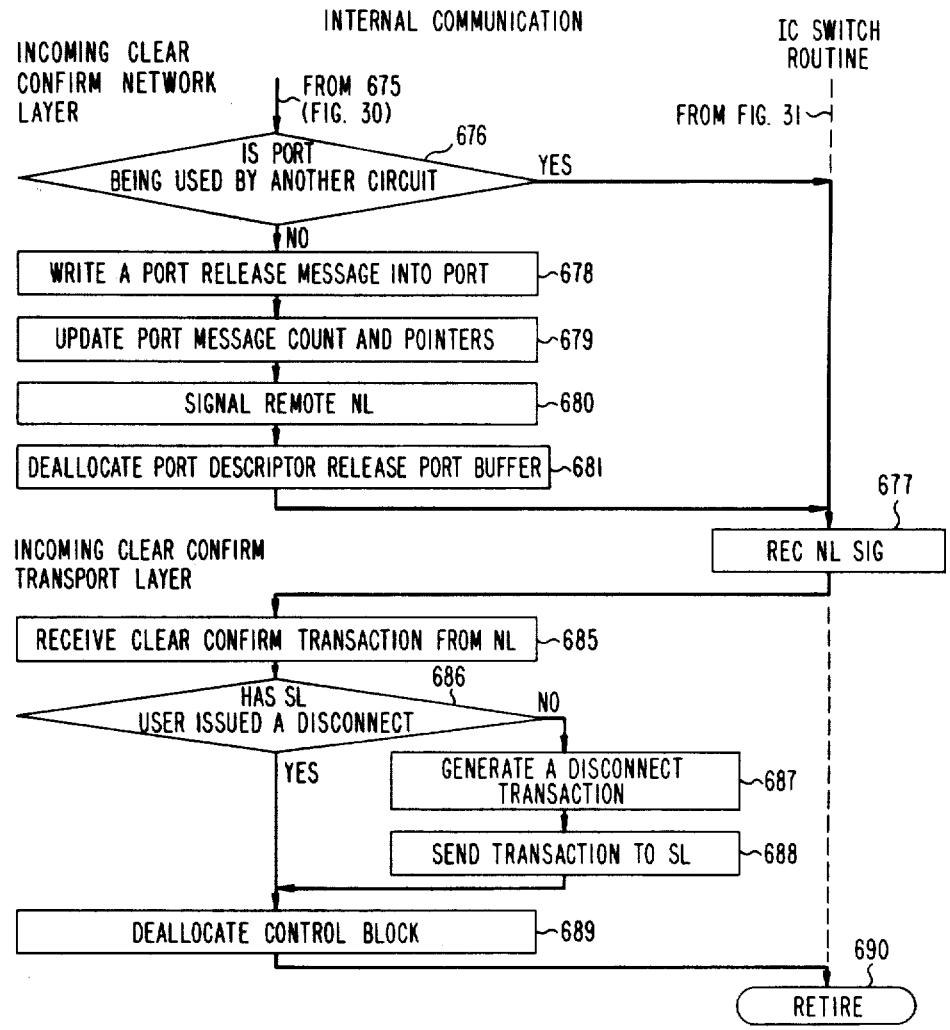

The IC Switch routine in the remote process is awakened by the signal from the outgoing network layer and, in step 670 (FIG. 30), obtains the port buffer and turns control over to its incoming "clear confirm" Network Layer routine. In step 671, the incoming Network Layer routine reads out the "clear confirm" transaction in the port. In step 672, the port message count and pointers are updated and the Network Layer routine generates an incoming "clear confirm" transaction in step 673 and places it in a transaction buffer. The address of the transaction buffer is then placed in the IC queue in step 674. In step 675, the circuit is disassociated in the port by nulling the port address in the PCB. The routine then advances to decision 676 (FIG. 31) where a determination is made as to whether the port is being used by another circuit connection between the two processes. If another circuit is using the port, decision 676 advances the routine to a normal return and returns control to the IC Switch routine. Alternatively, if no other circuit is using the port, decision 676 advances the routine to step 678.

In step 678, a "port release" message is generated and written into the shared port. The port message count and pointers are updated in step 679 and, in step 680, a buffer is passed to the remote process and the remote process is signaled thereby. The Network Layer routine then advances to step 681 where the port descriptor is de-allocated by eliminating the port address and the port buffer is released. The routine then returns control to the IC switch routine which, in step 677, obtains the transaction buffer address from the queue and turns control over to the incoming "clear confirm" Transport Layer routine.

The Transport Layer routine, upon obtaining control, advances to step 685. In step 685, the Transport Layer routine reads the "clear confirm" transaction from the buffer and then advances to decision 686. In decision 686, the Transport Layer routine determines from its control block whether the Session Layer routine has issued a "disconnect". If a "disconnect" has not been issued by the Session Layer, decision 686 advances the routine to step 687. In step 687, a "disconnect" transaction is generated and, in step 688, this transaction is sent on to the Session Layer routine for passage to the user process. After a "disconnect" transaction is sent to the Session Layer, the routine advances to step 689. Alternatively, if the Session Layer has issued a "disconnect", as described above, decision 681 advances the routine directly to step 689. In step 689, the Transport Layer control block is de-allocated by freeing up the information stored therein and the buffer area is released. The control is then returned to the IC Switch routine which, in step 690, retires.

Figure 32:
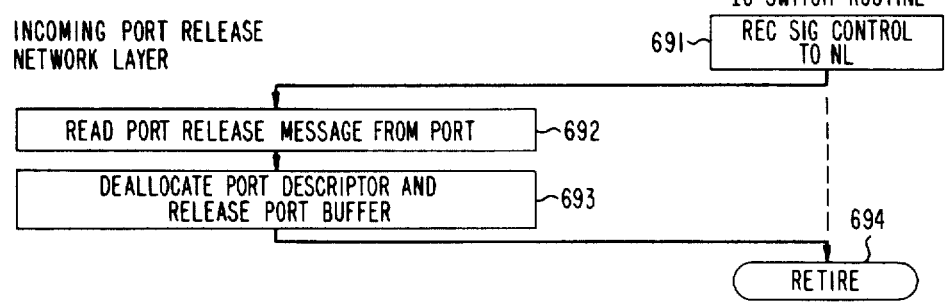

In the remote process, the IC Switch routine is awakened by the signal from the incoming clear confirm network layer. The IC Switch routine, in step 691 (FIG. 32), turns control over to the incoming "port release" Network Layer routine. In step 692, the Network Layer routine obtains the "port release" message from the passed buffer. Upon reading out the "port release" message, the Network Layer routine advances to step 693 where it de-allocates the port descriptor by releasing the buffer memory and, in addition, releases the port buffer. Since the port buffer has now been released by both Network Layer routines, it is now returned to the common pool where it is now available for other connections. The Network Layer routine now returns control to the IC Switch routine and, in step 694, the IC switch routine retires.

When a connection has been established between two processes by the Internal Communication Subsystem, either process may write data as an information unit (I.U.) to the connection between it and the other connected process. To write data to an established connection to another process, the sending process issues a call to a "write" primitive or routine which provides the session layer functions of the IC Subsystem.

Figure 33:
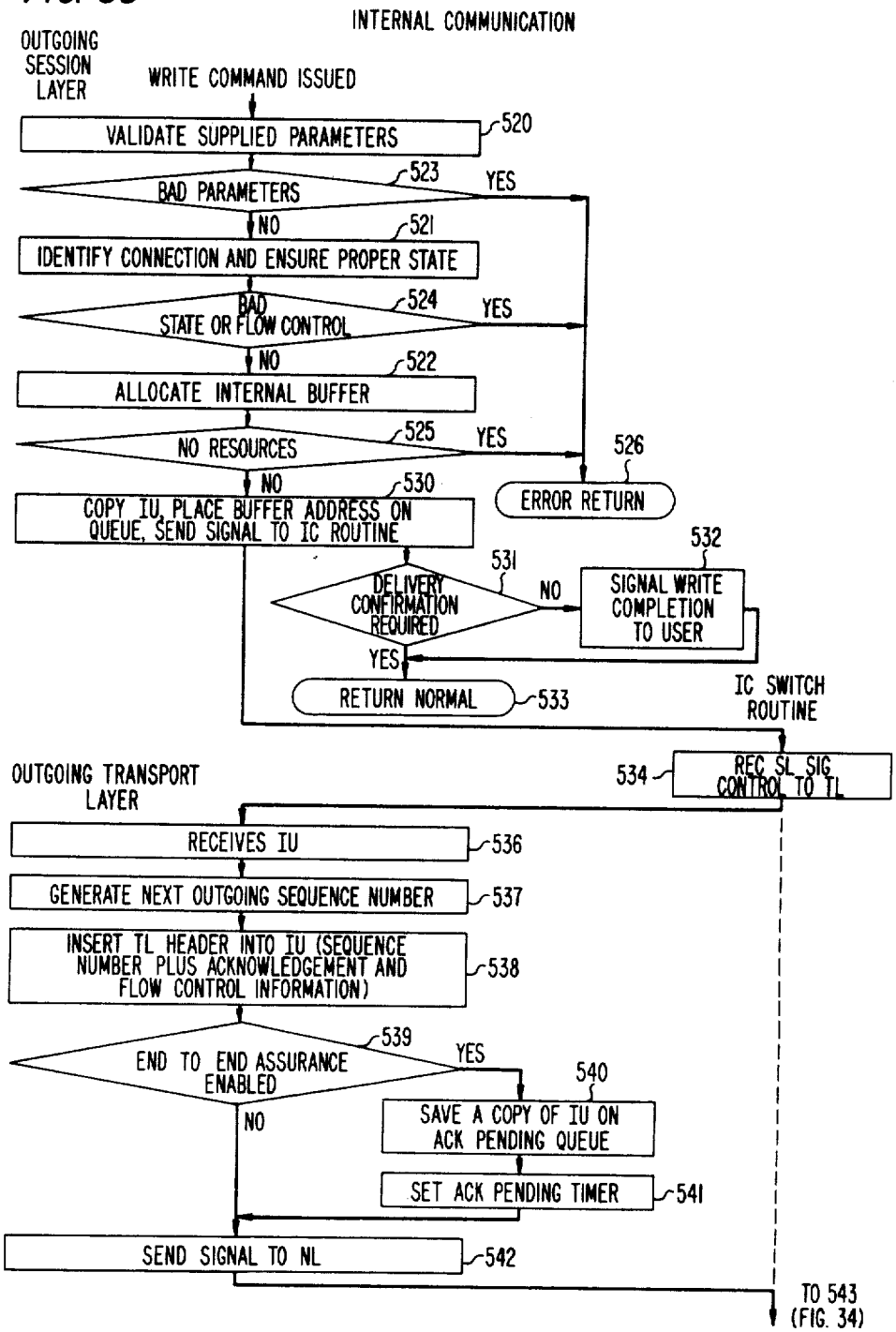

When the call issued by the sending process is received by the "write" routine, the routine initially advances to step 520 (FIG. 33). In step 520, the parameters are validated, such as noting the number of bytes in the information unit that the sending process is writing and insuring that the number does not exceed a predesignated threshold. Decision 523 then advances the routine to step 526 in the event that the threshold has been exceeded; namely, in the event that the size of the information unit is excessive. In step 526 an error message is generated and returned to the sending process to indicate to the process that the call is not being accepted and that control is being returned to such sending process.

Assuming now that the size of the information unit does not exceed the predefined threshold, decision 523 advances the routine to step 521. In step 521, the virtual call circuit number (supplied by the sending process) is identified and the circuit number is inserted into the header of the information unit. In addition, in step 521 the routine performs status and flow control checks using flow control information in the control block. This information was obtained from header information piggybacked on data flowing in the reverse direction through this connection. The purpose of these checks is to determine whether the connection to the remote end-point process will accept data. Decision 524 advances the routine to step 522 after the connection is identified and a determination is made that the connection is in the appropriate condition to accept data for passage therethrough. Alternatively, the routine is advanced to step 526 in the event that there is a bad connection state or there is a control of flow in effect.

Assume that decision 524 has advanced Session Layer routine to step 522. In step 522, buffer space internal to the outgoing side of the I.C. Subsystem is allocated for the information unit. At this time, decision 525 determines whether there are sufficient resources for the data storage and in the event that the resources are inadequate the Session Layer routine advances to step 526. Alternatively, if the resources are ample, the routine proceeds to step 530.

Assume now that decision has advanced the Session Layer routine to step 530. In step 530, the information unit is read out of the sending process storage area and written into the outgoing IC buffer area. The buffer area address is placed in the IC queue and the IC Switch routine is then signaled. The routine then advances to decision 531 where it is determined whether or not the connection requires delivery confirmation. In the event that no delivery confirmation is necessary, the routine goes to step 532 which functions to signal the sending user process that the Session Layer routine has written the IU into the connection. The routine thereupon advances to step 533 which constitutes its normal completion and return. Alternatively, if the connection requires delivery confirmation, the routine advances directly to step 533 without signaling the "write completion" to the user process since the connection requires confirmation from the receiving end of the connection.

The IC Switch routine, in step 534, upon being signaled, obtains the buffer address from the queue and turns control over to the outgoing Transport Layer routine. The outgoing Transport Layer routine, upon taking over control, advances to step 536. In step 536, the outgoing Transport Layer routine obtains the transaction or information unit from the buffer. The routine then advances to step 537 where it generates the next successive outgoing sequence number that will be associated with the information unit (IU).

After the sequence number is generated, the routine advances to step 538 which involves inserting information into the outgoing IC buffer, which information will be part of the header of the information unit. This header information will include the previously generated sequence number and other control information which may constitute, for example, acknowledgement and flow control information for data flowing in the reverse direction over this connection, which control information is piggybacked onto this information unit for conveyance to the other end of the link or connection.

After the control information is inserted into the buffer, the routine advances to decision 539 which determines whether or not end-to-end assurance is required for this connection. In the event that it is required, the routine advances to step 540 and in accordance with this step saves a copy of the information unit and places the IU descriptor or address on an acknowledgement pending queue. The routine then advances to step 541 where an acknowledgement timer is set. As is well known in the art, but not described herein, the saved information unit can, for example, be resent in the absence of receiving an acknowledgement from the other end of the connection prior to the timing out of the timer. After the setting of the timer, the routine advances to step 542.

Alternatively, in decision 539, if end-to-end assurance is not required, the routine advances directly to step 542. In step 542, the buffer address of the information unit (and the header) is placed on the IC queue, the IC Switch routine is signaled to take over control and the Session Layer routine provides a normal return.

Figure 34:
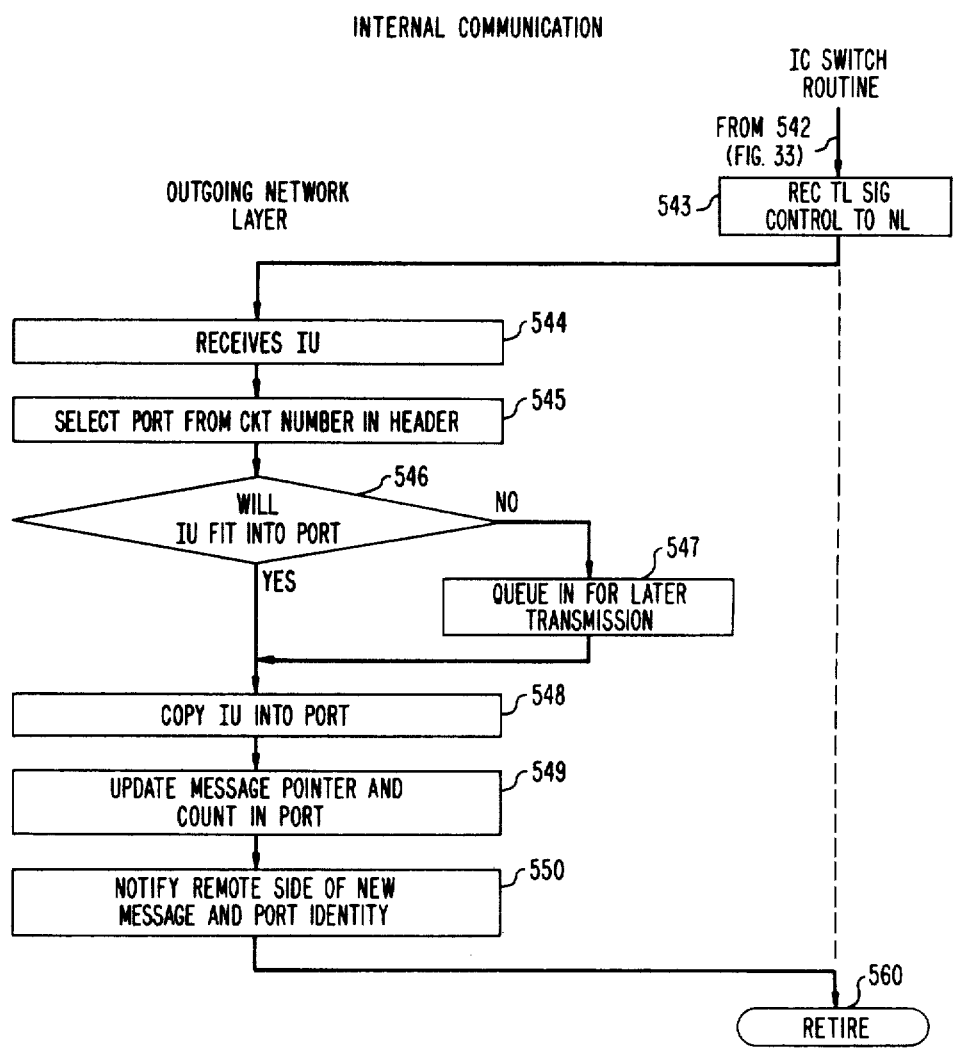

In response to the signaling, the IC Switch routine, in step 543 (FIG. 34), obtains the transaction buffer address from the queue and turns control over to the outgoing Network Layer routine. The Network Layer routine, upon gaining control, advances to step 544 and, in this step, the Network Layer routine proceeds to obtain the information unit from the buffer. The routine then advances to step 545 where the circuit number is obtained from the IU header and the port connection (buffer area) shared with the receiving process is thereby identified. After the identification is made, decision 546 determines whether there is sufficient buffer space in the port between the sending process and the receiving process to accommodate the information unit. In the event that the port is presently busy and the buffer space is inadequate, the routine advances to step 547 wherein the outgoing IC buffer area address of the information unit is queued up for later transmission of the information unit to the port area by step 548 when the port becomes available. Alternatively, if the port is not busy and there is adequate buffer space in the port, the routine advances directly to step 548.

In step 548, the information unit is read out of the outgoing IC buffer area and read into the shared port area. The routine then advances to step 549 to update a count of transactions stored in the port and to correspondingly update a message pointer to point to buffer area for storing the next subsequent transaction. At this point the routine advances to step 550, and the remote side of the connection is notified. More specifically, the outgoing Network Layer routine passes a buffer to the receiving process to take over control and to advise the receiving process as to the identity of the shared port. The routine then signals the IC Switch routine and provides a normal return. The IC Switch routine, in step 560, terminates the subsystem functions by retiring.

When the IC Switch routine of the receiving process is signaled by the sending process, it obtains the port identity from the passed buffer and turns control over to the incoming Network Layer routine. The Network Layer routine, upon taking control, allocates transaction (or IU) buffer space for the information unit, in accordance with step 552, and then, in step 553, it obtains the information unit and stores it in the buffer. The routine in step 554 then updates the message count and the message pointers in the common port. The incoming Network Layer routine in step 555 places the buffer address in the IC queue and then signals the IC Switch routine to take over control.

The IC Switch routine, when signaled, obtains the buffer address in step 559 and turns control over to the incoming Transport Layer routine. When the incoming Transport Layer routine assumes control, its initial function in step 556 is to obtain the IU from the buffer. In step 557, the incoming Transport Layer routine examines the header information and verifies that the information unit sequence number is the appropriate next number in the sequence. The routine then advances to step 558 where it performs a number of housekeeping functions with respect to the header information. These housekeeping functions include noting acknowledgements and flow control information piggybacked onto the information unit by the outgoing Transport Layer routine of the sending process and updating housekeeping information and preparing acknowledgements for this information unit to be piggybacked on an information unit flowing in the opposite direction back to the Transport Layer routine in the sending process. After these housekeeping functions are completed, the incoming Transport Layer routine places the information unit buffer address in the incoming incoming session queue and signals the IC Switch routine to take over control, as depicted by step 561. The IC Switch routine, when signaled, obtains the buffer address from the queue and, in step 563, turns control over to the incoming Session Layer routine.

Figure 36:
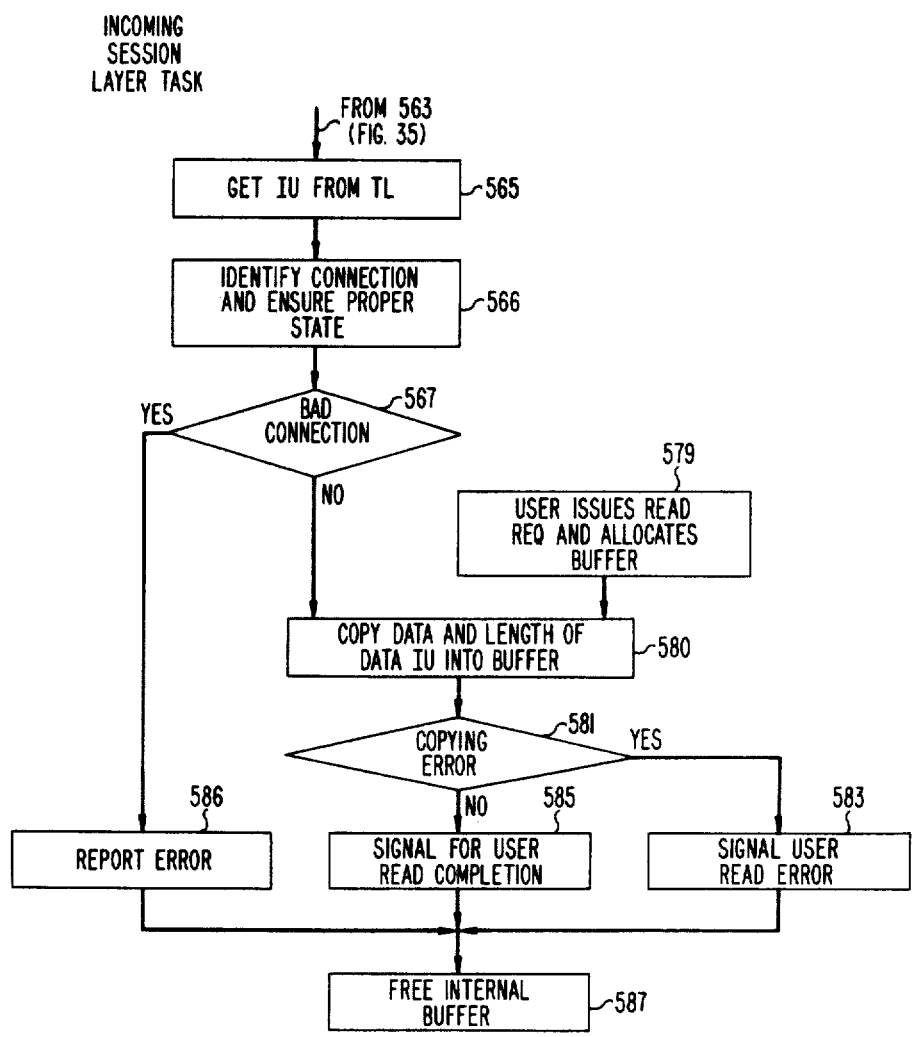

The incoming Session Layer routine, when gaining control, advances to step 565 (FIG. 36) where it obtains the information unit from the buffer. The routine then proceeds to step 566 wherein the connection is identified from the circuit number in the information unit header and the condition or state of the connection is assessed. The task proceeds to decision 567 which determines whether this connection is in the appropriate state. If it is determined that this connection is in a bad state or there is a control of the flow therethrough, the task advances to step 586 which provides an error report available for conventional maintenance and control purposes. The task then advances to step 587 which frees up the internal buffer area storing the information unit.

Assuming the connection is in the proper state, decision 567 advances the task to step 580. In step 580 the information unit is obtained from the internal buffer area and written into the buffer space previously allocated by the receiving process. (It is recalled that the receiving process, when returning the prompt, had issued a read request and, as part of the request, had allocated buffer space for an information unit, as symbolically shown here as step 579). Accordingly, the information unit is stored in this allocated buffer space of the receiving process. At the same time, step 580 provides the additional function of advising the receiving process of the length of the unit. The incoming Session Layer routine then proceeds to decision 581 which determines whether there was an error in copying the information unit into the receiving process buffer area. In the event that an error has occurred, the task proceeds to step 583 which involves signaling the receiving process that a read error has occurred. The task then frees the internal buffer area in step 587.

If no error occurs in the reading of the information unit into the receiving process buffer, decision 581 advances the task to step 585. in step 585, the incoming Session Layer routine signals the receiving process that the reading of the information unit has been completed. The task then goes to step 587 to free the internal buffer area, which step terminates the functions of the routine and the operations of the IC Subsystem.

Interface Process

It has been priorly noted that an interface process may be an originating end or a terminating end of an internal communication connection or, alternatively, may provide an interface to a link which is external to the processor or machine. It has also been priorly noted that each interface process has an IC Subsystem (142 or 144) similar to IC Subsystem 136 in the user processes, differing however when the interface process is providing an end point process in the machine an interface to an external link. In this event, when the connection from such end point process enters the Network Layer of the interface process, the connection branches directly to an interface with the external link without going through the Transport and Session Layers. In the reverse direction, connections from the external interface pass directly to the Network Layer of the interface process without going through the Session and Transport Layers.

Figure 37:
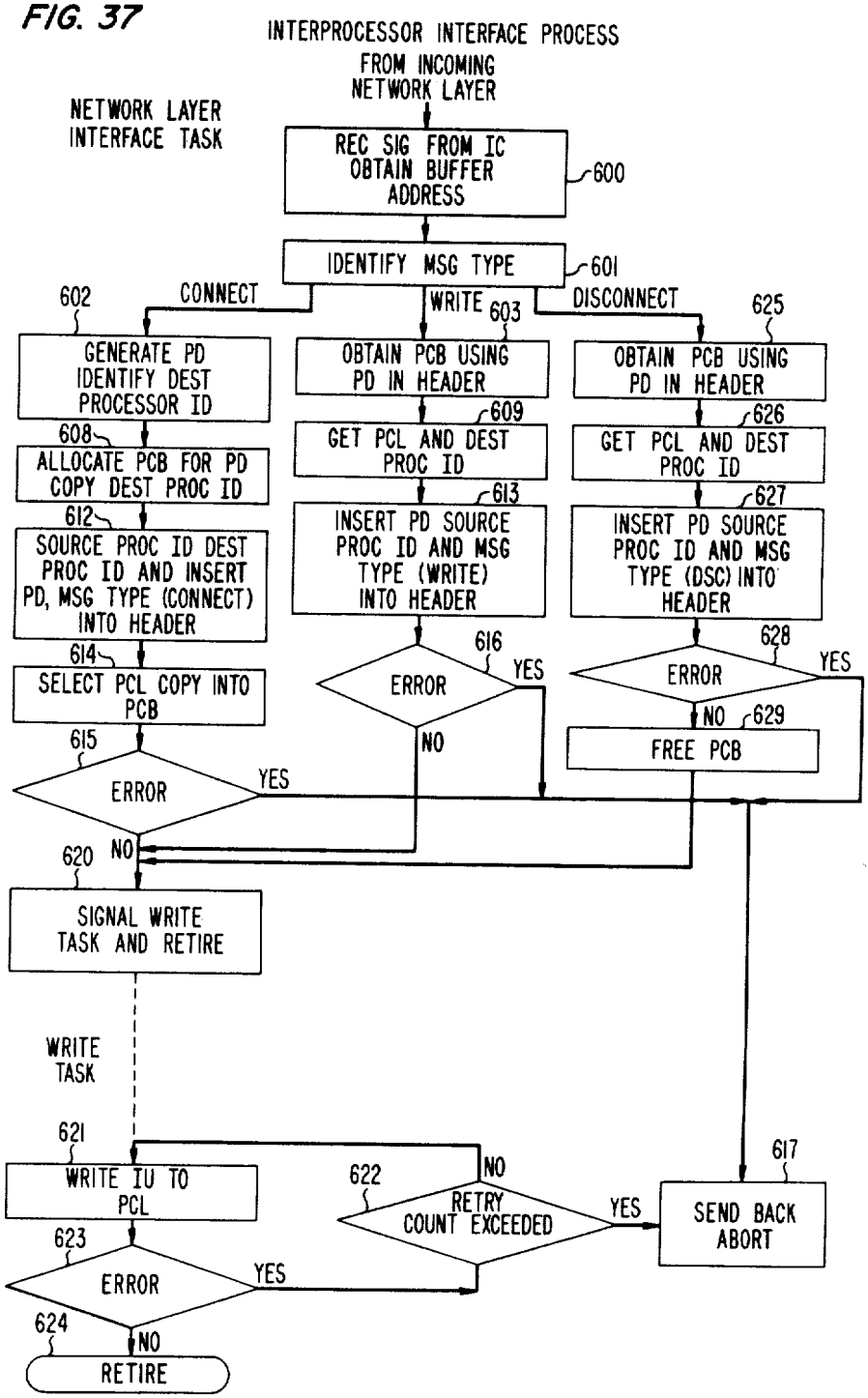
FIGS. 37 and 38 depict a flow diagram for an interprocessor interface process.
Figure 38:
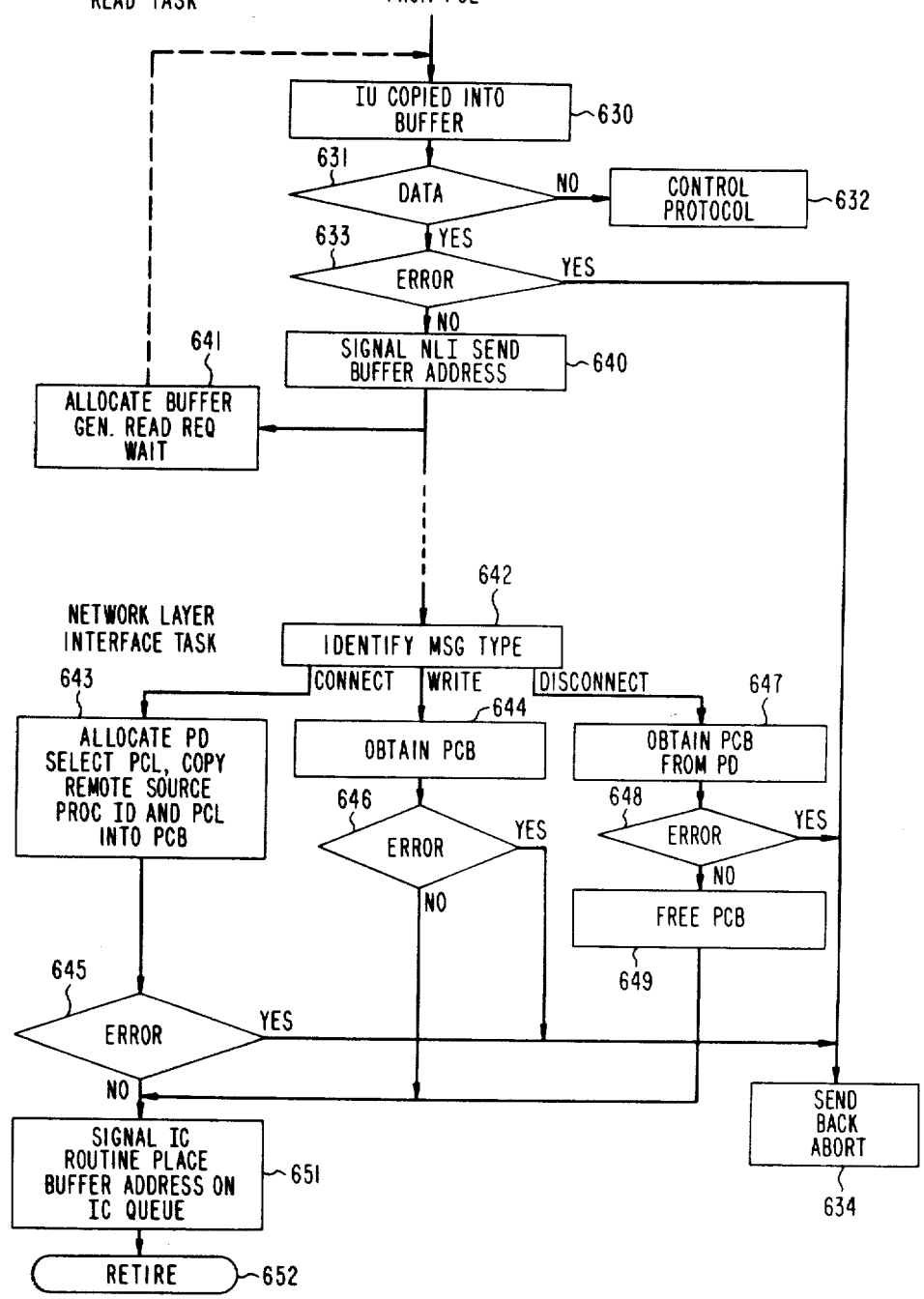

The manner in which IC Subsystem 142 of Interprocessor Interface Process 128 (or 126) extends a connection from the IC Subsystem Network Layer to the PCL data bus 112 is shown in FIGS. 37 and 38. When a connection is established (set up) by the originating endpoint process to IPI 128, the incoming-connect Network Layer routine of IPI 128 functions in the same manner as previously described for the corresponding incoming Network Layer routine. Thus, as in previously described steps 906–910, the "setup" or "connect" transaction is copied from the common port, a control block is obtained, a port descriptor is allocated and initialized and the connection type is determined from the PIDs and NSAs. At this point, in step 910, if it is determined that the connection will extend to an external link, the incoming Network Layer routine branches by signaling the Network Layer Interface task of IPI 128. This signal awakens the Network Layer Interface (NLI) task, and this task advances to step 600 (FIG. 37). In step 600, the NLI task, upon receiving the signal from the IC Subsystem Network Layer, obtains the address of the setup transaction buffer and then advances to step 601. In step 601, the message type is identified, which message type we have assumed to constitute the "connect" or setup function, and the task accordingly advances to step 602.

In step 602, the NLI task reads the setup transaction and obtains the identity (ID) for the destination processor. The task then generates a local path descriptor (PD) individual to this connection. The task then advances to step 608.

In step 608, a path control block (PCB) of memory is allocated for this specific connection, which PCB is addressable using the PD. The destination processor ID is then copied into the PCB and the task advances to step 612.

In step 612, the PD, the source or local processor ID and the message type (connect) are inserted into the header of the set transaction (or information unit). The task advances to step 614 wherein an available path on the PCL data bus 112 is selected and the identity of this path is copied into the PCB.

At this point, the task advances to decision 615 which determines whether a PCB has been appropriately allocated and the above-described information has been copied into the PCB and inserted in the information unit (IU) header. If there has been an error in any of these functions, the task advances to step 617 which generates an abort command which includes the PD and sends this command back to the NLC and also sends this command to conventional monitoring and maintenance equipment for corrective action. Assuming, however, in this case, that the PCB has been properly allocated and the appropriate information copied into the PCB and inserted in the information unit (IU) header, then decision 615 advances the task to step 620. In step 620, the Write task in the Interprocessor Interface Process is signaled, the IU buffer address is placed in the Write task queue and the NLI task retires.

When the Write task is awakened by the signal from the NLI task, it advances to step 621. In step 621, the Write task obtains the information unit from the buffer (with the above-described information inserted in the header) and writes this IU to the selected path in the PCL data bus 112. A determination is made in accordance with decision 623 as to whether the IU has been successfully written to the PCL data bus 112. If there is an error in the attempt, the task advances to decision 622 which determines the number of retries that have been attempted. If the number of retries exceeds a predetermined count, the task advances to step 617 wherein the above-described abort command is generated. Alternatively, if the retry count has not exceeded the above-noted threshold, decision 622 advances the task back to step 621 wherein the task again attempts to write the IU to the PCL data bus. Alternatively, if the IU is successfully written to the PCL data bus, decision 623 advances the task to step 624 wherein the task retires and awaits the next signal from the NLI task.

Figure 35:
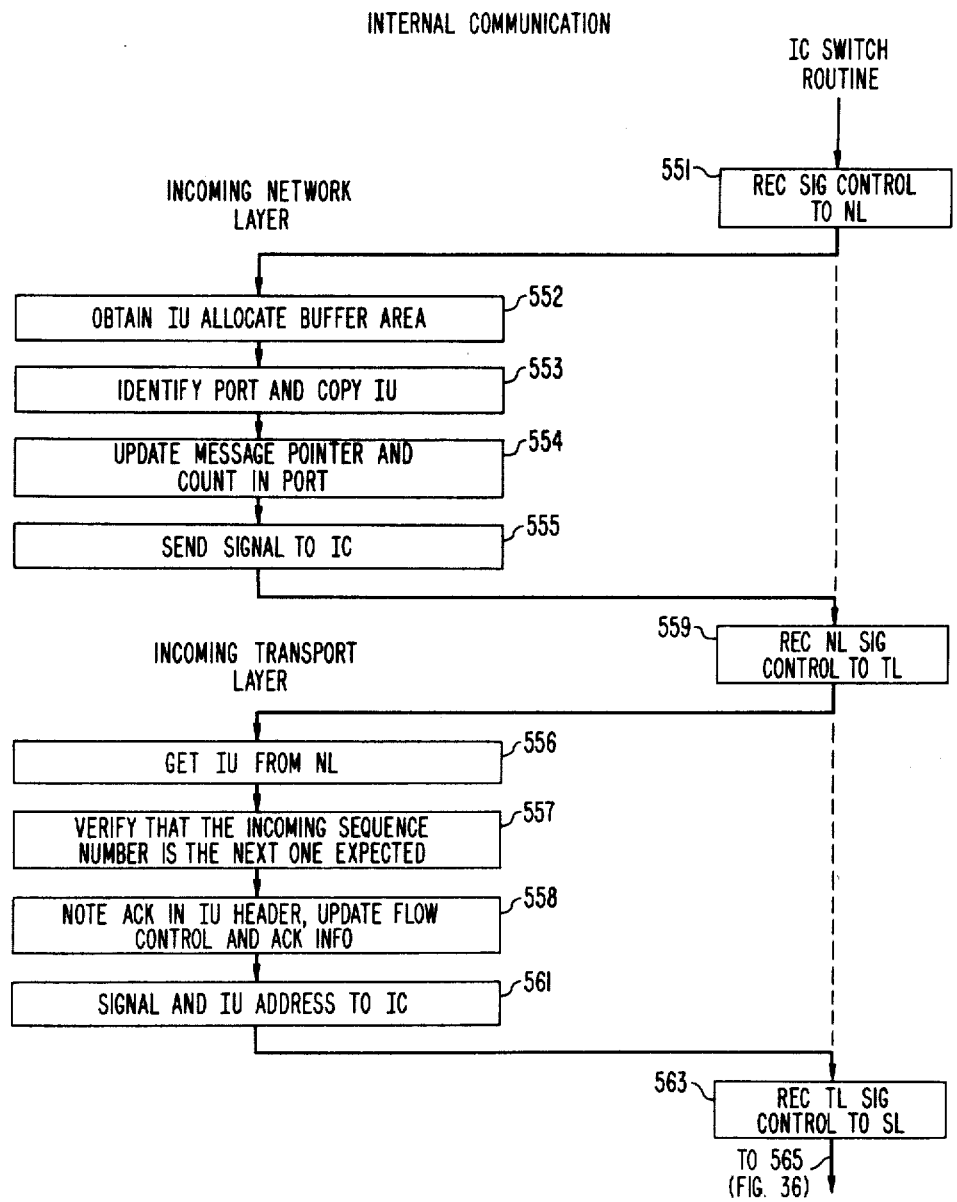

If the information unit received from the incoming Network Layer routine is part of a "write" command, (forwarded by step 555, FIG. 35, of the routine), step 601 of the Network Layer Interface task, upon identifying this message type, advances the task to step 603. In step 603, the task identifies the path descriptor (PD) in the buffer header and utilizing the PD obtains the PCB. The task then advances to step 609 where it obtains the identities of the selected PLL data bus path allocated (during connect) for this connection and the destination processor and then advances to step 613.

In step 613, the NLI task inserts the PD, the source processor identity, and the message type (write) into the header of the IU. The task then advances to decision 616 which determines whether the PCB has been properly obtained and whether the appropriate information has been inserted into the IU header. If an error occurred in these functions, the task advances to step 617 which generates and transmits the abort command as described above. Alternatively, if the PCB has been properly obtained and the above-described information has been properly inserted into the IU header, decision 616 advances the task to step 620. As described above, step 620 signals the Write task, places the buffer address in the Write task queue, and then retires. The Write task upon being signaled advances to step 621 as described above. The IU with the header modified as described above is now written to the PCL data bus 112 and retries are made in the event that the attempt is not successful, all of these functions being provided in substantially the same manner as when the connection command was written to the PCL data bus.

If the information unit received from the incoming Network Layer routine is part of a "disconnect" command, (forwarded by step 981, FIG. 27, of the routine), step 601 of the Network Layer Interface task, upon identifying this message type, advances the task to step 625. In step 625, the task identifies the PD in the buffer header and utilizing the PD obtains the PCB. The task then advances to step 626 where is obtains the identities of the selected PCL data bus path and the destination processor and thereupon advances to step 627.

In step 627, the NLI task inserts the PD, the source processor identity and the message type ("disconnect") into the header of the IU. The task then advances to decision 628 which determines whether the PCB has been properly obtained and whether the appropriate information has been inserted into the IU header. If an error occurred, the task advances to step 617 which generates and transmits the abort command as described above. Alternatively, if the PCB has been properly obtained and the above-described information has been properly inserted into the IU header, decision 628 advances the task to step 629 which provides the function of freeing the PCB. The task then advances to step 620 wherein, as described above, the Write task is signaled and the buffer address is placed in the Write task queue. The Write task thereupon writes the IU to the PCL data bus 112 and, assuming no error occurs, thereupon retires as described above.

At the destination processor, the PCL hardware continuously monitors each path of the PCL data bus 112 to identify any IU on the path which is directed to this processor. This monitoring by the PCL hardware is accomplished by virtue of step 641 (FIG. 38) of a Read task in the Interprocessor Interface process of the destination processor, which step constituted part of a prior processing cycle of the task. More specifically, in the prior processing cycle, step 641 generated a "read" request to the PCL driver requesting any IU which is directed to this processor. Buffer space was allocated to step 641 and the task then awaited to be signaled that such an IU comes onto the PCL data bus. When such an IU arrives, it is copied into the allocated buffer and the Read task is signaled.

Upon being signaled that an IU destined for the local processor came on the PCL data bus, the Read task advances to decision 631. Decision 631 determines whether or not the IU constitutes a data command or a control or housekeeping command. If the command is a housekeeping command, the Read task goes to step 632 where various control protocol functions are performed in accordance with the type of command received, which functions do not contribute to an understanding of or comprise part of this present invention. Alternatively, if the IU contains message data, decision 631 advances the task to decision 633 where it is determined whether the IU has been properly read from the PCL data bus. If there was an error in the reading of the IU, the task advances to step 634 where an abort command is generated. This command is then sent back to the source processor by way of the PCL bus and, in addition, is sent to local monitoring and maintenance equipment for corrective action. Alternatively, if the IU has been correctly read from the bus, decision 633 advances the task to step 640.

In step 640, the Network Layer Interface (NLI) task is signaled and the buffer address is placed on the queue of the NLI task. The Read task then advances to step 641 wherein buffer space is allocated for the next IU, a new "read" request is generated and the task then awaits for the next IU on the PCL data bus destined for this processor.

When the NLI task receives the signal from the Read task, it advances to step 642. In step 642, the address of the buffer containing the IU is obtained, the buffer is read and the message type is identified. Assuming that this is a "connect" command, the NLI task proceeds to advance to step 643.

In step 643, a new PD is generated and a PCB is allocated for this path. In addition, a PCL path is selected for the reverse or back connection. The source processor ID and the identity of the newly selected PCL data bus is then written into the PCB. The task then advances to decision 645.

In decision 645, a determination is made as to whether the PCB has been properly allocated and the appropriate information has been copied into the PCB. If an error has occurred, decision 645 advances the task to step 634 where, as previously described, an abort command is generated, returned to the PCL data bus and sent to local maintenance and control equipment. Alternatively, if the PCB has been properly allocated and the appropriate information has been copied into the PCB, decision 645 advances the task to step 651.

In step 651, the outgoing IC Switch routine of the IC Subsystem of the interprocessor interface process is signaled and the buffer address of the IU is sent to the IC queue. As previously described, in step 888, the IC switching routine, in turn, passes control to the Network Layer routine. In the meantime, the NLI task advances to step 652 whereupon it retires and awaits the next signal from the read task.

In the event that an IU in a "write" command has been received from the PCL data bus, step 642 of the NLI task, upon identifying this message type, advances to step 644. In step 644, the PD is read out of the IU header and the PCB associated with this PD is obtained. The process then advances to decision 646 which determines whether the PCB has been properly obtained. If an error has been made, the task advances to step 634 where the abort command is generated and sent to the PCL data bus and to the maintenance and control equipment. Alternatively, if the PCB has been properly obtained, decision 646 advances the task to step 651.

The NLI task in step 651 signals the IC switching routine and places the buffer address on the IC queue.

As previously described, the IC switching routine, in step 543, transfers control to the outgoing Network Layer routine of the IC Subsystem, and the Network Layer proceeds to provide the network layer functions which include routing the IU to the terminating or destination end-point process. The NLI task now advances to step 652 where it retires awaiting the next signal from the Read task.

In the event that the IU received from the PCL data bus is part of a "disconnect" command, step 642 of the NLI task, upon identifying this message type, advances the task to step 647. In step 647, the PD is read out of the IU header and the PCB associated with this PD is thereby obtained. The process then advances to decision 648 which determines whether the PCB has been properly obtained. If an error has been made, decision 648 advances the task to step 643 and the abort command is generated and sent back to the PCL data bus and to maintenance and control equipment. Alternatively, if the PCB has been properly obtained, decision 648 advances the task to step 649.

The NLI task in step 649 frees the PCB and advances the task to step 651. As previously described, step 651 provides the functions of placing the buffer address on the IC queue and signaling the IC Switch task thereby transferring control in step 966 to the outgoing Network Layer routine of the IC Subsystem. The Network Layer of the IC subsystem thereupon proceeds to provide the network layer functions which include routing the IU to the terminating or destination end point process. Meanwhile, the NLI task has advanced to step 652 where it retires awaiting the next signal from the Read task.

Let us now assume that a connection is to be extended from a process in node processor 107 to a process in another node. As previously described, this connection will be extended by way of Transport Network Interface (TNI) process 134 to the transport network by way of KMS 116. As discussed with respect to IPI 128, when a connection is established by the originating end user process, the network layer of TNI 134 functions in the same manner as previously described for the incoming Network Layer routine of the IC Subsystem of any process. Thus, the setup transaction is copied from the common port, a control block is obtained, a port descriptor is allocated and the connection type is determined. At this point in step 910 (FIG. 12), if it is determined that the connection will extend to the transport network, the incoming Network Layer routine branches by signaling the (outgoing) Network Layer Interface (NLI) task of TNI 134.

Figure 39:
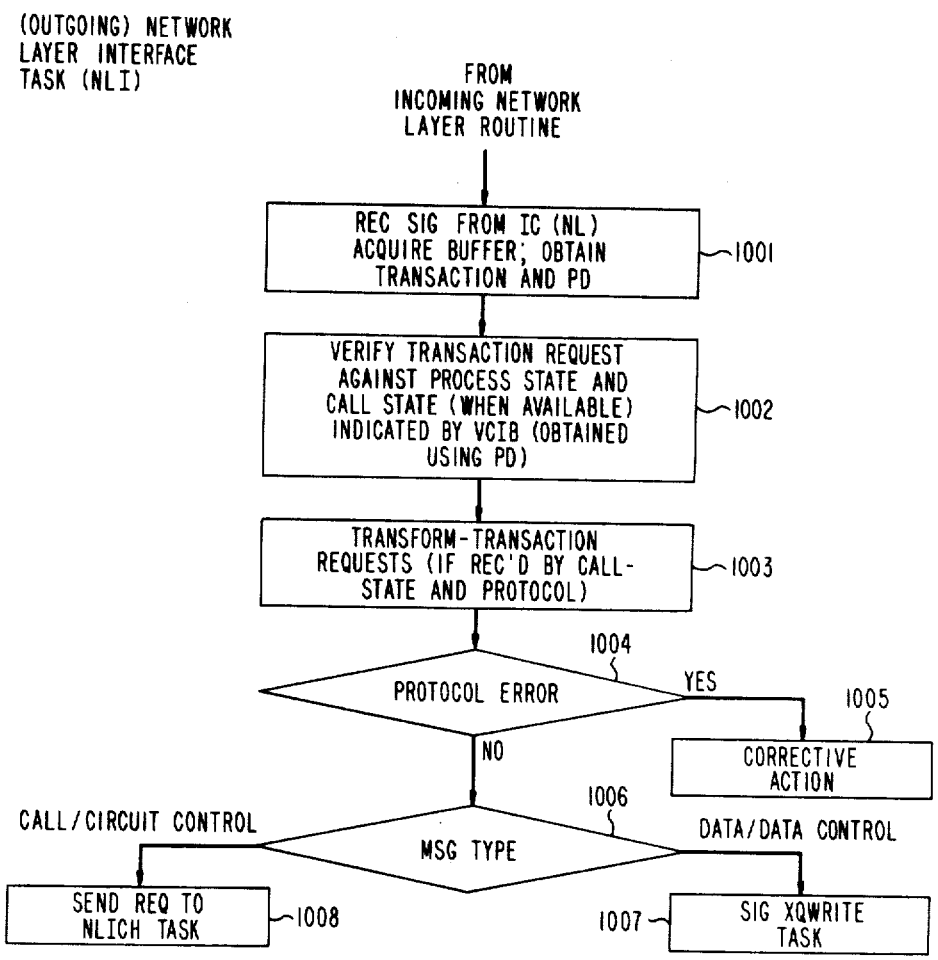

The (outgoing) Network Layer Interface task (FIG. 39) receives the signal from the incoming NL routine, as previously described, and in step 1001 the task acquires the buffer containing the transaction and the path descriptor. Having the transaction and path descriptor, the NLI task advances to step 1002 to verify the transaction request against the present state of the call and also to determine whether or not the link is operational. It is noted that the call state is generally indicated in a Virtual Circuit Information Block (VCIB), which block will be created when the connection is set up (as described hereinafter). The task then advances to step 1003 to change the state of the call in accordance with the incoming transaction request. This advances the task to decision 104 which determines whether the transaction request is unrecognizable or cannot be complied with because of the present state of the circuit. If it is determined that the transaction request is a protocol error, appropriate recovery is provided in step 1005, such as refusing the request or aborting the circuit connection.

Assuming that there was no error in the transaction, decision 1004 advances the task to decision 1006 which determines whether this transaction constitutes a control transaction, such as a "connect" or "disconnect", or a data transaction, such as a "write". If this is a "write" transaction, the NLI task signals the XQWRITE task and retires in step 1007. Alternatively, if this is a control transaction, the Network Layer Interface Call Handler (NLICH) task is signaled and the NLI task reties in step 1008.

Figure 40:
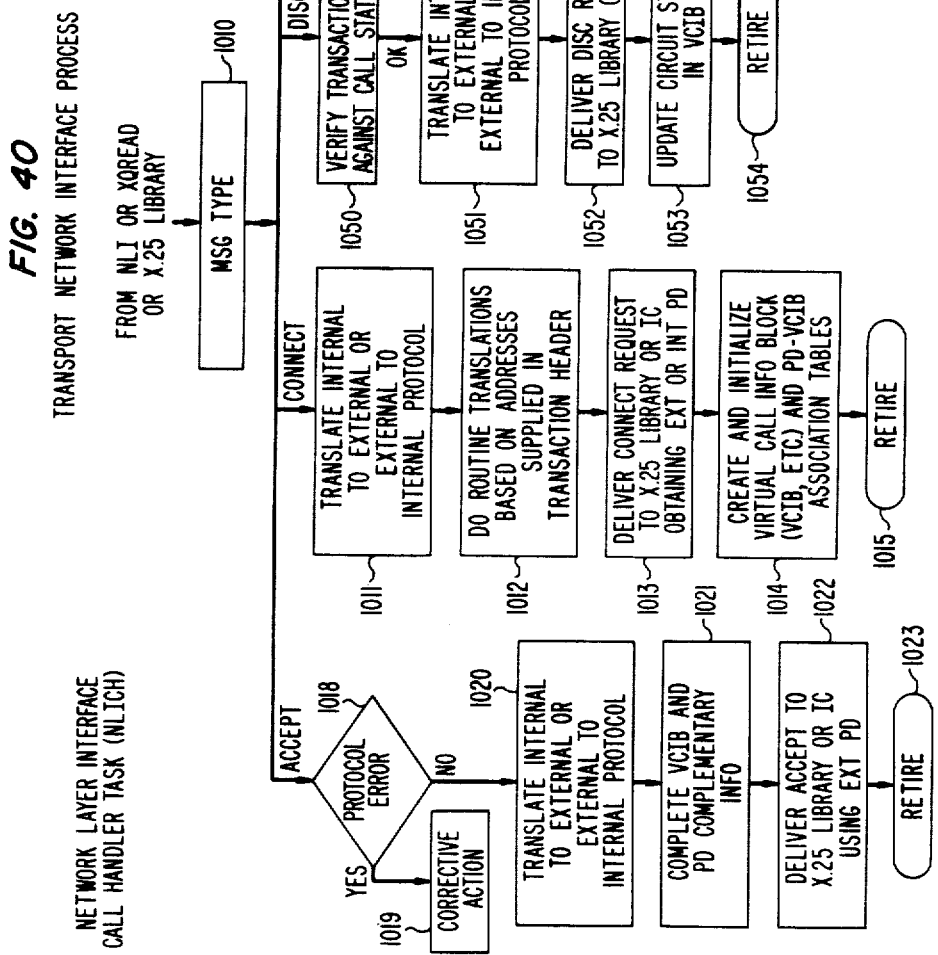

We have presumed in this present scenario that a "connect" request is being received by the Transport Network Interface process. Accordingly, the NLICH task (FIG. 40) is therefore signaled and, in step 1010, identifies this message type. Since we assume that this is a "connect" transaction, the NLICH task advances to step 1011 where a translation is made from the internal protocol to the external protocol of the transport network. More specifically, the "connect" transaction is packetized and the data is placed in the appropriate fields of the packet.

In step 1012, the header NSAs or addresses are translated to the network addresses by recourse to a routing table and these transport network addresses are also placed in an appropriate field in the packet. The task then advances to step 1013, which passes the connect request to the X.25 Library task (described hereinafter) and the NLICH task, in turn, obtains from the Library task the external path descriptor (PD). In step 1014, the Virtual Call Information Block (VCIB) is created and the external path descriptor is placed in the VCIB. The task then, in step 1015, retires. The X.25 Library task, as described hereinafter, "formats" the "connect" request and delivers it to the transport network via KMS 116.

At the remote node, the X.25 Library task thereat delivers the connect request to the NLICH task. In this event, the NLICH task operates in a corresponding (but inverse) manner to the way it operated when the "connect" request was delivered to it by the NLI task. More specifically, in step 1010, the NLICH task identifies the message type and then, in step 1011, translates the external protocol to the internal protocol. The routing translations are then done by obtaining the NSAs in the packet and verifying that the NSAs identify appropriate destination processes in such remote node. The "connect" request is then delivered to the outgoing Network Layer task of the IC Subsystem. The VCIB is created and the external path descriptor is placed in the block in step 1014. The NLICH task, at this point, then retires in step 1015.

At the remote node, the destination process presumably accepts the "connect" request and returns an "accept" transaction. This "accept" transaction is received by the ("outgoing") Network Layer Interface task of the TNI process at the remote node. The NLI task then provides steps 1001 through 1006, as described above, and decision 1006 advances the task to step 1008 where the NLICH task is signaled since this constitutes a control transaction. The NLICH task, in step 1010, identifies the "accept" transaction and advances the task to decision 1018.

In decision 1018, a determination is made as to whether the "accept" transaction is appropriate for this connection. If the transaction is not appropriate, the task advances to step 1019, which provides appropriate corrective action. In the event, however, that the "accept" transaction is appropriate for this connection, the task advances to step 1020. In step 1020, an internal to external protocol translation is performed by creating a packet structure and placing the data in appropriate fields of the packet. The task then advances to step 1021 where the internal path descriptor is obtained and placed in the VCIB to complete the complementary information in the block of the internal and external PDs. The transaction is then delivered to the Library task, providing the external PD to such Library task in step 1022. The NLICH task then advances to step 1023 where it retires.

Figure 41:
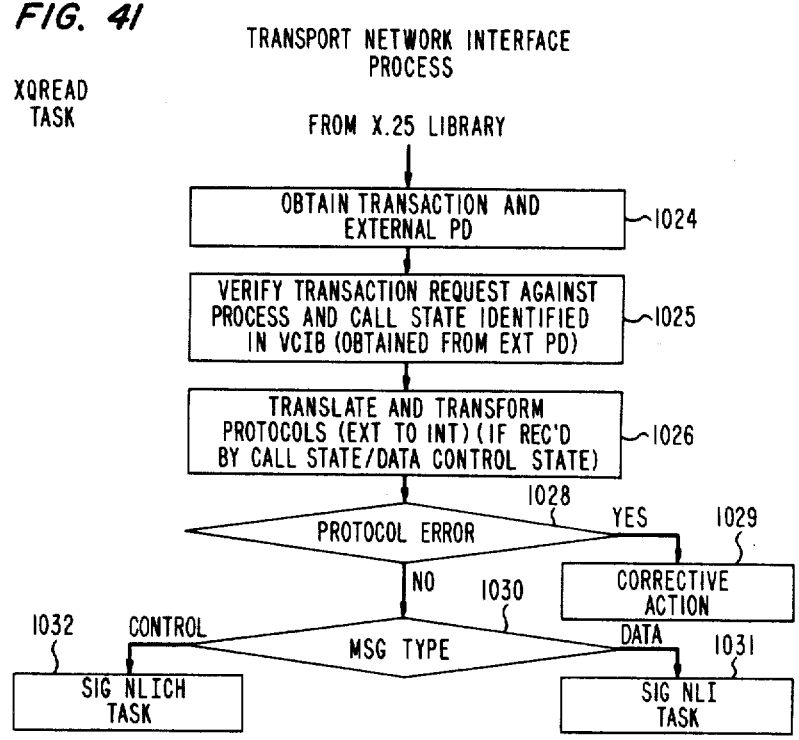

The "accept" transaction is now passed back from the remote node through the transport network to the X.25 Library task of the TNI process in the originating node. The transaction is thereupon passed to the XQREAD task (FIG. 41) which, in step 1024, obtains the buffer address containing the transaction and the external PD. With the request and the external PD available, the XQREAD task, in step 1025, checks the request against the process state and the present call state, which call state is identified in the VCIB. The task in step 1026 then provides appropriate translations and transformations of the protocols. More specifically, in step 1026, the packetized information is changed to information units (IUs) or internal transactions and the header information is placed in the appropriate fields of such IUs or transactions. The task then advances to decision 1028 where it determines whether or not the particular transaction request is appropriate for the state of this call. If the request is inappropriate, the task advances to step 1029 where appropriate corrective action is performed. Assuming, however, that the transaction request is appropriate for the call state, the task advances to decision 1030.

In decision 1030, a determination is made as to whether this transaction is a "control" command or a "data" transaction. If it is a "data" transaction, the NLI task is signaled in step 1031. Alternatively, if this is a "control" transaction, the NLICH task is signaled in step 1032. Since this is an "accept" transaction, step 1032 signals the NLICH task and the NLICH task, in step 1010, identifies this as an "accept" transaction and advances the task to decision 1018. At this point, the NLICH task operates in substantially the same manner as when it receives a transaction from the NLI task providing external to internal translations in step 1020 and completing the VCIB in step 1021. In step 1022, the transaction is delivered to the Network Layer task of the IC Subsystem and the task then retires in step 1023.

Assume now that the connection through the Transport Network Interface process is completed as described above and an end-point process now "writes" a transaction to the connection. This "write" transaction is passed by the Network Layer task of the IC Subsystem to the (outgoing) NLI task. The (outgoing) NLI task then operates in substantially the same manner as it operated when it received the "connect" request, obtaining the transaction buffer from the NL task, verifying the transaction request against the state of the call and transforming the transaction request in the same manner as described above in steps 1001, 1002 and 1003. Assuming there are no errors in the transaction request, the (outgoing) NLI task in decision 1006 advances the task to step 1007 where the XQWRITE task is signaled.

Figure 42:
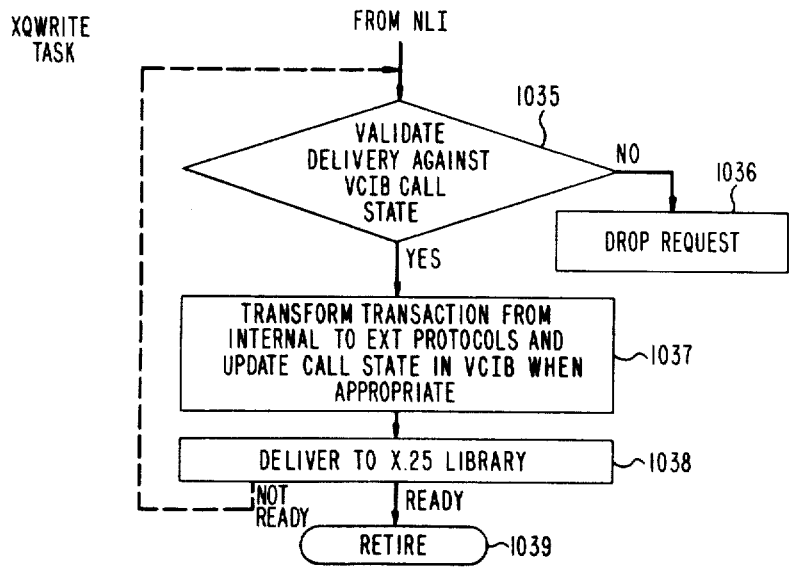

The XQWRITE task (FIG. 42), upon being signaled, advances to decision 1035. In decision 1035, the transaction request is validated against the present state of the call by recourse to the VCIB. If the present transaction request is inappropriate, the task advances to step 1036 which drops the request. Alternatively, if the transaction request is appropriate, the task advances to step 1037 where the transaction is transformed from internal to external protocols and the call state or data control state in the VCIB is changed when appropriate (no changes in such call state being necessary when data is flowing through the connection, as is the case in this present part of our scenario). The transaction is then delivered to the Library task in step 1038 using the PD from the VCIB and, if the Library task is ready to accept the transaction, the XQWRITE task advances to step 1039 where it retires. Alternatively, if the Library task is not ready to accept transactions, the XQWRITE task loops back to decision 1035 to repeat the above-described process.

At the remote end the "write" transaction is delivered to the XQREAD task by the X.25 Library task. The XQREAD task, upon being signaled in this event, advances to step 1024 where it obtains the transaction and the external PD designating the virtual call identity. The XQREAD task then advances to step 1025 where it verifies this read request against the process and call state identified for this PD in the VCIB. In step 1026, the transaction is transformed from external to internal protocols (when data is flowing there is no change made in the call state).

At this point, the XQREAD task advances to decision 1028. In decision 1028, a determination is made as to whether or not the particular transaction request was appropriate for the state of this call. If the request is inappropriate, the task advances to step 1029 where appropriate corrective action is performed. Assuming, however, that the transaction request is appropriate for the call state, the task advances to decision 1030. In decision 1030, a determination is made as to whether the transaction is a control or data transaction. In this case, it is a data transaction and the (incoming) NLI task is accordingly signaled.

Figure 43:
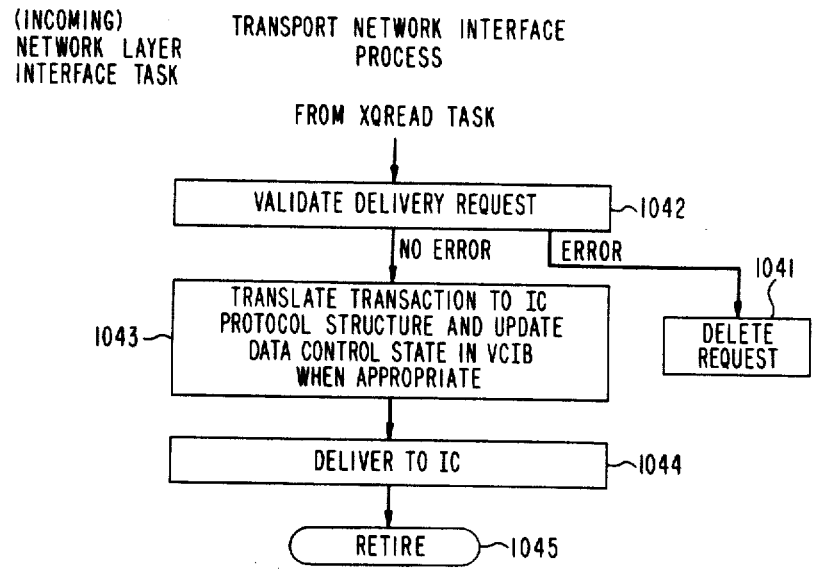
Figure 44:
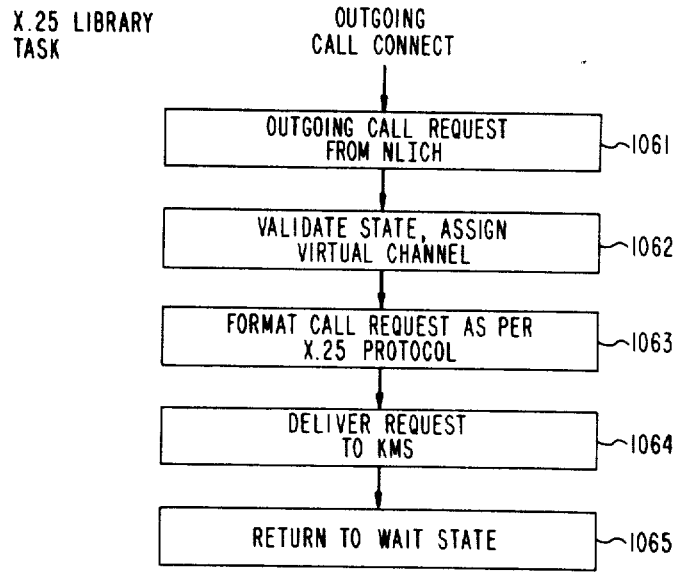
Figure 47:
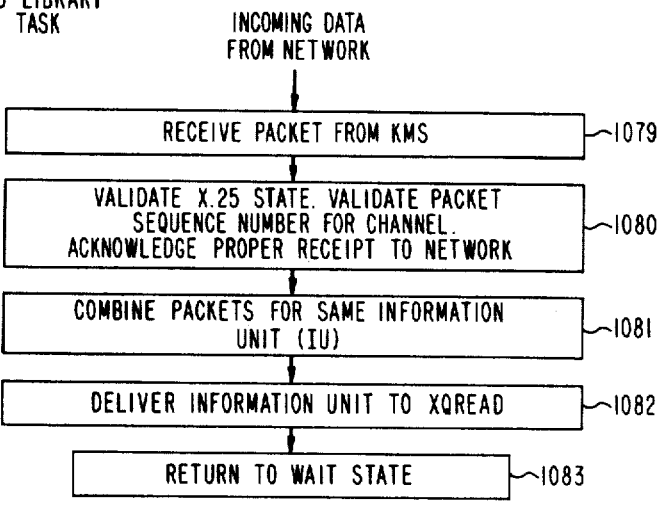
Figure 48:
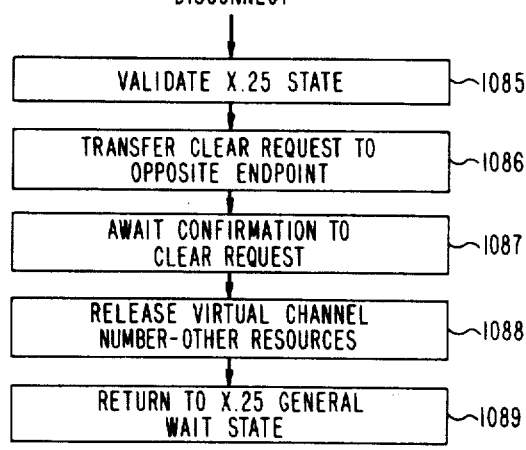

The (incoming) task (FIG. 43), upon being signaled, advances to step 1042. In step 1042, the delivery request is validated as against the call state identified in the VCIB. If the delivery request is inappropriate, the task advances to step 1041 and the request is deleted or dropped. If the request is appropriate, however, the task advances to step 1043 which provides translation of the transaction to the IC protocol structure, that is, creates the information unit (IU) structure with the appropriate header information. The data control state is also updated in the VCIB at this time, if appropriate. Since this is a "write" request, the updating does not, at this time, occur. The task then advances to step 1044 which delivers the transaction and the PD to the Network Layer task of the IC Subsystem. In step 1045 the (incoming) NLI task retires.

At the termination of the message transaction, one or the other of the end user processes delivers a "disconnect" request to the connection between the processes. This disconnect request is thus passed to the TNI process and delivered to the (outgoing) NLI task. As previously described, the (outgoing) NLI task in steps 1001 through 1006 obtains the transaction and the PD from the IC Network Layer task, verifies the transaction against the process and call state indicated in the VCIB and provides the appropriate protocol transformation of the transaction request. Since this is a (disconnect) "control" transaction, decision 1006 of the (outgoing) NLI task delivers this request to the NLICH task. The NLICH task in step 1010 identifies this request as a disconnect transaction and, in response to such a transaction, advances the task to step 1050. In step 1050, the transaction request is verified against the call state in the VCIB. If there is a disconnect "collision", that is, if the other side has already sent through a disconnect, step 1050 advances this task to step 1057 which is described hereinafter.

Assume now, however, that the local user process has initiated the disconnect and the remote process has not sent a disconnect. No collision occurs and step 1050 advances the task to step 1051. In step 1051, the protocol is translated from internal to external. In step 1052, the disconnect request is delivered to the X.25 Library task. The status of the circuit is then updated in the VCIB in step 1053 and the task retires in step 1054.

At the remote end the X.25 Library task signals the XQREAD task of the disconnect request. The XQREAD task thereupon advances to step 1024 where it obtains the transaction and the external PD. As previously described, the XQREAD task then proceeds, in 1025, to verify the transaction request and, in step 1026, to translate and transform the protocols. In decision 1028, it is then determined if there are any protocol errors and, in decision 1030, the XQREAD task signals the NLICH task since this is a "control" transaction.

The NLICH task, upon being signaled, identifies the transaction in step 1010 as a "disconnect" request. This advances the task to step 1050 and, as previously described, a determination is made as to whether this is a collision, the protocol is translated from external to internal and the request is delivered to the Network Layer routine of the IC Subsystem. In step 1053, the VCIB is updated and the task retires in step 1054.

When the remote end user process receives the "disconnect", it is assumed that it returns a "disconnect confirm" transaction. This transaction is delivered by the Network Layer of the IC Subsystem to the (outgoing) NLI task. The (outgoing) NLI task operates in the same way as previously described, delivering the request to the NLICH task. In step 1010, the NLICH task determines the massage type and thereupon advances the task to step 1056. In step 1056, the task verifies this transaction request and, if the transaction request is improper, the request is dropped or deleted. Alternatively, if the transaction request is appropriate, the task advances to step 1057.

The NLICH task advances to step 1057, as noted above, when a "disconnect confirm" request is verified in step 1056 or a collision is identified in step 1050. In either event, the protocol is translated in step 1057 and, more specifically, in this case, where the "disconnect confirm" is being returned by the local end process, the protocol is translated from internal to external. In step 1058, the "disconnect confirm" request is then delivered to the X.25 Library task. Thereafter, in step 1059, the VCIB is updated and, when it is assured that no further data is passing through the connection, the VCIB is cleared. In step 1060, the task then retires.

At the remote end, the X.25 Library task delivers the "disconnect confirm" transaction to the XQREAD task. The XQREAD task, upon being signaled by the X.25 Library task, obtains the transaction and the external PD in step 1024. Thereafter, as described above, the transaction request is verified, the protocol is translated and transformed and, assuming there is no protocol error, decision 1030 of the task signals the NLICH task since this is a "control" transaction.

The NLICH task in step 1010 identifies this "disconnect confirm" request and advances the task to step 1056. As previously described, in step 1056 the transaction request is verified. In step 1057, the protocol is then translated from external to internal and the transaction is then delivered to the Network Layer of the IC Subsystem. In step 1059, the VCIB is then updated and, after the appropriate interval to assure that no further data is passed through the connection, the VCIB is freed. In step 1060, the task then retires. This completes the disconnection.

As previously discussed, when the "connect" request is identified by the NLICH task, it eventually advances to step 1013 and, in step 1013, the task delivers the request to the X.25 Library task. The X.25 Library task (FIGS. 44–48), upon being signaled, advances to step 1061 and, in this step, obtains the request from the NLICH task. The X.25 Library task then advances to step 1062 where it validates the state of the call and assigns a virtual channel to this call. The channel is identified by a path descriptor (PD) and the PD is returned to the NLICH task. The request is now formulated in accordance with X.25 protocol in step 1063, which formatting is further described in *Data Communications Standards*, Edition II, Copyright 1982, McGraw-Hill Publication Co., New York, and more specifically described in "Part 1, International Telegraph and Telephone Consultative Committee (CCITT) Data Communication Recommendations". In step 1064, the "connect" request is delivered to KMS 116 and the task returns to the wait state in step 1065. The request is thereby transmitted via the transport network to the remote node.

At the remote node the "connect" request is received from the transport network vis KMS 116 by the X.25 Library task of the TNI process of the node processor. This advances the Library task to step 1066 where the request is obtained from the network. In step 1067, a virtual channel is assigned for this connection and the state of the call is validated. The message header is then formatted in accordance with the internal protocol in step 1068 and, in step 1069, the call request and the PD identifying the virtual channel is delivered to the NLICH task. The X.25 Library task then retires in step 1070.

When a "write" transaction (for passing data) is delivered by the user process to the Transport Network Interface process, the XQWRITE task in step 1038 passes this transaction to the X.25 Library task. In step 1072, the "write" transaction is obtained from the XQWRITE task. The Library task then advances to step 1073 where it validates the call state and it packetizes the data. In step 1074, the data packet is formatted in accordance with the X.25 protocol and a sequence number is assigned to each packet. In step 1075, the packets are then transferred to KMS 116 for passage through the transport network, the quantity of the flow of the packets being controlled by a conventional control mechanism described in the above mentioned *Data Communications Standards* publication. The task, in step 1076, then awaits an acknowledgement of the reception of the packet by the remote node and, upon reception of such acknowledgement, returns to the wait state in step 1077.

At the remote node, the "write" transaction in packetized form is received from the network via KMS 116 and delivered to the X.25 Library task in the TNI process. The Library task obtains the packet from the network in step 1079 and, in step 1080, validates the X.25 state of the call and checks the packet sequence number, acknowledging receipt. If these conditions are correct, the task then advances to step 1081 where the packets are combined in a single buffer to form an information unit (IU). In step 1082, the PD and the transaction are delivered to the XQREAD task (by delivering the address of the buffer to such task) and, as described above, the XQREAD task will obtain the transaction and the PD in step 1024. The X.25 Library task thereafter returns to the wait state in step 1083.

When an outgoing "disconnect" request is received from the NLICH task (as described above in step 1052), the X.25 Library task validates the state of the call in step 1085 and then advances to step 1086 where it generates a "clear" request and delivers this transaction to the network by way of KMS 116. In step 1087, the task awaits confirmation of the "clear request" and, upon its reception in step 1088, releases the virtual channel number (PD) and also releases other resources dedicated to this virtual channel. In step 1089, the task returns to the wait state.

In the remote node, when the incoming "disconnect" request is received, the X.25 Library task thereat operates in substantially the same manner as when the outgoing "disconnect" request is received from the NLICH task. Thus, the task validates the call state in step 1085, sends a "clear" request to the opposite endpoint in step 1086 and awaits confirmation in step 1087. When the confirmation is received, the task releases the channel number (PD) and other resources in step 1088 and returns to the wait state in step 1089. This terminates the connection between the two remote nodes.

Access Handler Process (Front End Processor)

As previously noted, data from a terminal 101 user is assembled into a byte format by PCS microprocessor 102 and the bytes (which are formatted to identify the data line extending to terminal 101) are forwarded to FEP 103. The EES software system 121 assembles the data bytes into data blocks and these data blocks are sent to the Access Handler Process (AHP) task 120 which is individual to the data line that extends to terminal 101.

Assume now that data is received from terminal 101. When the terminal is initially turned on (on-line condition), this data would constitute an initial signal burst. When the terminal is already on-line, this data might constitute part of a command; such as a "connect" command to call an application program or a "send" command to deliver a message (as previously described). In any event, as each byte is received by the PCS 102, it is assembled into the byte format and passed to the extended execution support system (EES) 121 of the front end processor which accumulates the data in an allocated buffer area until a full block is received. Upon the recognition of the reception of a full block, EES 121 signals the access handling process (AHP) task 120 in the FEP 103 and writes the data block into internal buffer space of AHP 121.

Figure 49:
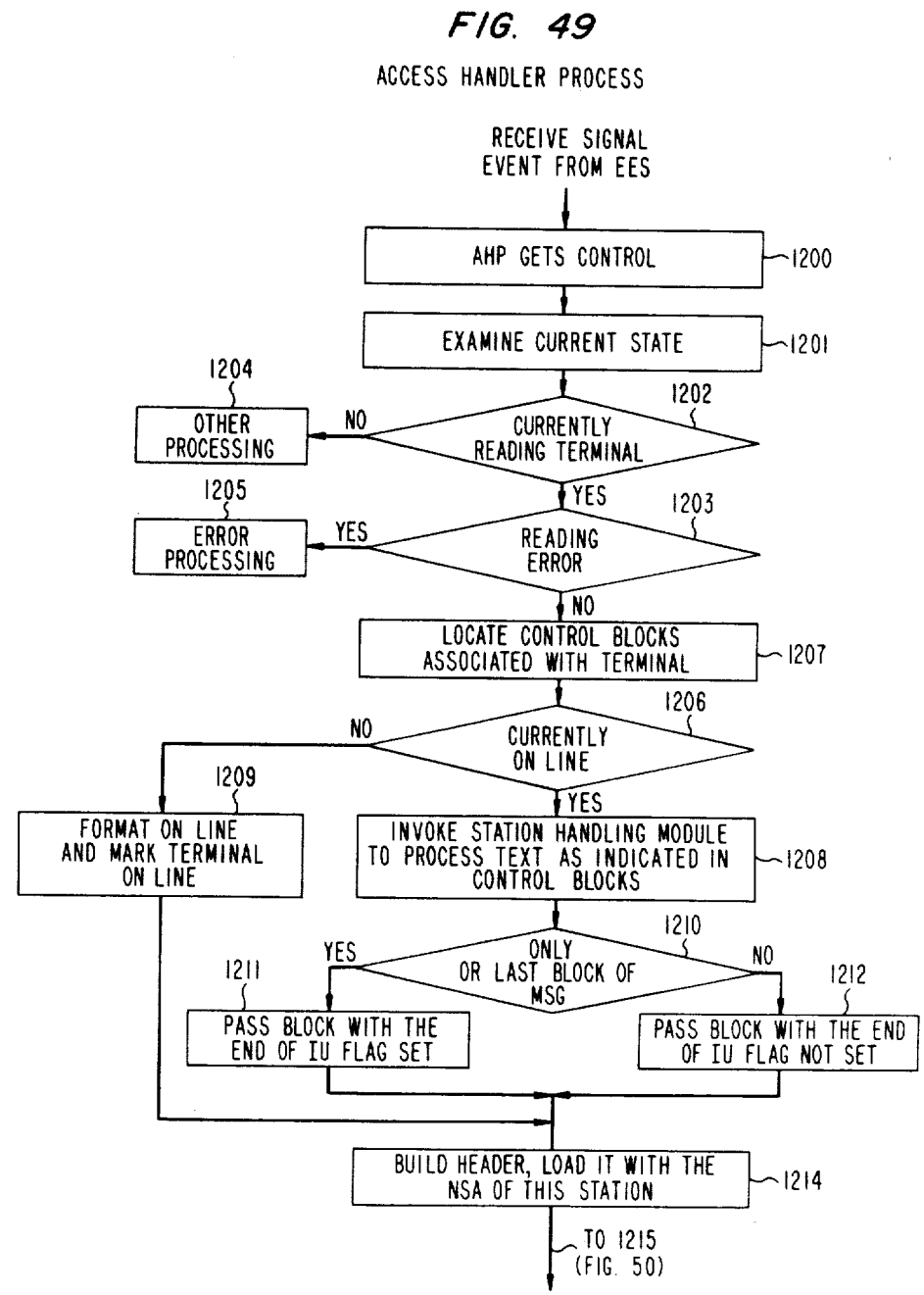
FIGS. 49-51 disclose a flow diagram for an access handler process.

As described below, it is assumed that prior to this signaling, AHP 120 has issued a read request to EES 121 and had allocated an appropriate amount of internal buffer area to store a block of data. The AHP 120 task thereupon went to sleep, awaiting the above-mentioned signal from EES 121. Upon the above-mentioned signaling, the task thereupon wakes and assumes control as depicted in step 1200 (FIG. 49).

After assuming control, the AHP tsk examines its current state in step 1201 to determine whether it is presently reading data incoming from the terminals or receiving data from the node processor. If the current state is reading data from the node processor, AHP 120 branches to step 1204 to process such data, as described below.

In our present scenario, we have presumed that a data block has been received from a terminal and decision 1202, upon determining that this event constitutes the reading of data from a terminal, advances the task to decision 1203 wherein it is determined whether or not an error condition in the reception of the block has been detected by the EES 121 operation system. If a reading error exists, the task advances to step 1205 to advise monitoring and maintenance equipment.

Assuming now that no error condition exists, decision 1203 thereupon advances the AHP 120 task to step 1207 to obtain the control blocks associated with the terminal, which control blocks define certain attributes of the terminal such as its present state (on-line, off-line, connected), the type of code the terminal uses and the mode or format of the commands the terminal sends and receives. The task then advances to decision 1206. In decision 1206, a determination is made by referring to the control blocks as to whether this data is an initial signal (on-line condition) or is data in a command. If this is an on-line condition, the task advances to step 1209 where an on-line message is formatted and the control blocks status is changed to "on-line". Thereafter, the task advances to step 1214. Alternatively, if the terminal is on-line and this data constitutes a command (or part thereof), decision 1206 advances the task to step 1208, invoking a station handling module to process the data. More specifically, the AHP 120 task examines the "station handling profile" stored in the terminals' control blocks to determine whether the code is to be translated or passed on in a transparent manner. The station handling module, step 1208, calls upon these attributes, as stored in the control blocks, to modify the data. Thereafter, the task advances to decision 1210.

Figure 50:
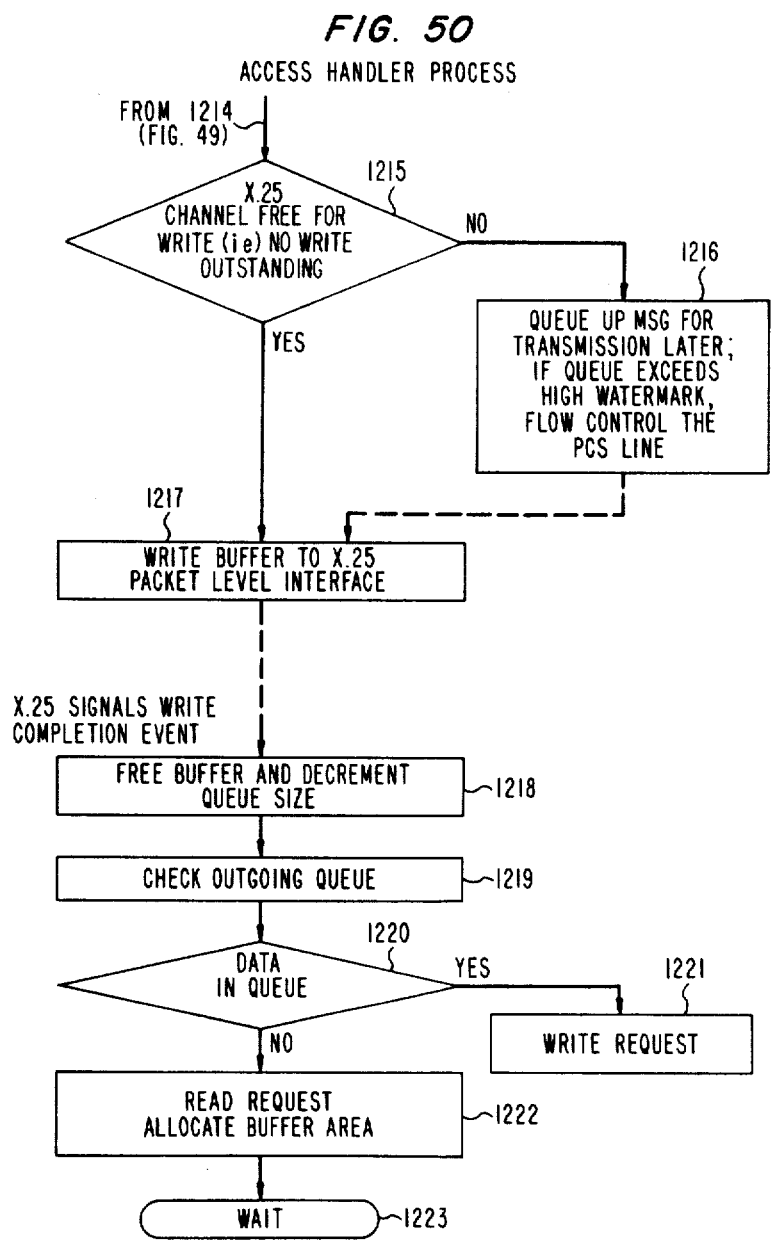

In decision 1210, it is determined whether the block constitutes the only block or the last block of a message or command. This determination is made by monitoring the incoming data and observing whether the EES 121 has received an end-of-block or end-of-command character. In the event that this block constituted the last or only block of the command, and an end-of-block or end-of-command was received, the task advances to step 1211 wherein an end-of-information unit flag is inserted in a field of the data block and with the flag thus inserted the data block is passed to the network interface control module. Alternatively, if the command constitutes a plurality of blocks and the block presently being received is not the last block of such command, decision 1211 advances the task to step 1212 and the end-of-information unit flag is not set. In either event the task advances to step 1214. Of course, if this was an on-line condition, the task advanced directly to step 1214, as previously described.

in step 1214, the network standard address (NSA), which identifies the network address of the sending terminal and the state of the terminal (as identified in the control blocks) are loaded into the header of the data block to accompany the end of information unit flag. The AHP task then advances to decision 1215 (FIG. 50). In the event that the X.25 routine 122 is not presently processing a prior data block, decision 1215 advances the task to step 1217. Alternatively, if a prior data block is presently being processed by the X.25 routine 122, decision 1215 advances the task to step 1216 and the present data block is queued up for later transmission, that is, awaiting the event when X.25 routine 122 signals the completion of the processing of the prior data block.

Assume now that the X.25 routine 122 has completed its processing and the AHP 120 task has a block of data for transmission or has queued up a data block. The task advances to step 1217 wherein a write request is passed to the X.25 routine 122. At the same time the AHP 120 task provides a pointer to the internal buffer containing the data block to the X.25 routine 122, together with a length-of-block designation.

The data block is now written into buffer area of the X.25 routine 122 (which proceeds to packetize the data and utilizing standard X.25 protocol pass the information to link 106). After the data block is passed to the X.25 routine 122, it returns a write completion to the AHP 120 task. The AHP task upon receiving the write completion advances to step 1218 where it frees the internal buffer space allocated to the data block and in the event that the data block has been queued, it decrements the queue size. Upon performing these functions the task proceeds to step 1219 where it determines whether X.25 routine 122 has a data block destined for the terminal. Decision 1220, if there is a data block for the terminal, advances the task to step 1221 to process such block, as described below. If no block is destined for the terminal, decision 1220 advances the task to step 1222 where a new read request is issued to EES 121 and internal buffer space allocated to such request. The task then advances to step 1223 where it retires.

Figure 51:
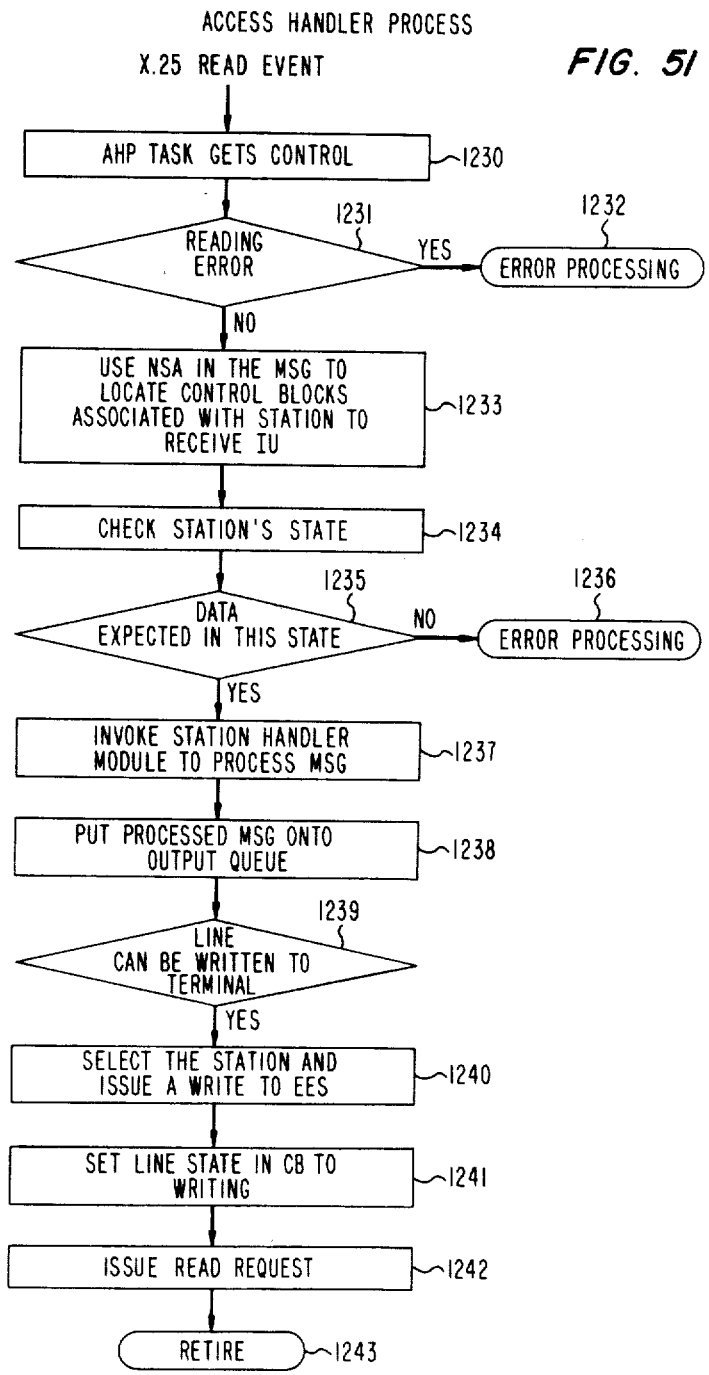

Data from node processor 107 is delivered in packet form over link 106 to X.25 interface routine 122 as previously described. The X.25 interface routine, in addition to providing the link level protocol, assembles the data packets into information units of data blocks and, when such a data block is assembled, signals the AHP task associated with the incoming channel on link 106 conveying the data packets. As described below, AHP task 120, after processing a prior data block from node processor 107, issued a read request to X.25 interface routine 122 and provided a pointer to the routine to available internal buffer space. Accordingly, when X.25 interface routine 122 signals the read event and under the presumption that AHP task 120 has allocated internal buffer area, the interface routine deposits the data block in the internal buffer space of AHP 120, as depicted in step 1230 (FIG. 51). This advances the task to decision 1231.

In decision 1231, a determination is made as to whether the depositing of the data block by X.25 interface routine 122 has been accomplished without error. If an error occurs, the task advances to step 1232 where error procedures are provided, such as noting the type of failure on monitoring and maintenance equipment. Alterntively, if the data block is deposited without error, decision 1231 advances the task to step 1233. In step 1233, the NSA in the data block header is obtained and using this NSA the control block associated with the terminal station is located. The task then advances to step 1234 where a determination is made from the control blocks as to the present state of the terminal station. In decision 1235, it is determined whether data is expected in this present state. For example, a prompt would be expected if the terminal is on-line. Message data, however, would be expected only in the event that the terminal is in the connected state. If the terminal is not in the appropriate state, the task advances to step 1236 to provide appropriate error processing. Alternatively, if the data in the data block is appropriate for the present state of the terminal, the task advances to step 1237.

In step 1237, the station handling module is invoked to provide the data in the data block. As previously noted with the station handling module invoked, recourse is had to the terminal station's control block to determine whether various code translations and formatting are required. After such appropriate translating and formatting, the task advances to step 1238 where the processed data block is placed on the output queue which will be accessed by EES 121, the software that breaks the data block down into data bytes for transmission to PCS 102. At this time, the task advances to decision 1239 to determine if the data line is in the proper condition for transmission to the terminal. If the condition of this terminal is appropriate, the task advances directly to step 1240 where the appropriate selection code for the terminal is generated and placed in a "header" for the data block, which select code is initially sent to the terminal to select the terminal for reception of the data. In addition, in step 1240, a write request is issued to the EES 121 software so that such software will then go to the queue to obtain the data block. The task then advances to step 1241 where it awaits the line station in the control block to "writing" and then in step 1242 issues a read request to X.25 interface routine 122 providing the routine a pointer to available buffer space in the task. The task finally goes to step 1243 where it retires awaiting the next event from EES 121 or X.25 interface routine 122.

Front End Processor Interface Process

Figure 52:
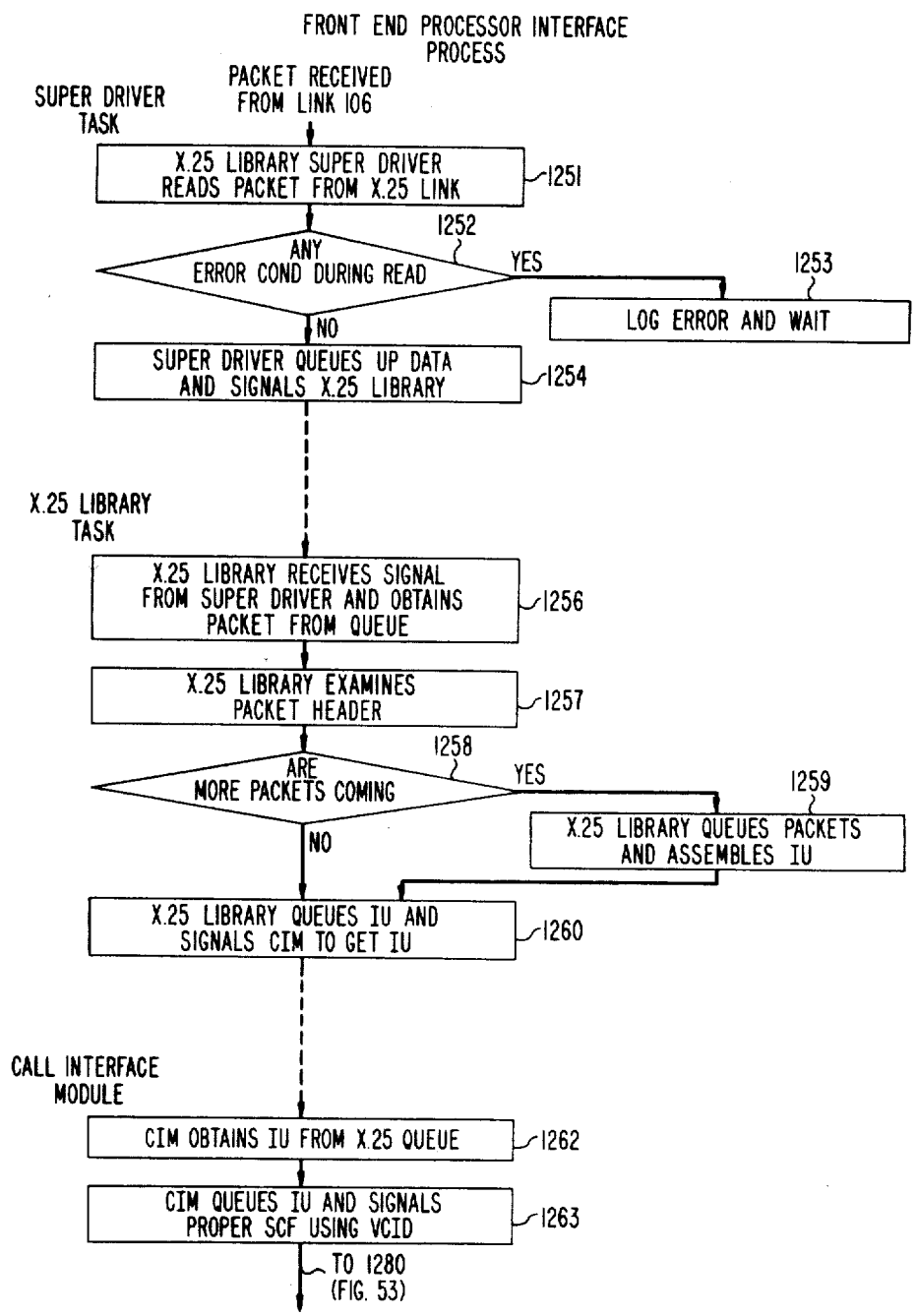
FIGS. 52 and 53 show a flow diagram for a frontend processor interface process.

As noted above in the general description, packet or packets received over X.25 link 106 by node processor 107 are directed to X.25 Interface routine 124 of Front End Processor Interface (FEPI) process 123. Each received packet is initially acted on by an element of the Interface routine, hereinafter identified as the Super-Driver task. This task comprises a plurality of steps 1251 through 1254 (FIG. 52).

In step 1251 of the Super-Driver task, the incoming packet is read from X.25 link 106 into buffer area allocated to the task. The task then advances to step 1252 where a decision is made as to whether any error condition occurred during the reception of the packet. More specifically, determination is made as to whether any of the equipments in or associated with the link are indicating any error conditions in operation. If link equipment is indicating error conditions, the Super-Driver task advances to step 1253 wherein an error condition is logged and the loss of the X.25 link 106 is reported to maintenance equipment, in any conventional manner, to apprise maintenance personnel that a trouble condition exists on the link.

In the event that no error conditions exist, the Super-Driver task advances to step 1254. In step 1254, the Super-Driver task places the buffer address of the packet on a Super-Driver queue and sends a signal to the next (X.25 Library) task.

The X.25 Library task comprises steps 1256 through 1260. In step 1256, the Library task wakes up (starts up) in response to the signal from the Super-Driver task (step 1254) and proceeds to obtain the buffer address of the packet from the Super-Driver queue. The X.25 Library task then advances to step 1257 where it examines the header of the packet and acknowledges receipt back to X.25 routine 122 in FEP 103 via the X.25 link 106 in accordance with level 3 of the X.25 protocol as described in the above-mentioned *Data Communications Standards* publication.

After the acknowledgement, the X.25 Library task advances to step 1258 where the "more-packets-coming" flag in the packet is examined to determine whether the packet is the last (or only) packet in the information unit (IU). In the event that there are further packets in the IU, the task advances to step 1259 where a check is made as to whether this packet is in the proper numbered sequence and assembles the buffer associated with this packet with the buffer of the other packets of the information unit. When the final packets of such information unit is correspondingly processed, the X.25 Library task advances to step 1260. Alternatively, if there is only one packet in the information unit or this is the last packet of the IU, the task advances directly from step 1258 to 1260.

In step 1260, the X.25 Library task places the buffer address of the information unit in its queue and sends a signal to the Call Interface module or task.

The Call Interface module provides steps 1262 and 1263. In step 1262, the Call Interface module, upon receiving the signal from the X.25 Library task, obtains the buffer address of the information unit out of the X.25 queue and then advances to step 1263. In step 1263, the Call Interface module identifies the network standard address (NSA) and thereupon sends a signal to Station Call Facility 125 which, as previously noted, is individually reserved for terminal 101.

Figure 53:
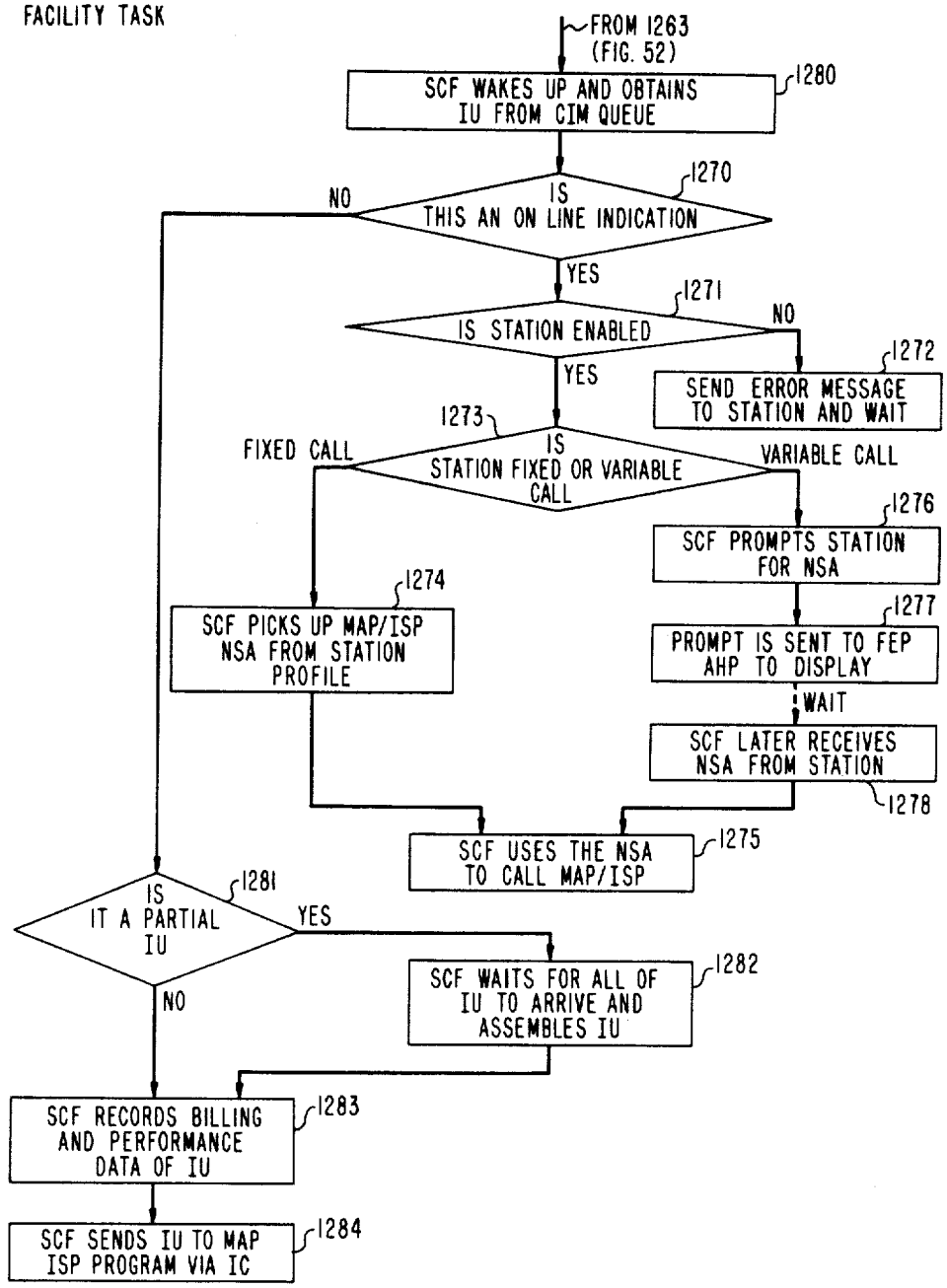

Station Call Facility task 125 (FIG. 53), upon awakening in response to the signal from the Call Interface module, advances to step 1280. In step 1280, the task reads the buffer address of the information unit from the Call Interface module and then advances to decision 1270. A determination is made here as to whether this IU constitutes an on-line condition. We assume here that the terminal has just gone on-line, this IU is an on-line indication and decision 1270 thus advances the task to decision 1271. In decision 1271, the status of the terminal is examined to determine if the terminal is presently enabled. This indication is advantageously provided by the local maintenance people or may be provided by customer controlled signaling to provide a locally stored indication. In any event, assuming that this locally stored indication designates that the station is not enabled, the task advances to step 1272 and, in step 1272, an error message is created. This error message is then returned by way of the virtual connection on link 106 and the task then waits for a response from the terminal or for a correction from the maintenance personnel.

Alternatively, if the locally stored indication designates that the station is enabled, the task advances to decision 1273. In decision 1273, a determination is made as to whether this terminal station is authorized to make fixed or variable calls. If the terminal is authorized to make a fixed call, the task advances to step 1274. In step 1274, the Station Call Facility obtains a locally stored station profile which constitutes a statement of the terminal station's capabilities and authorization. This station profile will contain the NSA of the fixed destination (which presumably will be MAP-ISP). This NSA is thus obtained and the SCF task advances to step 1275 described below.

If the terminal station is arranged to make variable calls, decision 1273 will advance the task to step 1276. In step 1276, the Station Call Facility generates a prompt, requesting the address of the destination process. This prompt in step 1277 is returned to the AHP task 125 in the front end processor by way of the virtual circuit on line 106 and the AHP task provides the display for the terminal as previously described. SCF thereupon awaits for the response from the terminal station and presuming that the terminal sends the NSA of MAP-ISP, this response to the prompt is passed back through the virtual circuit on link 106 to SCF and SCF receives the NSA in step 1278. This advances the task to step 1275.

In step 1275 which can be reached via step 1274 or 1278, SCF invokes the IPC-Connect primitive of the IC Subsystem, generating a transaction which includes the NSA of MAP-ISP. This transaction is thus passed to the IC Subsystem to thereby initiate the creation of MAP-ISP and to prepare the connection, as noted above, and as described in further detail hereinafter.

With MAP-ISP created and initialized and the connection extended from SCF to MAP-ISP, data, in the form of information units, can be passed in either direction and any data originated by MAP-ISP (such as prompts from the application program) will be passed back through FEPI and the front-end processor to the terminal. In our scenario, as previously described, the terminal user, in response to the MAP-ISP prompt, transmits the "send" command. This command is returned to the node processor and the FEPI process performs the above-described steps 1251 through 1263.

The Station Call Facility task 125 then awakens in step 1280 (upon receiving the signal from the Call Interface module) and reads the buffer address of the information unit from the Call Information module queue. The task then advances to decision 1270 to determine whether this is an on-line indication. Since this constitutes a command (the "send" command), decision 1270 advances the task to step 1281 which examines the "end of information unit" flag in the information unit header (placed there by front end processor 103) to determine whether or not this is a partial or complete information unit. In the event that this is a partial information unit, Station Call Facility task 125 advances to step 1282 where it will assemble the buffer addresses of the partial information units and await the arrival of the final portion of such information unit. Upon such arrival of the final portion of the information unit, the task advances to step 1283. Alternatively, if a complete information unit was received in step 1281, the task advances directly to step 1283.

In step 1283, Station Call Facility task 125 advantageously develops billing and performance data derived from the virtual call identification previously determined for preparing customer accounting records, in a manner known in the art. Upon the development of such data, the task advances to step 1284 wherein a call is issued to the Internal Communication Subsystem to convey the information unit to the MAP-ISP destination by way of the previously completed connection. More particularly, the IPC-Write primitive is invoked, the buffer address of the IU is placed on the Station Call Facility queue and the size of the IU is defined and stored, all being accessible to the IC Subsystem to permit writing the IU into the connection.

Data Base Service

Processes in any processor, such as node processor 107, have the capability of opening up data base storage areas in a data base processor, such as data base processor 108, opening up files in such opened storage areas and accessing records in the opened files for the purpose of writing information into such records, modifying the information in the records, or reading the information in the records. These user processes can thereafter close the files and storage areas. Each user process includes basic routines or primitives which individually interchange instructions and data by way of the IC Subsystem with Data Base Work Manager process 131 or Data Base Server process 130 to provide each of the functions such as opening a storage area or a file or reading (or writing into or modifying) a record or closing the file or storage area. The basic routines in each user process are substantially identical to the corresponding basic routines in the other user processes whereby the user processes interact with the data base system in substantially the same manner.

To open a data base storage area, a user process invokes an internal OPENSA primitive or routine, supplying the routine the "name" storage area. It can be appreciated that a storage area may be assigned to a process, a user or a customer and the "name" of such area may be supplied by the user process. One such scenario for supplying a storage area name is described hereinafter with respect to the MAP-ISP process.

Figure 54:
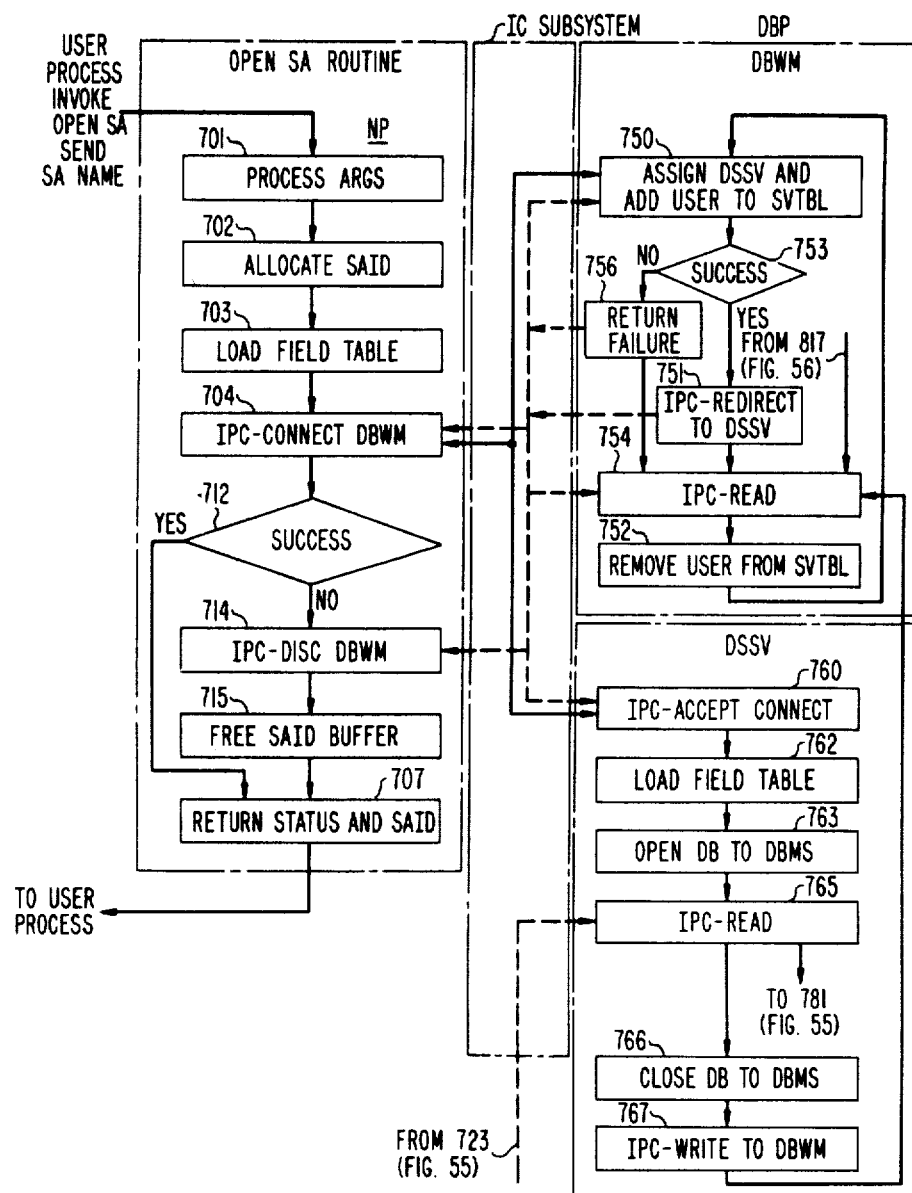
FIGS. 54-56 depict a flow diagram of several processes providing a data base service capability for the multiprocessor data and communication processing system.

Upon being invoked, routine OPENSA (FIG. 54) advances to step 701 wherein the routine processes the arguments supplied by the user process. More specifically, the OPENSA routine confirms that the storage area name is, in fact, valid with respect to its syntax. The routine thereupon advances to step 702 where it allocates internal buffer space for storage area control information. After such allocation, the routine advances to step 703. In step 703, the routine accesses a field table to obtain control information relating to the named storage area, loading such information into the internal buffer area. Exemplary information includes the internal identity (ID) of the named storage area, the types of records in the storage area, the fields for each record type, the structure of the data and the length of such fields.

The routine now advances the step 704 to generate an IPC-Connect command, directing this command to the Data Base Work Manager (DBWM) process and including in the command the storage name.

As previously described, the PIC-Connect command, when directed to the Internal Communication Subsystem, completes a connection to the process indicated in the command. In this case, as previously noted, the call is made by MAP-ISP 126 and the connection is extended by the MAP-ISP IC Subsystem through the Interprocessor Interface of the node processor, the data bus and the Interprocessor Interface of the data base processor to finally connect to the IC Subsystem of the Data Base Work Manager process 131.

The Data Base Work Manager process, upon receiving the IPC-Connect command from the IC Subsystem, proceeds to assign an available Data Base Server (DBSV) process 130, which assignment function is identified as step 750. Upon the assignment being made, DBWM process 130 adds the user process to a local server table. The process then advances to decision 353 to determine whether a server has been successfully assigned. If the assignment is successful, the process advances to step 751 to generate an IPC-Redirect command back to the IC Subsystem, identifying in the command the identity of the Data Base Server process which has been assigned. Alternatively, if there is a failure to assign a Data Base Server, the Data Base Work Manager process advances to step 756 to return an indication to the OPENSA routine that the process failed to successfully assign a Data Base Server. In either event, DBWM 131, in step 754, generates a "read" request and awaits the response from the server, if assigned, or the OPENSA primitive, if a server is not assigned.

The IPC-Redirect command, as previously described, redirects the interprocess connection from the Data Base Work Manager process to the assigned Data Base Server process, thereby connecting the DBSV process to the OPENSA routine which initiated the connection. When the DBSV process receives the IPC-Redirect command from the Data Base Work Manager via the IC Subsystem, it advances to step 760. In this step, the DBSV process generates an IPC-Accept Connect command and sends this command back through the IC Subsystem to the OPENSA routine by way of the previously redirected connection.

In step 762, the process loads the information from the local field table into local allocated buffer area. It is noted that this field table information corresponds to the field table information in the node processor which, as described above, includes the number of fields and the type and length of each of the fields in the storage area. The Data Base Server process then advances to step 763 where it issues an Open Data Base command to the data base management system, identifying the storage area of the terminal user. The data base management system proceeds to open up the storage area, returning to the Data Base Server process an indication that the storage area has been opened. The Data Base Server process then advances to step 765 where it issues an IPC-Read request and retires awaiting the next command from the process using the data base service.

At the node processor, the OPENSA routine, in response to the IPC-Accept Connect command from the DBSV process of the "unsuccessful assignment" transaction from the DBWM process, advances to decision 712. In the event that a Data Base Server process has been assigned and the IPC-Accept Command has been received, decision 712 advances the routine to step 707 which will return a status response to the user process together with the storage area ID. This terminates the operation of the OPENSA routine.

Alternatively, in the event that a Data Base Server process is not successfully assigned by the Data Base Work Manager process, the OPENSA routine is advanced by decision 712 to step 714. In step 714, the IPC-Disconnect command is generated and directed back to the Data Base Work Manager process by way of the IC Subsystem. The OPENSA routine than advances to step 715 where it frees its internal buffer thereby eliminating the identities of the terminal user and storage area and further eliminating the information loaded therein from the field table. The routine than advances to step 707. In this case, step 707 of the routine generates a response back to the user process indicating the completion of the OPENSA routine and designating that a Data Base Server has not been successfully assigned.

At the data base processor, the Data Base Work Manager process, in response to the IPC-Disconnect command issued in step 714, advances from step 754 to step 752. In step 752, the DBWM removes the user process from its internal server table and loops back to step 750 to assign the next Server.

Figure 55:
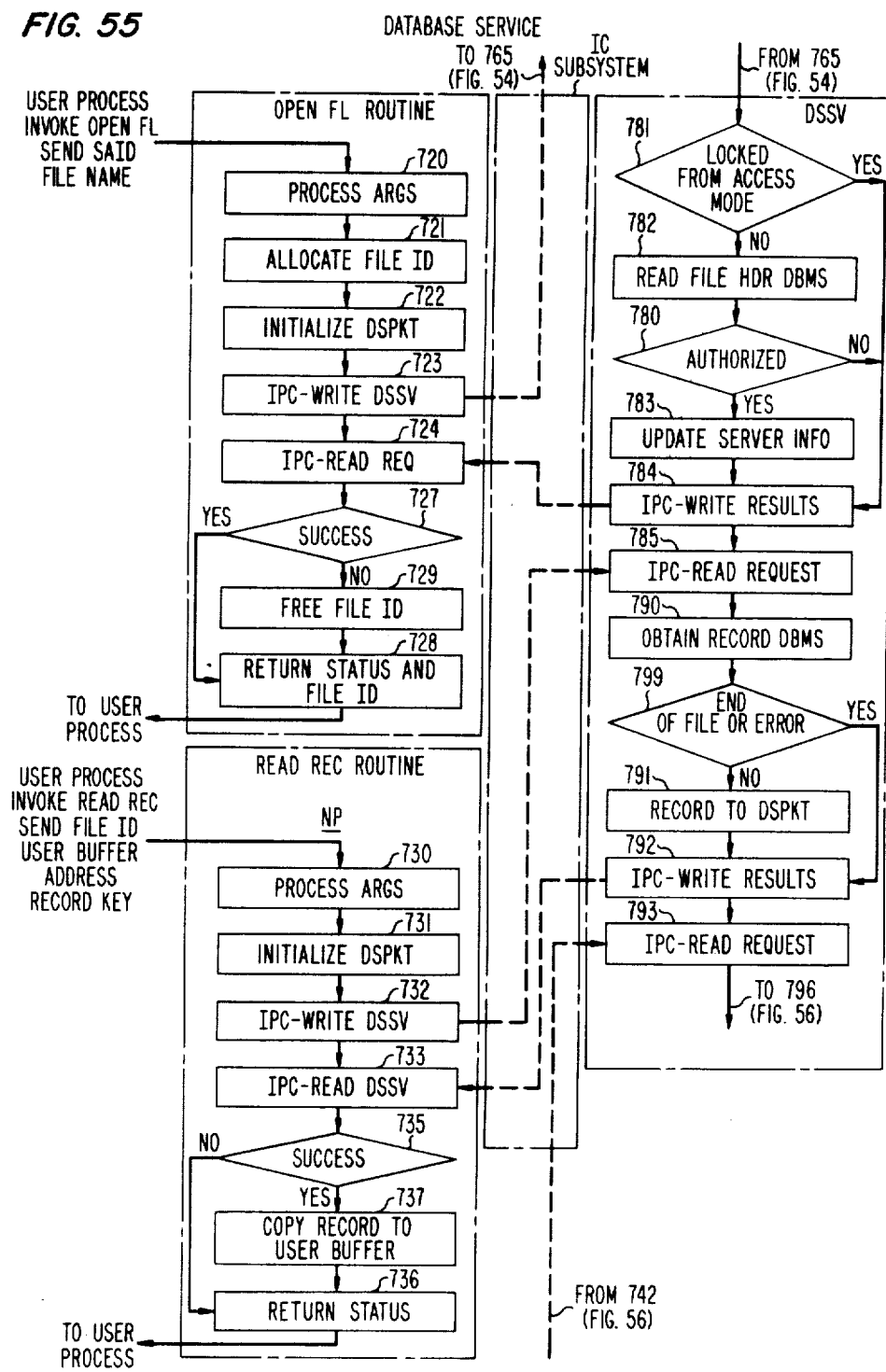

Assuming now that the data base storage area has been successfully opened, the user process may then choose to open one or more files in the storage area. To open a file, the user process invokes the OPENFL routine (FIG. 55), sending the storage area ID and the file name to the OPENFL routine. The OPENFL routine thereupon advances to step 720 where it processes the arguments presented by the user process, which arguments include the syntax of the file name and the storage area identifier. The OPENFL routine then advances to step 721 to allocate appropriate internal buffer area to contain a file identifier and to store further information as discussed below. The routine then advances to step 722.

In step 722 a "data base server" packet is initialized, which packet will contain the storage area and file names. After the packet is produced, the OPENFL routine advances to step 723 and an IPC-Write command is generated, the packet is issued to the IC Subsystem for coveyance over the previously formed connection to the Data Base Server process. The routine then advances to step 724 where it issues an IPC-Read request and then awaits a response from the Data Base Server.

As noted above, the Data Base Server has issued an IPC-Read request in step 765. When the IPC-Write command is received from the OPENFL routine, the DBSV process advances from step 765 to decision 781. Decision 781 determines whether the particular file identified in the command is presently locked to the appropriate access mode, that is, in this present scenario, whether the file is available to be placed in the "read" mode. In the event that the file is presently locked out of the appropriate access mode, that is, not available to be read, decision 781 advances the process to step 784. Step 784 issues an IPC-Write command which contains the information that the file is not presently available to be read and step 784 directs this command back through the IC connection to the OPENFL routine. Alternatively, if the file is not locked from the access mode and available for reading, decision 781 advances the routine to step 782.

In step 782, a "Read File Header" command is issued to the data base management system. The data base management system, in response to the command, reads out the file header and sends the header to the Data Base Server process, advancing the process to decision 780.

In decision 780, the DBSV process accesses a local authorization table to determine whether or not the terminal user is permitted to access the particular file identified in the command. If the authorization table indicates that the user cannot access the file, the DBSV process advances to step 784 which issues an IPC-Write command containing the information that the user is not authorized to enter the file and directs the command back through the IC connection to the OPENFL routine. In the event, however, that the user has the authorization to enter the file, decision 780 advances the process to step 783.

In step 783, the process updates internal information which is useful when subsequently writing information into the file as described below, such information including an entry showing this file opened by the user process and the amount of storage used by such file. In the present scenario, this information updating is performed in a conventional manner and the process thereafter advances to step 784. In this case, step 784 issues an IPC-Write command indicating that the file has been opened and in the appropriate (read) mode and directs the command to the OPENFL routine. The process thereupon advances to step 785 where it issues an IPC-Read request and then retires awaiting to hear the next command from the node processor.

When the OPENFL routine receives the IPC-Write command, it advances to decision 727. In the event that the IPC-Write command from the Server indicates that the file was successfully opened, decision 727 advances the routine to step 728. In step 728, the routine passes an indication back to the user process that the file was successfully opened and identifies to the user process the ID of the file. Alternatively, if the IPC-Write command of the Data Base Server process indicates that the file was not successfully opened, decision 727 advances the OPENFL routine to step 729. In step 729 the file ID of the routine is freed and the routine advances to step 728 where it returns the user process an indication that the file was not successfully opened.

Assuming that the file has been successfully opened, the user process may proceed to open another file, by again invoking the OPENFL routine and sending the storage area ID and file name. Alternatively, the user process may read out one or more records in an opened file by invoking the READREC routine. If the user process desires to read out all the records of the file, the user process, upon invoking the READREC routine, sends the file ID and the address of user buffer allocated for the records. If the user process desires to read out a particular one of the records, the user process also sends to the routine the "key" of the record. In either event, the READREC routine advances to step 730 which processes the arguments presented to it.

The principal arguments processed in step 730 constitute the file ID, the user buffer address and the record "key", if any. The routine thereupon advances to step 731 which initializes a "data base server" packet. This packet will contain the names of the storage area and the file (and possibly the "key" of the record). After the packet is initialized, the routine advances to step 732 where an IPC-Write command is generated to be directed to the Data Base Server over the previously formed connection. The command will contain the packet initialized in step 731 and will be forwarded over the connection to the Data Base Server. The READREC routine then advances to step 733 where it issues an IPC-Read request and then stops to await the response from the Data Base Server.

At the Data Base Server, the reception of the IPC-Write command from the READREC routine advances the process from step 785 to step 790. In step 790, the Data Base Server process issues an Obtain-Record command to the data base management system. The Data Base Server process will obtain the record, noting the record position in the file so that upon the next request (if any) from the READREC routine to read a record in the file, the Server will simply proceed to obtain the next successive record (if any) in the file. Alternatively, if all of the records were previously obtained and the present sequential request exceeds the number of records in the file, the data base management system responds that the record cannot be obtained and indicates that this constitutes the end of the file. In any event, the Server process advances to decision 799 which advances the process to step 791 if a record was successfully obtained or directly to step 792 if the end of the file has been reached or an error has occurred.

In step 791, the record obtained from the data base management system is placed into a packet and the Data Baser Server advances to step 792 which issues an IPC-Write command, sending the packet back to the READREC routine in the node processor. Alternatively, if end of file was reached or an error occurred, decision 799 directly advanced the process to step 792 and an end-of-file or error indication is placed in the packet sent to the READREC routine. The Data Base Server process then advances to step 793 where it issues an IPC-Read request and awaits the next request from the user process.

At the node processor, the READREC routine, in response to the IPC-Write command, advances to decision 735. In the event that the end of the file has been reached and the record has not been successfully read out, decision 735 advances the routine to step 736. In step 736 the routine returns an "end-of-file" indication back to the user process. Alternatively, if the record has been successfully obtained, decision 735 advances to step 737. In step 737, the record is obtained from the packet and copied into the buffer area identified by the user process. The READREC routine thereupon advances to step 736 which returns to the user process an indication that the record has been successfully obtained and placed in the user buffer.

The user process may then request the next successive record by again invoking the READREC routine and sending the file IDs. This results in the above-described sequence being repeated and the next record of the file being obtained and placed in the user's buffer. This looping may thus continue until the final record of the file is obtained and, thereafter, the READREC routine returns the end-of-file indication to the user.

Figure 56:
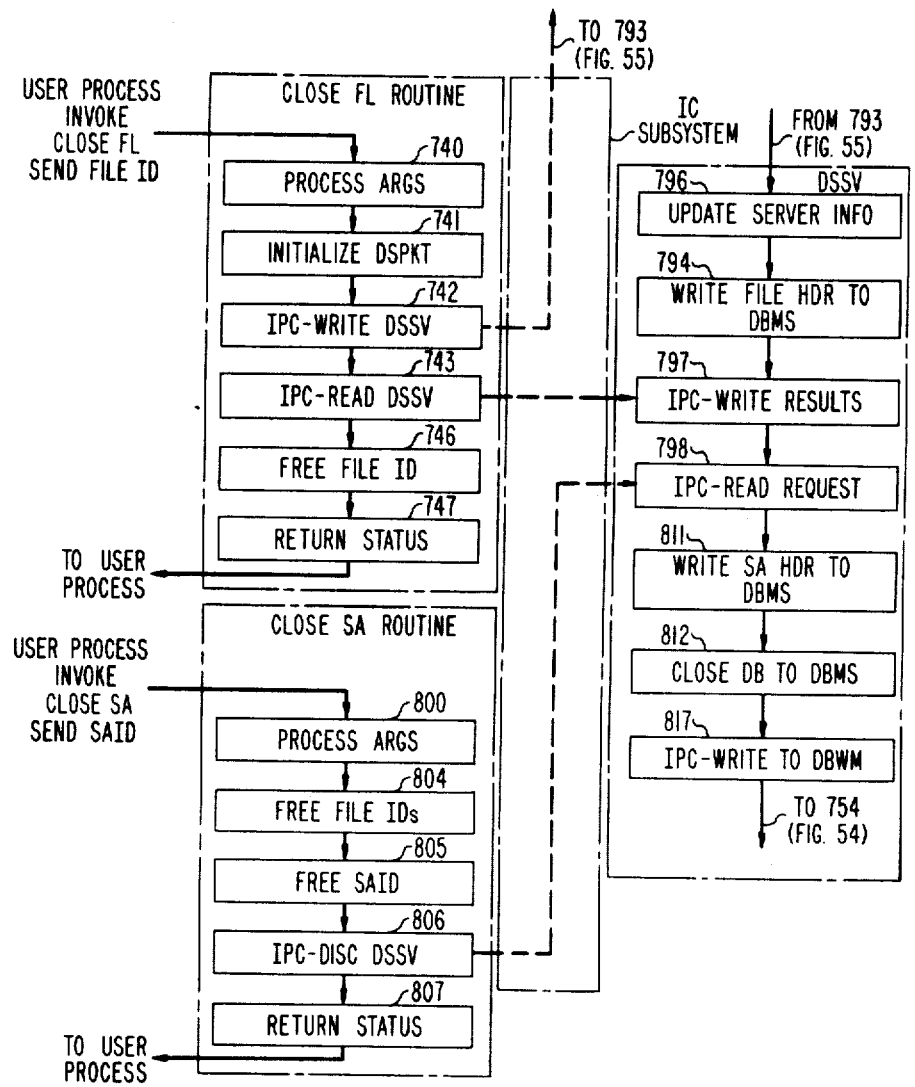
Figure 57:
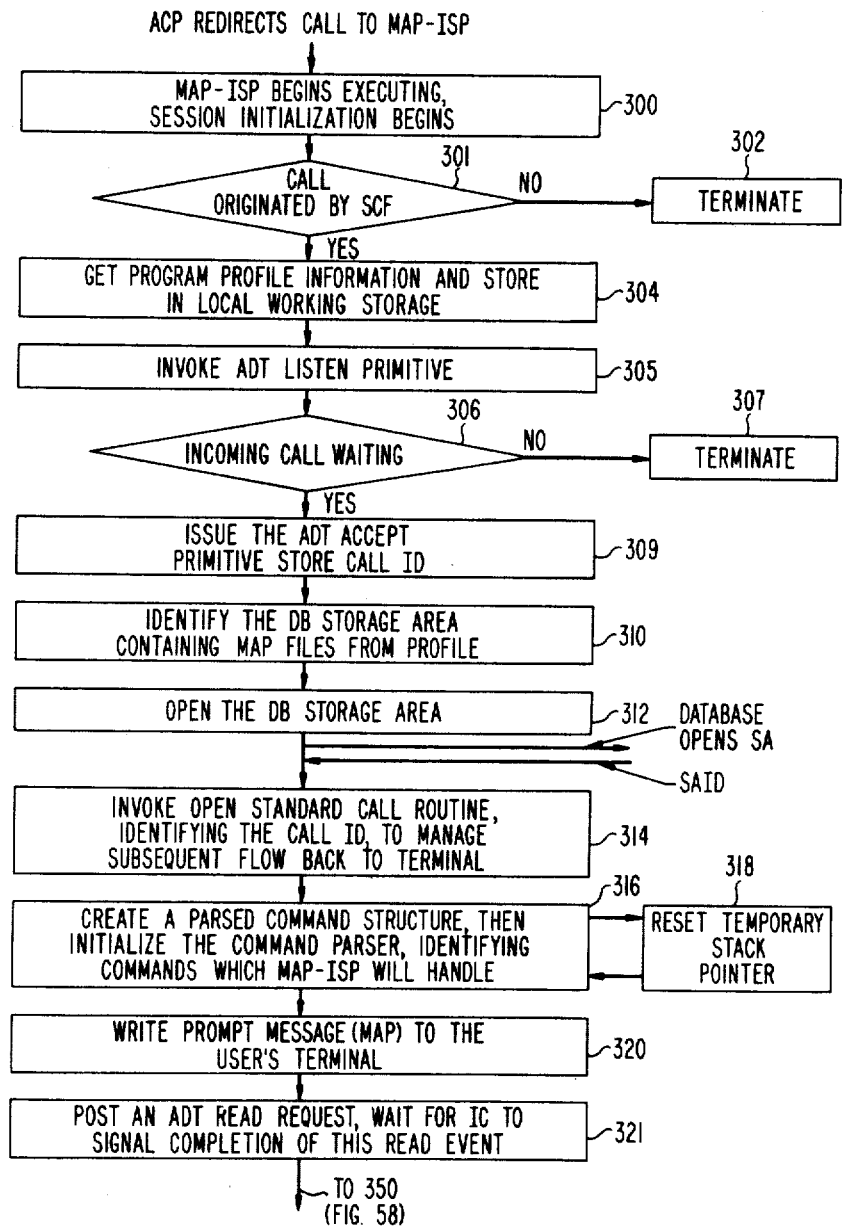
FIGS. 57-61 depict a message application process which might advantageously be a customized process available to a specific customer or user.
Figure 58:
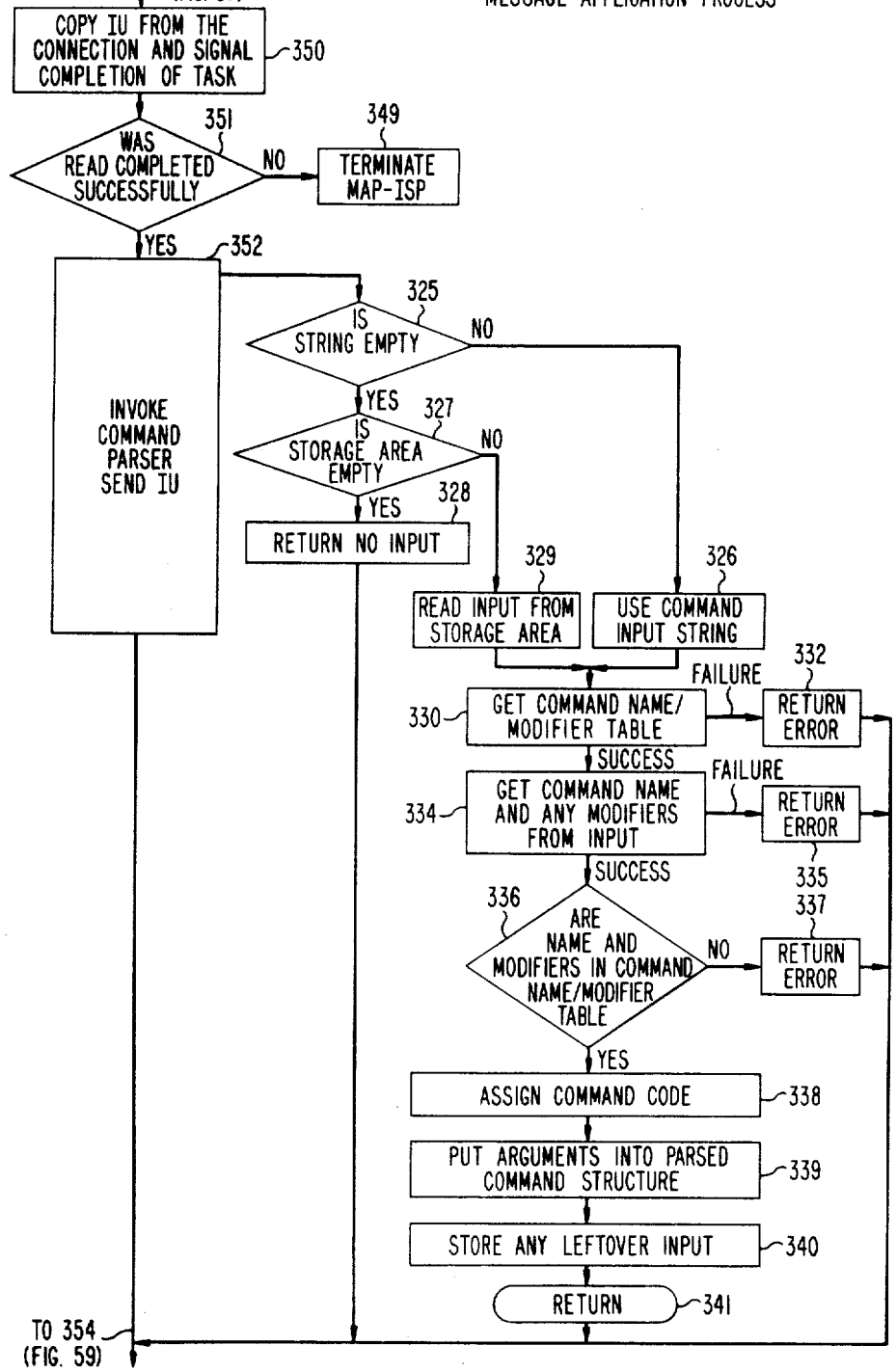
Figure 59:
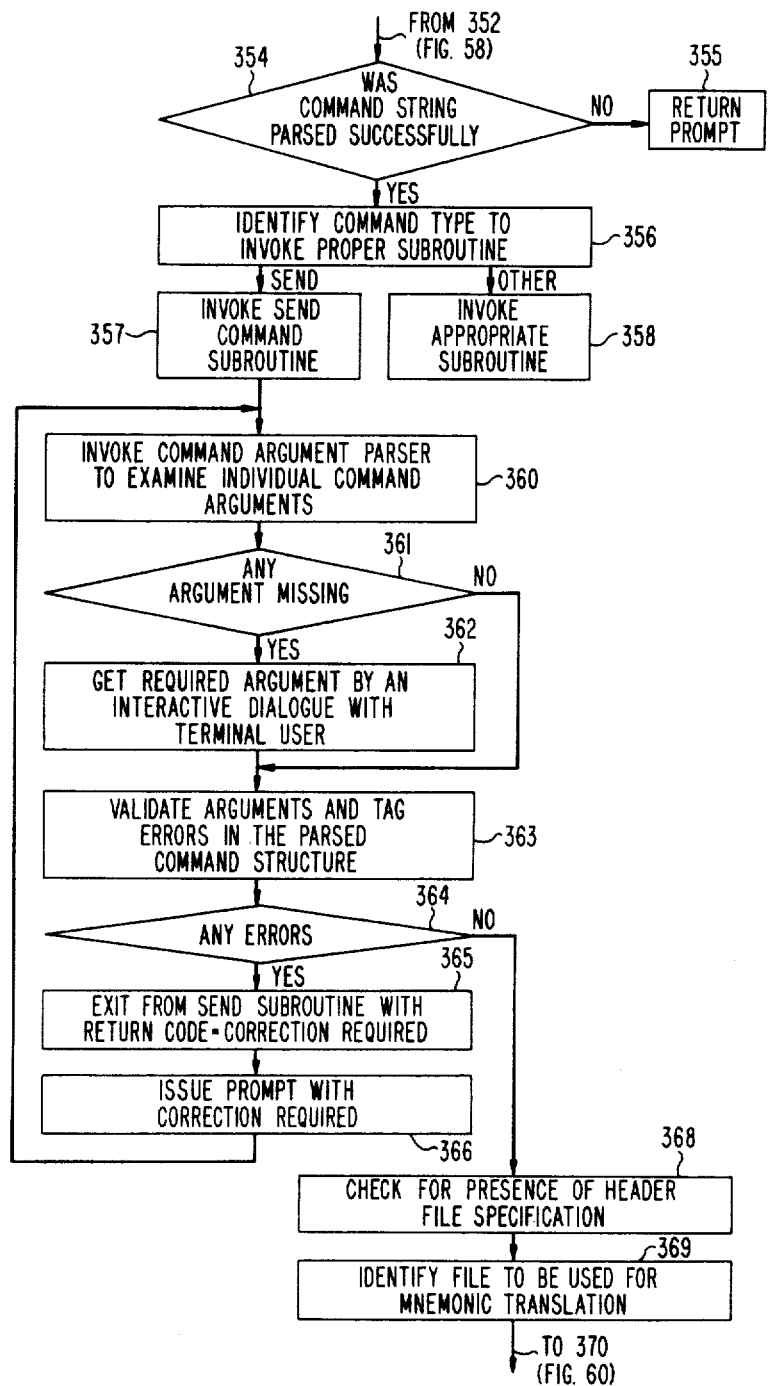

The user process, after obtaining the records it desires from the file, may desire to thereafter close the file. To close the file, the user process invokes the CLOSEFL routine (FIG. 56), sending the file ID.

The first step of the CLOSEFL routine constitutes step 740 which processes the arguments presented by the user process. More specifically, step 740 determines whether or not the file ID is valid. Assuming that the arguments are satisfied, the CLOSEFL routine advances to step 741.

In step 741 a "data base server" packet is initialized. The information included in the packet is the storage area and file names. The routine then advances to step 742 which generates an IPC-Write command directed to the Data Base Server, incorporating the packet into the command. Accordingly, the packet is passed through the IC Subsystem to the Data Base Server in the data base processor. CLOSEFL routine then advances to step 743 where it issues an IPC-Read request to the IC Subsystem.

The Data Base Server process reads the incoming packet as a result of the IPC-Read request generated in step 793. The Data Base Server process advances to step 796 which removes the entry from its internal table indicating that the file is opened by the user process. The process then advances to step 784 which generates a Write-File-Header command to the data base management system. The file header will have first been modified to reflect the date and time that the file was closed. As previously described, this information discloses the amount of storage used by the file which, as previously noted, is not changed by a reading operation. The data base management system thereupon writes into its storage area this file header and returns an indication to the Data Base Server that the new header has been successfully written. The Server process thereupon advances to step 797.

In step 797, an IPC-Write command is generated and directed through the IC Subsystem to the CLOSEFL routine in the user process. The command will contain an indication that the data base information system has written as new file header into the storage area. The Data Base Server process than advances to step 798 where it issues an IPC-Read request to the IC Subsystem.

Since the CLOSEFL routine had generated an IPC-Read request in step 743, the command from the Data Base Server is accordingly accepted by the routine. The routine then advances to step 746 where the internal buffer containing the file ID is freed and the routine thereafter advances to step 747. This latter step returns to the user process the information that the file has been closed along with the status.

If the user process desires to close other opened files in the storage area, the CLOSEFL routine is again invoked and the above-described sequence is repeated. After all files in the storage area have thus been closed, the user process may decide to close the storage area. To close the storage area, the user process invokes the CLOSESA routine, sending the storage area ID. This advances the CLOSESA routine to step 800 where it processes the arguments provided by the user process. For example, the validity of the storage area ID is determined. Assuming that the argument is successfully processed, the CLOSESA routine advances to step 804.

Step 804 frees any file identity buffer area not previously freed and advances to step 805 which frees the storage area ID buffer. The routine then advances to step 806 wherein an IPC-Disconnect command is generated for transmission to the Data Base Server. The routine then advances to step 807 which returns the routine to its original status and advises the user process that the data base has now been closed.

The Data Base Server process, having generated an IPC-Read request in step 798, receives the disconnect from the CLOSESA routine. The Server process then advances to step 811 where, noting that this is notification to close the data base, the Server process proceeds to generate a write command to the data base management system which contains new header information for the storage area. The process then advances to step 812 and in this step generates a command to the data base management system to close the data base. The data base management system in turn returns information designating whether or not these commands have been successfully complied with.

When the data base management system returns the information, the data base server process advances to step 817 where an IPC-Write command is generated and directed to the Data Base Work Manager. The command is thus sent by way of the IC Subsystem to the Work Manager and accept by the Work Manager in response to the IPC-Read request generated in step 754. The Data Base Work Manager process then advances to step 752 where it updates the server assignment information, removing the user from the server table and loops back to step 750 to assign the next Server.

Message Application Package Interactive Session Program

As previously described in the general work flow description, when the terminal user directs a call to the MAP-ISP process, the cell to the application process is made by the Station Call Facility task which issues an IPC-Connect request. This connect request is first forwarded to the Application Control Process (ACP) 119. ACP 119 provides authorization screening and, assuming that the MAP-ISP process is not presently running, ACP 119 calls the VMS operating system to create the application process. Upon determining that the application process has been created, ACP 119 redirects the call to the application process to form a two-way call (or virtual connection) between SCF task 125 and the application process.

FIGS. 57-61 disclose a flow diagram of the MAP-ISP process after its creation as described above. Thus, the initial step 300 (FIG. 57) assumes that the application program has been created and the program begins its execution. This advances the process to decision 301 which determines whether the call is being originated by a Station Call Facility task, since this particular program is designed only to execute commands from terminal users. In the event that a process other than FEPI 123 is attemping to call this process, MAP-ISP 126 advances to step 302 which terminates the process and returns a response to the connection indicating that the call has been rejected. If the call has been originated by an SCF task, however, the application process advances to step 304. In step 304, program-profile information stored in the node defining attributes of the specific terminal served by the SCF task requesting the connection and/or the customer served by this MAP-ISP process is obtained from a customer's storage area. This profile information may be produced by node personnel or received from the customer and placed in storage area reserved for this customer. The information thus obtained is written into the local working area of MAP-ISP. The process then advances to step 305 which invokes a "listen" request to the connection to enable it to "hear" the next incoming call. The process then advances to decision 306 to determine whether the incoming call is waiting.

If the incoming call is not then waiting, decision 306 advances the process to step 307 which terminates the process and the connection by sending back a "disconnect". Alternatively, if the call from the SCF task is presently waiting (which is should be), decision 306 advances the process to step 309 where an "accept" is issued back to the connection and the call ID (received from the "redirect" transaction) is placed in the local working storage.

After storing the call ID, the process in step 310 identifies the data base storage area containing the MAP files of the calling terminal user or customer as determined from the profile information. In step 312, the process invokes the above-described OPEN SA primitive to open the storage area of this customer and to obtain from the data base the storage area ID. When this storage area ID is returned, MAP-ISP advances to step 314 to invoke a Call routine, identifying the call ID to the routine, to manage subsequent data which will be periodically flowing back through the connection to the terminal user.

The process now advances to step 316 where a command is issued to create a parsed command structure and initialize a Command Parser routine which, as described below, will parse commands received from the terminal user. In addition, in step 316, MAP-ISP identifies commands that will be handled by defining, for example, the address of command name/modifier table or tables that will be used by the Parser routine.

The Command Parser routine implemented (in part) by a stack, identified as a temporary stack, will hold those commands, or portions of the commands, that have not been parsed because, for example, more than one command may be entered at a time when the Parser is invoked. When MAP-ISP invokes the Parser in step 316, the Parser routine advances to step 318 and, in this step, the temporary stack pointer is reset to the bottom of the temporary stack. After the pointer is reset, the Parser routine returns to MAP-ISP, acknowledging that it has been initialized.

When MAP-ISP receives the acknowledgement, it advances to step 320 to write a prompt message (MAP). An IPC-Write is then issued and the prompt is returned to the terminal user by way of the connection back to FEPI 123. At this point an ADT-Read request is issued to the connection in step 321, buffer area is allocated for the response of the terminal user and the process then pauses and waits for the IC Subsystem to signal completion of this event.

Summarizing the above operations, the call from the SCF task has initialized the MAP-ISP process. After being connected to the FEPI process, MAP-ISP has obtained profile information, initialized a Parser, opened the customer's data base storage area, returned a prompt to the terminal user and assigned internal buffer area for the expected command from the terminal user. At this point, MAP-ISP retires to await the response.

It is assumed now that the terminal user has sent a command to MAP-ISP requesting that certain files (both header and message) be obtained from the data base and sent on a store and forward basis to remotely located processes whose NSAs are identified in the command. When (as previously described) the session layer of the IC Subsystem 136 signals the MAP-ISP process 126 that the IU of the response is available in the IC buffer area, MAP-ISP advances to step 350 (FIG. 58) and the IU is read from the IC buffer area into the internal MAP-ISP buffer area previously allocated. The MAP-ISP process then advances to step 351.

In step 351 a decision is made as to whether the reading of the information unit (IU) was successfully completed. For example, it is determined whether the terminal user has "disconnected" or sent a "break". In the event that one of these events occurred, it is presumed that the reading was not successfully completed and the process advances to step 349 which initiates the functions of terminating the MAP-ISP process.

In the event decision 351 determines that the information unit was successfully read, the MAP-ISP process advances to step 352. In accordance with step 352, the process invokes the Command Parser routine, supplying to the routine the address of its internal buffer area which contains the IU. In addition, step 352 supplies to the parser routine the identifications of the parsed command data structure (buffer area) which will accommodate the parsed command and the command name/modifier table.

The Command Parser, upon being invoked, obtains the IU, from the buffer, in the form of an input command string. The Command Parser routine in decision 325 determines whether the input command string is empty; that is, determines whether there is any input data in the command string. In the event that there is no data in the input command string, decision 325 advances the Command Parser routine to decision 327 where a determination is made as to whether there is data in the temporary stack. If the temporary stack is also empty, decision 327 advances Ihe routine to step 328 where a "no input" response is generated and returned to MAP-ISP advising MAP-ISP that a command string has not been successfully parsed. Control is also returned to MAP-ISP.

Assume now that the input command string is empty but there is a data command in the temporary stack. In that event, decision 327 advances the routine to step 329. In step 329, the command in the bottom of the stack is read out and buffered in preparation for parsing and the pointer is adjusted. The routine then advances in step 330. Alternatively, if there is data in the input string, decision 325 advances the Parser routine to step 326. In step 326, the input string is buffered in preparation for parsing, as described below. The routine then advances to step 330.

At this point in the routine, either the command in the temporary stack or the input string has been obtained. In step 330, the command name/modifier table address is obtained. If the routine is unable to obtain the command name/modifier table, it advances to step 332, which generates and returns an "error" response to MAP-ISP, advising the application program that the command string was not successfully parsed (and returns control to MAP-ISP). Alternatively, if the table was successfully obtained, the routine advances to step 334.

In step 334, a lexical analysis is made of the string. Specifically, the string is examined to identify command names and modifiers. As this time, assuming that the command name and modifiers are identified, subsequent data in the string prior to the end of the command is identified as the command arguments. If the command name and modifiers are not successfully obtained, the routine advances to step 335 which returns a response to MAP-ISP with an indication that the command string was not parsed successfully (and returns control to MAP-ISP). Assuming, however, the command name and modifiers were successfully obtained, the Command Parser routine advances to decision 336.

Decision 336 determines whether the command name and modifiers are contained in the command name/modifier table. If the name and modifiers are not in the table, the routine advances to step 337 which returns a response to MAP-ISP indicating that the command string was not successfully parsed (and returns control to MAP-ISP). Alternatively, if the command name and modifiers are in the table, the command string advances to step 338.

In step 338, a command code is assigned in accordance with the command name and modifiers from the command string. This code is, in step 338, stored in the parsed command structure. The routine thereupon advances to step 339 and, in this step, the arguments in the string are obtained and these arguments are also stored in the parsed command structure. The routine then advances to step 340 which obtains any data left over from the input string and this input data is now stored in the temporary stack. Thereafter, in step 341, the Command Parser routine returns a response to MAP-ISP indicating to the application program that the command string has been successfully parsed and returns control to MAP-ISP.

The return of control from the Command Parser routine to MAP-ISP causes MAP-ISP to proceed to decision 354 (FIG. 59), which determines whether the command string was successfully parsed. In the event that there was a syntax or command error, the MAP-ISP process advances to function 355 which initiates the generation of a prompt to be returned to the terminal user in a manner similar to the above-described process for sending the original prompt. In the event that the command string is parsed successfully, decision 354 advances the process to step 356.

In step 356 the specific command "instruction" is examined in the data structure to identify the type of command sent by the terminal user. In this scenario it is assumed that this is a "send" command and upon identification of such "send" command, the process advances to step 357 to invoke a "send command" subroutine. If another type of command had been sent, the process would advance to another step, such as step 358, to invoke a subroutine appropriate to the other type of command.

The first step in the "send command" subroutine is step 360, which invokes a command argument parser. More specifically, in step 360 the several arguments of the send command now residing in the parsed data structure are examined. In the present scenario, it is assumed that the terminal user has identified a "text" file and a "header" file and these identifications, now residing in the data structure, are examined and processed in step 360. The "send command" subroutine then advances to decision 361 where it is determined whether there is an adequate number of arguments in the "send" command received from the terminal user. For example, the "send" command requirement is that the command must at least contain a "text" file identification. If there is an inadequate number of arguments, the "send command" subroutine advances to step 362 to issue another prompt back to the terminal user to obtain the necessary additional information. In this scenario, however, it is assumed the "text" file is identified and this identification (together with the identification of a "header" file or the ultimate destination process or processes) constitutes an adequate number of arguments. Accordingly, the subroutine advances to step 363.

In step 363, the arguments are validated; that is, the arguments such as "text" and "header" file identifications are processed and errors are determined on the basis of such criteria as the file name having too many characters or invalid characters being included in the file name. If such error has occurred, a "tag" is attached to such argument error. The process then proceeds to decision 364 which determines whether any errors have been made. If, in fact, an error has occurred, the process proceeds to step 365 wherein it exits from the "send command" subroutine and generates a "correction required" code to append to the code identifying the argument that is in error. The process advances to step 366 which issues a prompt that is returned to the terminal user. This prompt includes the argument in error and the correction required code now appended to it.

The process now retires, awaiting a response from the terminal user that will return the process to step 360 in the "send command" subroutine.

In this scenario we assume that no error has been made by the terminal user in the "send" command. Accordingly, there is no error in the argument syntax and decision 364 in this case terminates the "send command" subroutine and advances the process to step 368. In step 368 a check is made for the presence of the header file identification. In the event such identification is absent, header parameters are obtained from the user via an interactive "dialogue" consisting of a series of terminal prompts and responses. In this scenario, however, it is assumed that the header file identification is in the received "send" command. Accordingly, the check in step 368 is successful and the process advances to step 369.

Figure 60:
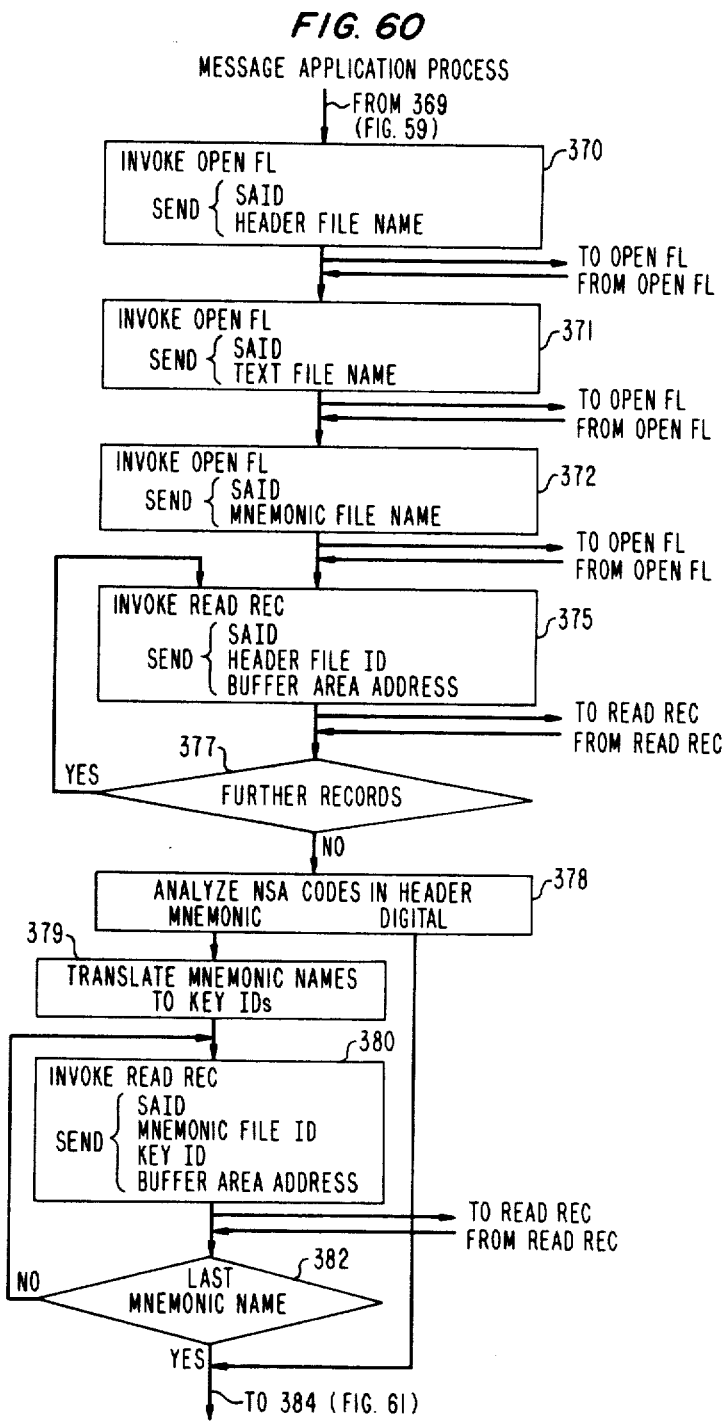
Figure 61:
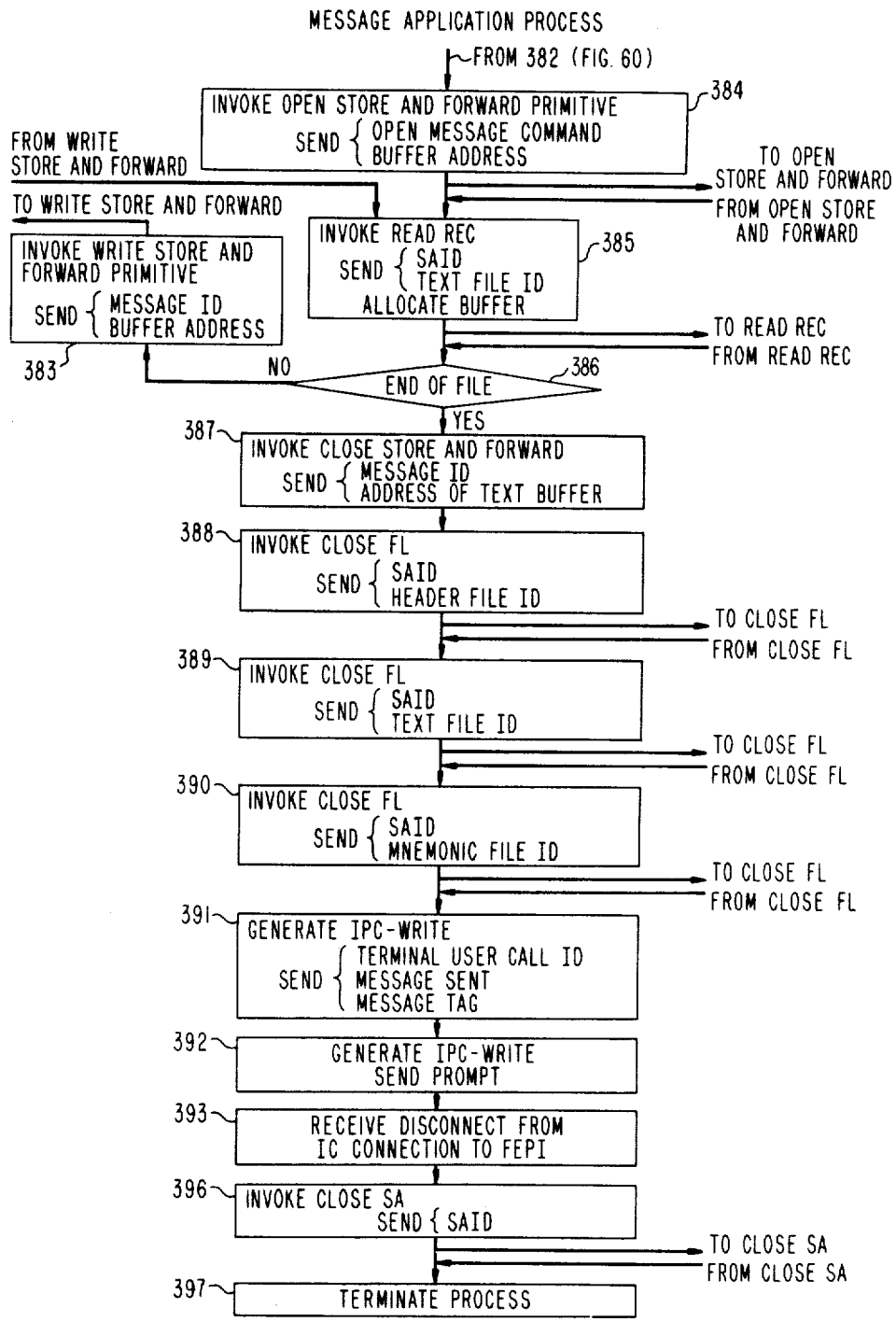

In step 369, an identification is made of the file, stored in the data base, to be used to translate any destination addresses (that are specified mnemonically) to actual Network Standard Addresses (NSAs). This translation file has been previously prepared for this customer (or terminal user). The process then advances to step 370 (FIG. 60).

In step 370, the process invokes the OPENFL primitive or routine to open the "header" file in the data base, as previously described in detail. In accordance with step 370, the storage area identity (SA ID), previously obtained during initialization of the session, (that is, when the connection is made by SCF to the MAP-ISP process) is passed to the OPENFL routine. In addition, the "header" file name is obtained from the "send" command and is also passed to the OPENFL routine.

The OPENFL routine, upon being invoked, opens the "header" file, as described heretofore, and the routine returns a status indication indicating success, in this case, in opening the "header" file and with this indication returns the "header" file ID. This advances the MAP-ISP process to step 371. In step 371, the OPENFL routine is again invoked to open the "text" file. In this case, the "text" file name, which is obtained from the "send" command, is sent to the OPENFL routine together with the storage area ID. Response from the OPENFL routine that the "text" file has been successfully opened together with the file ID of such "text" file advances the MAP-ISP process to step 372.

In step 372 the OPENFL routine is again invoked to open the "mnemonic translation" file. In this case, the file name of the "mnemonic translation" file (which name is obtained from a local storage area reserved for the terminal user) together with the storage area ID is sent to the OPENFL routine. The response from the OPENFL routine that the "mnemonic translation" file has been successfully opened together with the file ID of the "mnemonic translation" file advances the MAP-ISP process to step 375.

In step 375, the READREC routine or primitive is invoked to read out the first of the records stored in the "header" file in the data base. In addition, in step 375, an internal structured buffer area is identified for each record that is read and the address of the buffer is sent to the READREC routine. Further information sent to the READREC routine includes the storage area ID and the "header" file ID.

When the first record of the "header" file is returned from the data base by the READREC routine with the status indication that it has been successfully read out and copied into a first entry of the structured buffer area, the process advances to decision 377 to determine whether this is the only record desired or, alternatively, whether the READREC routine indicates the previously read record was the last record in the file. If further records are to be read out of the file, decision 377 loops the process back to step 375 to thereby obtain the next or second record which is copied into the next entry of the buffer area. In this manner, successive records of the "header" file are copied into successive entires of the buffer area and this looping process continues until the last record is obtained. After the last record is copied into the last entry and the READREC routine is again invoked, the end-of-file response of the READREC routine is noted by decision 377 which advances the MAP-ISP process to step 378.

In step 378 the destination (NSA) code entries in the header file are analyzed to determine whether mnemonic translation is required. In the event that no mnemonic translation is required, the process advances to step 384. In this scenario, however, it is assumed that the NSA destinations in the "header" file are comprised of mnemonic names and, upon this determination in step 378, the process advances to step 379. In step 379, each mnemonic name is translated to designate a "key" defining a specific record in the "mnemonic" file. The process then advances to step 380 and the READREC routine is again invoked and the IDs of the storage area and the file, the "key" of the record, and the address of the buffer for storing the record being read are sent to the READREC routine. The record returned by the READREC routine contains an actual NSA (or list of NSAs) to be used as the destination of the message being sent. The process then advances to decision 382 to determine if all the mnemonic names have been translated. If further names are to be translated, decision 382 loops the process back to step 380 to read out the next "mnemonic" file record. This looping continues until all mnemonic destinations have been translated, whereupon decision 382 advances the process to step 384.

In step 384 (FIG. 61), the "open store and forward" routine or primitive is invoked. The address of the structured buffer area containing message header data is provided to this routine when invoked. (Parameters such as service grade, confirmation requirements and earliest delivery time of the message in addition to NSAs are included in this data supplied to the "open store and forward" primitive.)

The response of the "open store and forward" routine (discussed hereinafter) includes a message ID and a message tag. This response advances the MAP-ISP process to step 385. In step 385, the READREC routine is invoked. The information supplied to the READREC routine includes the storage area ID and the "text" file ID. In addition, the address of the internal buffer space for storing the records from the "text" file is provided.

When status indication is received from the READREC routine that the first record has been successfully obtained and the obtained record is copied into the internal buffer area of the MAP-ISP process, this process advances to decision 386. Decision 386 determines whether a record has been read or an "end-of-file" has been reached. If a record has been read, the process invokes the "write store and forward" primitive to pass the data from that record to the store and forward service as depicted in step 383. It then loops the process back to step 385, where the next record from the "text" file is read. In this manner, all of the records are copied from the text file into a MAP-ISP internal buffer area, then written out to the store and forward service as "message" text.

After the last record from the "text" file is thus processed, the READREC routine is again invoked and now returns an end-of-file status. This is recognized by decision 386, causing it to advance the process to step 387. In step 387, a "close store and forward" routine is invoked, specifying the message ID previously received from the "open store and forward" routine. The process then advances to step 388.

In step 388, the process invokes the CLOSEFL routine, sending the routine the "header" file ID and the SA ID. When the CLOSEFL routine returns its status response that the file has been successfully closed, the process advances to step 389. In step 389, the CLOSEFL routine is again invoked and, in this case, the "text" file ID and the SA ID are provided to the CLOSEFL routine. The response from the CLOSEFL routine that the text file has been successfully closed advances the process to step 390, which again invokes the CLOSEFL routine sending this time the "mnemonic translation" file ID and the SA ID. This results in the closing of the "mnemonic" file and the consequent response from the CLOSEFL routine and advances the process to step 391.

In step 391 an IPC-Write command is generated, specifying the call ID of the call established with the terminal user, and data constituting an advice to the user that the message has been sent is included in the transaction. In addition, in step 391, the message tag is inserted in the response to advise the terminal user of the network identification that has been assigned to this specific message by the store and forward service. The process then advances to step 392 to generate another IPC-Write command to the terminal including a prompt requesting the next command from the terminal user. In this scenario, it is assumed that there are no further commands and that the MAP-ISP process receives a "disconnect" from the Station Call Facility by way of the IC Subsystem. Upon receiving such "Disconnect", which has the effect of disconnecting the MAP-ISP process from the Station Call Facility routine of the terminal user, the MAP-ISP process advances to step 396. In step 396 the process invokes the CLOSESA routine, sending the routine the ID of the user storage area. Upon receiving the status response from the CLOSESA routine that the storage area has been successfully closed, MAP-ISP advances to step 397 which provides the functions of terminating the process.

Store and Forward Service

As previously described, MAP-ISP 126 invokes its Open Store and Forward primitive in step 384 by sending an "open message" command and, at the same time, sends the buffer address of the structured data containing the header information. This header information would contain the destination NSAs and may optionally also include such parameters as the service grade desired and other requirements such as confirmation and earliest delivery time.

Upon being invoked, the Open Store and Forward primitive advances to step 1300 (FIG. 62) where it obtains the structured data. The primitive then advances to step 1301 where it checks the destination NSAa against a network routing table to establish the validity of the addresses. Assuming that these addresses are valid, the primitive advances to decision 1302 where a determination is made as to whether this is the first store and forward message being sent by this (MAP-ISP) process or, alternatively, whether a prior message was sent by this MAP-ISP process. Assuming that this is the initial message, decision 1302 advances the primitive to step 1303 to generate an IPC-Connect to be sent to Store and Forward Transfer (SFT) process 132. This command is forwarded to the IC Subsystem and, as previously described, a connection is thereby extended to the SFT 132. The IC Subsystem of SFT 132 returns an IPC-Accept and the reception of this transaction by the IC Subsystem of MAP-ISP 126 advances the Open Store and Forward primitive to step 1304. Alternatively, if there was a prior store and forward message from this MAP-ISP, the connection to SFT 132 was therefore already established and decision 1302 advances the primitive directly to step 1304.

In step 1304, a unique network-wide message tag is generated for this store and forward message. This tag will include the sender's NSA and other information to uniquely identify this store and forward message. The primitive thereupon advances to step 1305 and, in step 1305, issues an IPC-Write accompanied by an "open" transaction and presses this through the IC Subsystem to SFT 132. As described hereinafter, SFT 132 assigns a task for the message and returns an "open" transaction containing an event number back through the IC Subsystem to enable the Open Store and Forward primitive to signal such assigned task. In the meantime, an IPC-Read has been issued as depicted in step 1306 and the consequent acceptance of this "event number" open transaction advances the primitive to step 1307.

In step 1307, a store and forward ticket is formatted with control information which will accompany the message. This ticket information might include, for example, the message tag, the message length, sender's NSA, the destination NSA or NSAs and confirmation code supplied, for example, by the header information derived from the data base (as discussed below). The primitive then advances to step 1309 where the message tag and the message ID are sent back to MAP-ISP 126 for conveyance to the terminal user as previously described. The primitive then advances to step 1308 where it retires.

At this point, MAP-ISP 126 proceeds to obtain the various "text" records from the data base. When the entire message text information is obtained and buffered, MAP-ISP 126 invokes the Write Store and Forward primitive (FIG. 63), providing to the primitive the message ID and the identity or identities of the MAP-ISP buffer containing the message data. Upon being invoked, the primitive obtains the message data, as depicted in step 1310, for conveyance in an information unit to the Store and Forward Transfer process. The primitive thereupon advances to step 1311 and copies the data into an internal buffer. At this point, the primitive advances to decision 1312 wherein a determination is made as to whether the buffered data and header information therefor will exceed the maximum IU size. In the event that this data quantity has achieved or exceeds the size of an IU, decision 1312 advances the primitive to step 1313. In step 1313, an IPC-Write is issued and an information unit (containing data obtained from the internal buffer) is forwarded to the IC Subsystem (this initial IU also containing the message ID). The information unit is thereby passed to Store and Forward Transfer process 132.

In the meantime, an IPC-Read has been issued, as depicted in step 1314, and when an acknowledgement is received from Store and Forward Transfer process 132, the primitive loops back to decision 132 for another determination as to whether the next header and remaining buffer data is equal to or exceeds the size of an information unit. Alternatively, if the data does not achieve the size of an information unit, the primitive advances to step 1315 where it retires.

Assume now that either all of the buffered data has been sent to the Store and Forward Transfer process by the application process or there remains a quantity of data less than an IU size. MAP-ISP 126, at this point, invokes the "Close Store and Forward primitive (FIG. 64), as previously described. This advances the primitive to step 1316. In step 1316, the primitive generates an IPC-Write and formulates a "close" transaction which includes a partial information unit; that is, it formulates a "partial" information unit from the buffer data that was not sent by the looping process provided by the Write Store and Forward primitive. This "close" transaction is thereby forwarded by way of the IC Subsystem to Store and Forward Transfer process 132. At this time, an IPC-Read request is issued in step 1317 and, when Store and Forward Transfer process 132 acknowledges receipt of the last information unit and the acknowledgement is received, the primitive advances to decision 1318.

In decision 1318, it is determined whether other messages are being sent by way of this same connection to the Store and Forward Transfer process. In the event there are other messages to be sent, the channel set up through the IC Subsystem to the Store and Forward Transfer process is maintained, as depicted in step 1319 and the primitive advances to step 1321 where it exits. Alternatively, if no further messages are to be sent to the Store and Forward Transfer process, decision 1318 advances the primitive to step 1320 where an IPC-Disconnect is issued to the IC Subsystem to thereby terminate the connection to the Store and Forward Transfer process. The primitive then advances to step 1321 which returns control to the application process as previously described with respect to step 387.

Figure 65:
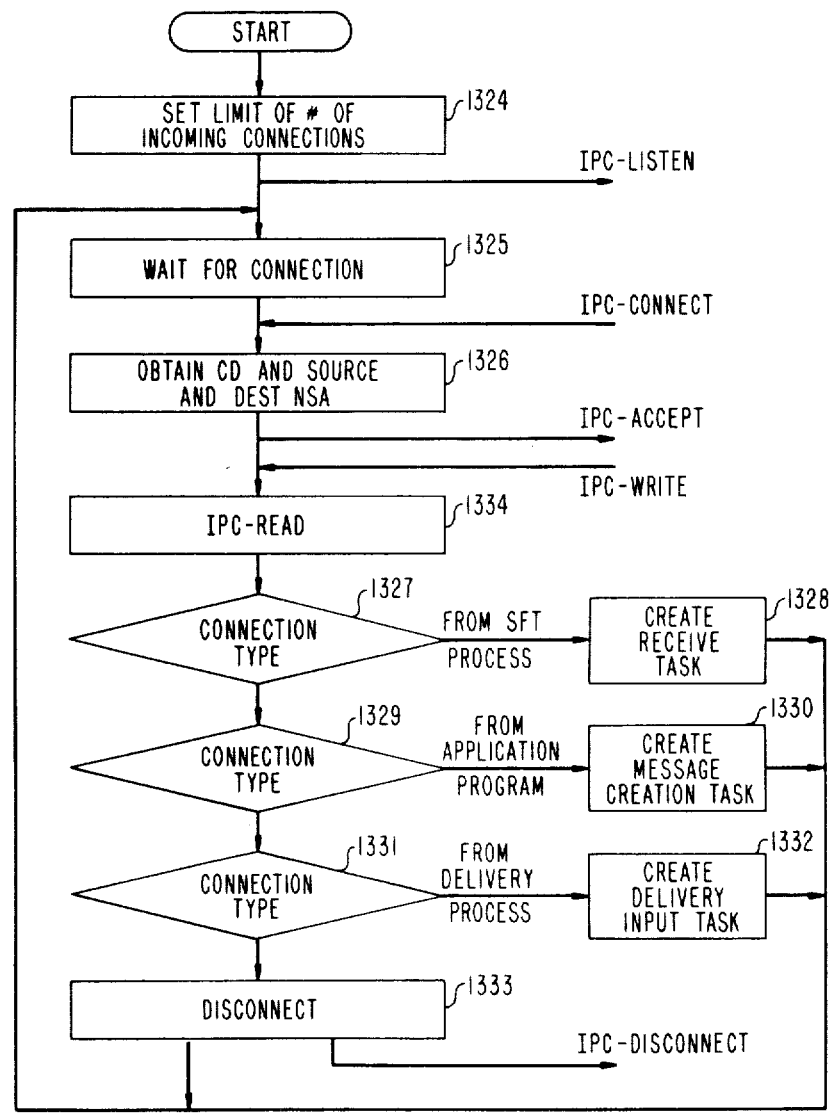

As described above, the Open Store and Forward primitive of MAP-ISP initially forms a connection to the Store and Forward Transfer process 132 by issuing an IPC-Connect. In the Store and Forward Transfer process, the IPC-Connect transaction is received by a Listen task (FIG. 65).

When the Listen task is initialized, it sets, in step 1324, a limit for the number of incoming connections that will be handled by the Store and Forward Transfer process. Step 1324 then issues an IPC-Listen to the IC Subsystem to accommodate these connections and the task advances to step 1325.

Step 1325 normally awaits a connection request which may be received from various processes, as noted below. Assume now that the IPC-Connect is received from MAP-ISP. Upon the reception of the IPC-Connect, the task advances to step 1326 where it obtains the circuit descriptor and the source and destination NSA of this connection and thereupon generates an IPC-Accept for application to the IC Subsystem. The Listen task thereupon advances to step 1334 where an IPC-Read is issued. An IPC-Write transaction is thereafter received from the Open Store and Forward primitive in MAP-ISP, which transaction includes the "open" transaction, as previously described. This advances the Listen task to decision 1327.

In decision 1327, a determination is made as to whether a "connect" request is being made by a remote Store and Forward Transfer process, that is, a Store and Forward Transfer process in another node. In this case, since the incoming call is not from another Store and Forward Transfer process, decision 1327 advances the Listen task to decision 1329. Decision 1329 determines whether the connect request is from an application program, such as MAP-ISP. If this call is not from an application program, decision 1329 advances the Listen task to decision 1331 and this latter decision determines if the connection is from the local Store and Forward Delivery process. Assuming now that this is not from the local Store and Forward Delivery process and further assuming that the call is not from another valid or appropriate process, the Listen task advances to step 1333 which issues an IPC-Disconnect to terminate the connection and to advance the Listen task back to step 1325 to await the next request for a connection.

In accordance with our present scenario, this connection is from an application program, namely, MAP-ISP. Accordingly, decision 1329 advances the Listen task to step 1330. In accordance with step 1330, a Message Creation task (described below) is created. Upon the creation of this Message Creation task, the Listen task is advanced back to function step 1325 where it awaits the next connect request from the IC Subsystem.

Figure 66:
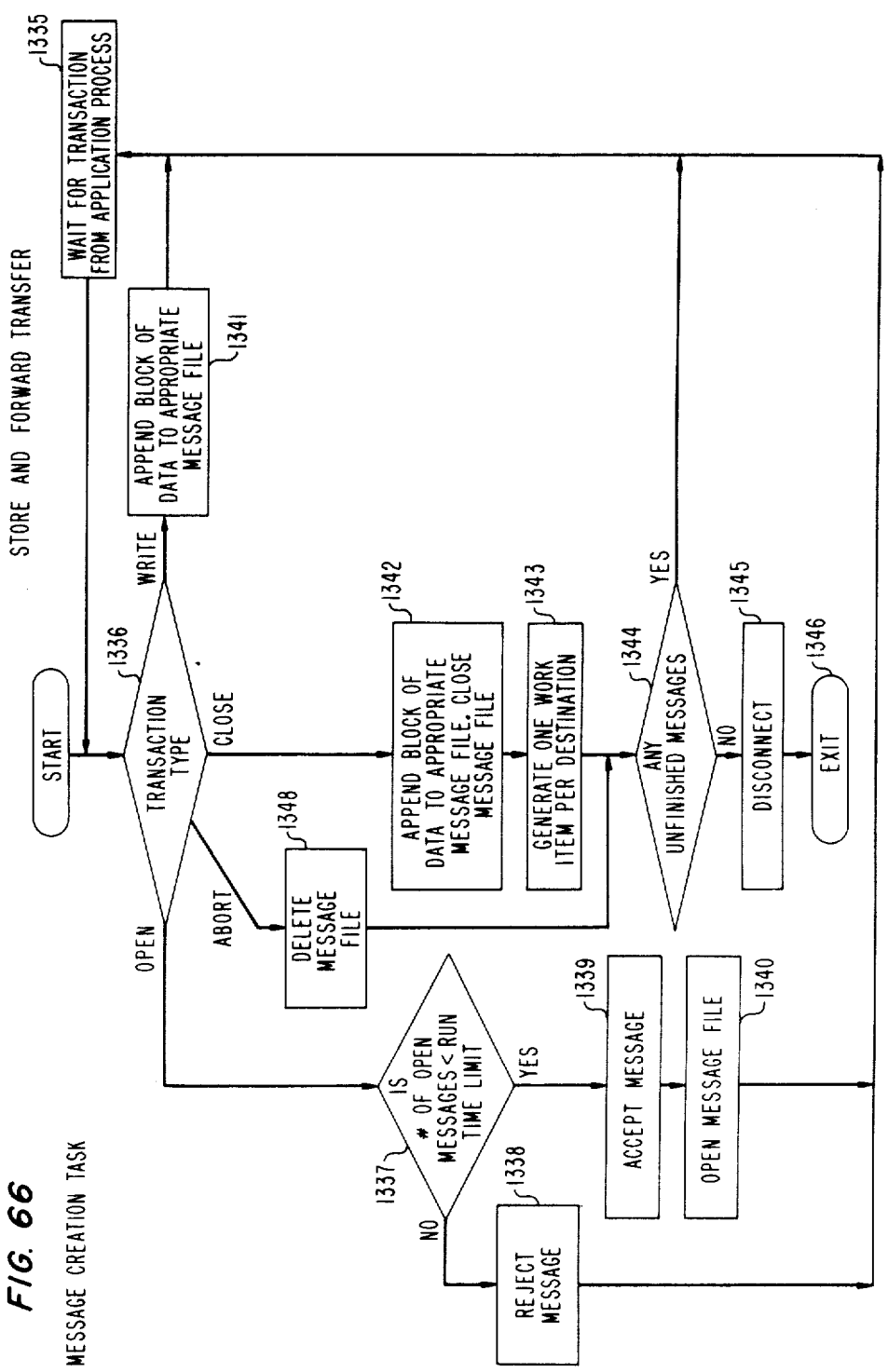

The Message Creation task (FIG. 66), upon being created, advances to decision 1336. Decision 1336 determines what type of transaction is involved in the incoming request and assuming, as in this case, that this transaction type constitutes an "open" message command, the Message Creation task advances to decision 1337. In decision 1337, a determination is made as to whether the number of "open" message commands is under a preset run time limit. Assuming the number of "open" message commands has reached or exceeds this run time limit, the task advances to step 1338. In step 1338, a "reject" transaction is created and returned by way of the formed connection back through the IC Subsystem to the application program, advising MAP-ISP that the store and forward message has not been accepted. The Message Creation task thereupon advances to step 1335 to await a response transaction from the application process.

Assume now that the number of "open" message commands from MAP-ISP does not exceed the run time limit. In that event, decision 1337 advances the task to step 1339. In step 1339, an "accept" transaction is created and sent back by way of connection to the MAP-ISP process. The task then advances to step 1340 where a message file is opened. Upon the opening of the message file, the task advances to step 1335. In step 1335, the task awaits the next transaction from the application process.

In accordance with our scenario, the next transaction from the application program is a "write" transaction which includes an information unit containing the message ID and a first block of message data. This transaction, when received by the Message Creation task, advances the task back to decision 1336. Since this is a "write" transaction, decision 1336 advances the task to step 1341. In step 1341, this block of data (received from the Write Store and Forward primitive of MAP-ISP) is placed in the message file created in step 1340 and the task thereupon returns to step 1335 awaiting the next block of data. When this is received, the task advances to decision 1336, this next block of data is appended to the prior block in the message file, as depicted in step 1341, and this looping continues until a "close" transaction is received from the Close Store and Forward primitive of MAP-ISP.

When the "close" transaction is received from the Close Store and Forward primitive, decision 1336 of the Message Creation task advances the task to step 1342. In step 1342, this latest block of data is appended in the message file created in step 1340 and the message file is closed. The task then advances to step 1343 where a work item for each destination of the store and forward message is generated, the work item including the NSA of the destination process and a pointer to message related data which includes message parameters and the identity of the message file location. The work item is then placed on a queue which is selected in accordance with the node serving the destination process. The task then advances to decision 1344 where a determination is made as to whether there are any other unfinished messages that are being or are to be received from the same MAP-ISP program. If there are further messages, the task advances back to step 1335 to await the next transaction. Alternatively, if there are no further messages, the task advances to step 1345 to issue an IPC-Disconnect and thus terminate the connection with the S&F Subsystem in the MAP-ISP program and thereafter advances to step 1346 to terminate the task.

In the event that the MAP-ISP program decides to abort the store and forward message, an appropriate "abort" transaction is received by the Message Creation task to advance the task from step 1335 to decision 1336. Upon recognition of the "abort" transaction, decision 1336 advances the Message Creation task to step 1348. In accordance with step 1348, any previously stored information in the message file (if opened) is deleted and the allocated memory is returned to the common store. The task then advances to decision 1344 to proceed as described above.

Figure 67:
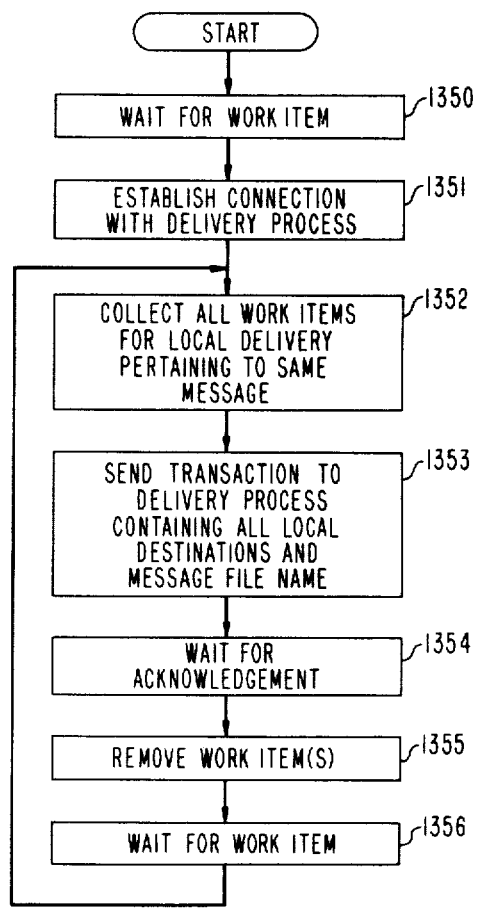

Assume now that one or more of the destinations for the store and forward message is for delivery to a destination process in the same node as the originating application process. In this event, as described above, the work item or items have been placed on a queue serving the local node. When a work item (for the local destination) appears at the queue output, the Delivery Interface task (FIG. 67) is signaled and advances to step 1350 to obtain such work item. It is presumed here that this is the first message destined for a local process. Accordingly, the Delivery Interface task advances to step 1351 where an IPC-Connect is issued to create a connection with Store and Forward Delivery process 131, interchanging the appropriate "IPC" commands necessary to create such a connection by way of the IC Subsystem. The Delivery Interface task then advances to step 1352 where a determination is made as to whether there are other work items for local delivery pertaining to this same store and forward message and, if there are such other work items, these work items, in step 1352, are collected. The task then advances to step 1353 to generate an IPC-Write to the Store and Forward Delivery process together with a transaction containing all the local destinations (NSAs) and the name of the message file created by the Message Creation task. The Delivery Interface task then advances to step 1354 to await an acknowledgement from the Store and Forward Delivery process and, when the acknowledgement is received, the task advances to step 1355 where the work item or items are removed from the queue. Thereafter, the task advances to step 1356 where it again waits for another work item from the queue and, when the next work item is obtained, the task loops back to step 1352 described above. It is noted that, after initial creation, the connection to the local Store and Forward Delivery process is permanently maintained and that a new connection need not be created with the Store and Forward Delivery process for the subsequent work items for messages which will be locally delivered. Consequently, connection step 1351 is thereby bypassed.

Figure 68:
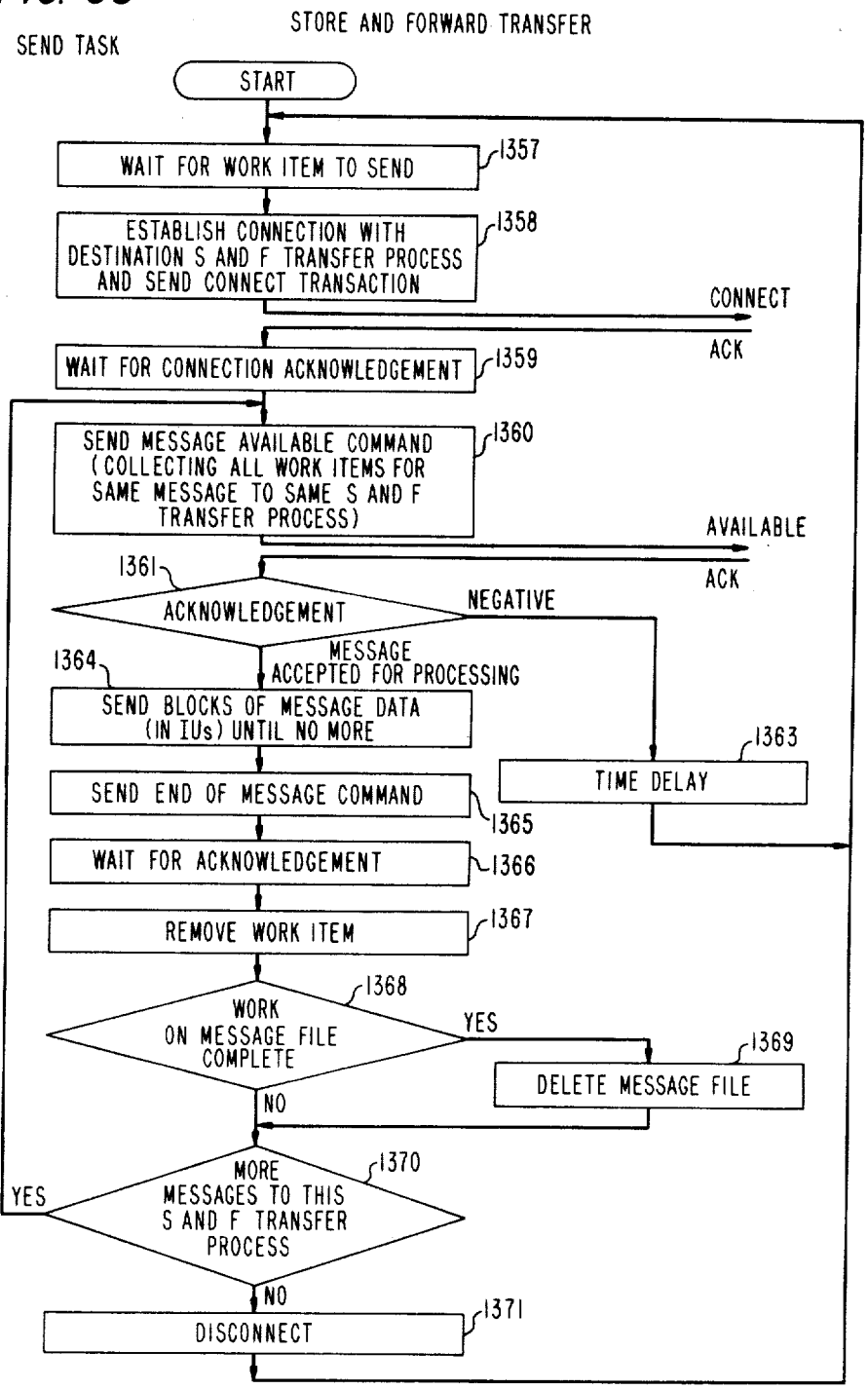

Assume now that the store and forward message is destined to a remote location, that is, to one or more destination processes served by a remote node. In this event, as described above, the Message Creation task has placed the work item or items on a queue associated with such remote node. The Store and Forward Transfer process provides one Send task (FIG. 68) for each remote node and the Send task associated with the remote node serving the destination process or processes scans the queue in step 1357, waiting for the work item for the message destined for the remote node.

Upon the work item or items appearing at the output of the queue, the Send task advances from step 1357 to step 1358. In step 1358, the destination NSA in the work item is obtained to establish a connection from the Store and Forward Transfer process of the local node by way of the transport network to the transfer process of the remote node (via the interface processes) in the manner described above. In accordance therewith, an IPC-Connect transaction is generated and passed to the IC Subsystem. When the connection is accepted, a "connect" transaction is generated and also passed to the IC Subsystem. The Send task then advances to step 1359 to await the connection acknowledgement from the remote end. When this acknowledgement is received, the task advances to step 1360.

In step 1360, a "message available" command is generated and the command is issued as a transaction to the IC Subsystem for transmission to the remote Store and Forward Transfer process. At the same time, all of the work items for this message which are destined to this remote Store and Forward Transfer process are collected. When the acknowledgement is received from the remote SFT process, the task advances to decision 1361 where it is determined whether or not the message has been accepted for further processing. If a negative acknowledgement has been received from the remote Store and Forward Transfer process indicating that resources are not available, the task advances to step 1363. Presumably, at this time, an IPC-Disconnect should have been issued by the remote Store and Forward Transfer process and, upon recognition of this "disconnect" and after an appropriate time delay as depicted by step 1363, the Send task loops back to step 1357 to again obtain from the queue the work item or items of messages destined to the remote Store and Forward Transfer process.

Assume now that the message is accepted for transport to the remote Store and Forward Transfer process. In this event a positive acknowledgement is received and decision 1361 advances the Send task to step 1364. In step 1364, the blocks of data in the message file are obtained and bundled into information units and written into the connection to the remote Store and Forward Transfer process. In this manner, the blocks of message data are sent to the remote process until the data in the message file is exhausted. The Send task thereupon advances to step 1365 where the "end-of-message" command is generated and written into the connection. In step 1366, the Send task awaits the acknowledgement from the remote Store and Forward Transfer process and, when the acknowledgement is received, the task advances to step 1367 to remove the work item or items from the queue.

In decision 1368, a determination is made as to whether the work on the message file has been completed. For example, this message may be destined to recipients in other nodes and, if the processing of this message has not been completed, decision 1368 will advance the task to decision 1370. Alternatively, if the work on the message file is complete, decision 1368 advances the task to step 1369 where the message file is deleted and, upon such deletion, the task also advances to decision 1370.

In decision 1370, a determination is made as to whether other messages are to be transferred to this same remote Store and Forward Transfer process. If other messages are to be so transferred, the Send task advances back to step 1360 and a new "message available" command is generated and sent to the remote Store and Forward Transfer process and the above-described sequence is repeated. Alternatively, if no further messages are destined for the remote Store and Forward Transfer process, the Send task advances to step 1371 to issue an IPC-Disconnect to the IC Subsystem. The connection with the remote process is thereby terminated and the Send task loops back to step 1357 to wait for new items on the queue.

Assume now that a Send task in a Store and Forward Transfer process located in one node has established a connection with a Store and Forward Transfer process located at a remote node, in the manner described above. At the remote end, the Listen task of the Store and Forward Transfer process, in response to the request for the connection, has advanced to step 1326 and obtained the circuit descriptor and the source and destination NSAs in the same manner as previously described. The "connect" transaction is then received from the Send task in the originating Store and Forward Transfer process and this advances the Listen task in the Remote Store and Forward Transfer process through decision 1327 to step 1328 where a Receive task is created. The Listen task then advances back to step 1326 to await a next connection request.

Figure 69:
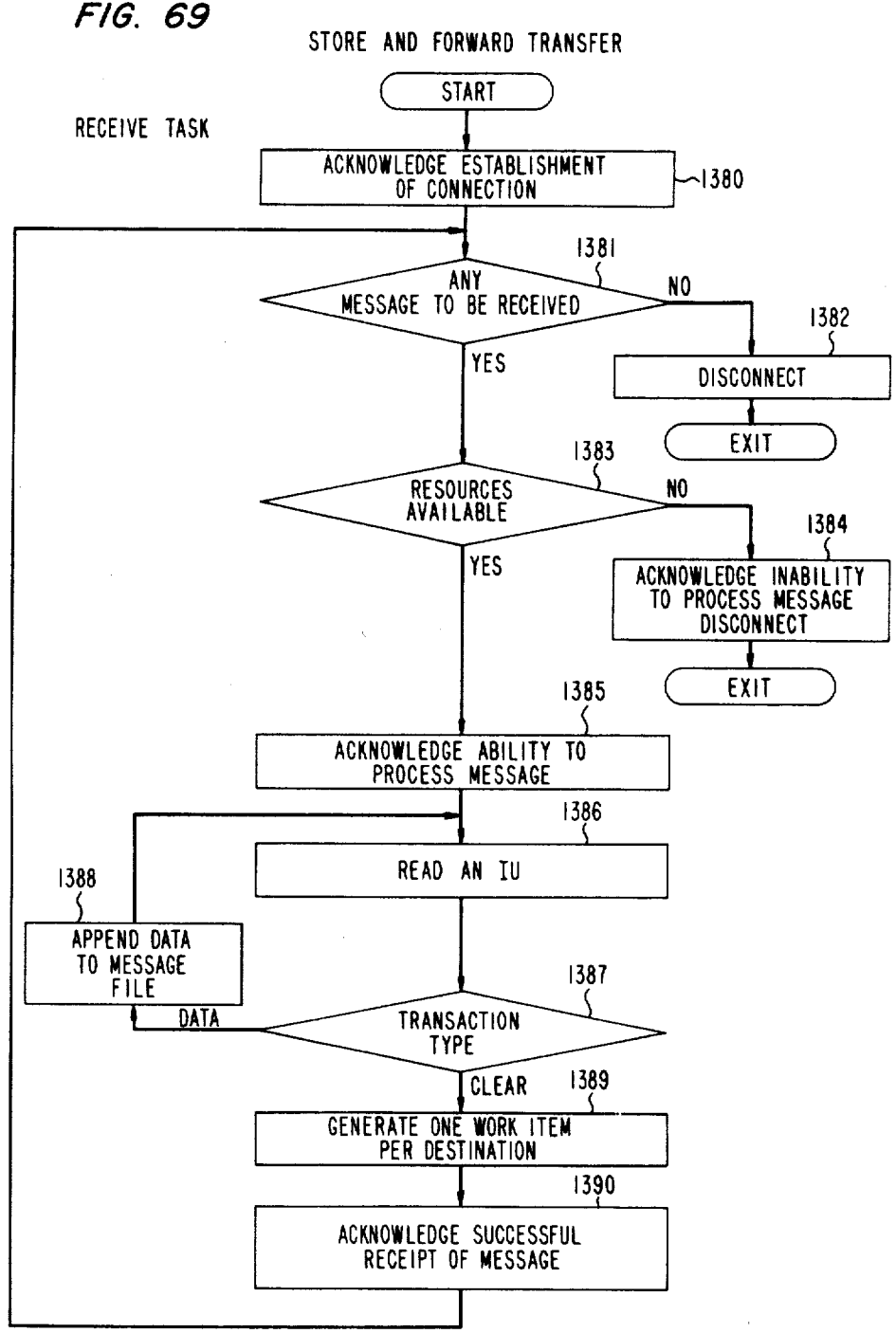

The Receive task (FIG. 69), upon creation, advances to step 1380. In step 1380, an acknowledgement to the "connect" transaction is generated and is sent back by way of the connection to the Send task in the originating Store and Forward Transfer process. The Receive task then advances to decision 1381 where a determination is made as to whether a message is to be received. Since in this present scenario the Send task sends a "message available" transaction designating the desire to transfer a message, decision 1381 advances the Receive task to decision 1383. In decision 1383, a determination is made as to whether resources for processing the message are available. If there are inadequate resources, decision 1383 advances the Receive task to step 1384 where an appropriate response is generated and returned to the Send task in the originating Store and Forward Transfer process and thereafter the Receive task disconnects the connection in the previously described manner and the task expires.

Assume now that adequate resources are available. In this event, decision 1383 advances the Receive task to step 1385 where a message file is created and an acknowledgement is generated indicating the task's ability to process the message. This acknowledgement is then returned through the connection back to the originating Store and Forward Transfer process. At the originating process the Send task now proceeds to send the information units as described above. The Receive task in step 1386 reads the incoming information unit and advances to decision 1387. If the information unit constitutes data, the Receive task advances to step 1388 to append the data to other prior data, if any, in the message file. The task then loops back to step 1386 in order to read the next incoming information unit. In this manner the various information units are assembled in the message file until the final information unit is received and the Send task in the originating process sends the "end-of-message" command. When this command is received, decision 1387 advances the Receive task to step 1389. In step 1389, the Receive task generates a work item for each destination application process, placing the work item on the Delivery Interface task queue. An acknowledgement is then generated in step 1390 and returned to the originating Store and Forward Transfer process. At this point, the Receive task loops back to decision 1381 to determine if another message is to be received. Assuming now that there are no further messages, decision 1381 advances the Receive task to step 1382 where an IPC-Disconnect is generated and sent back through the connection. The Receive task thereupon retires.

Figure 70:
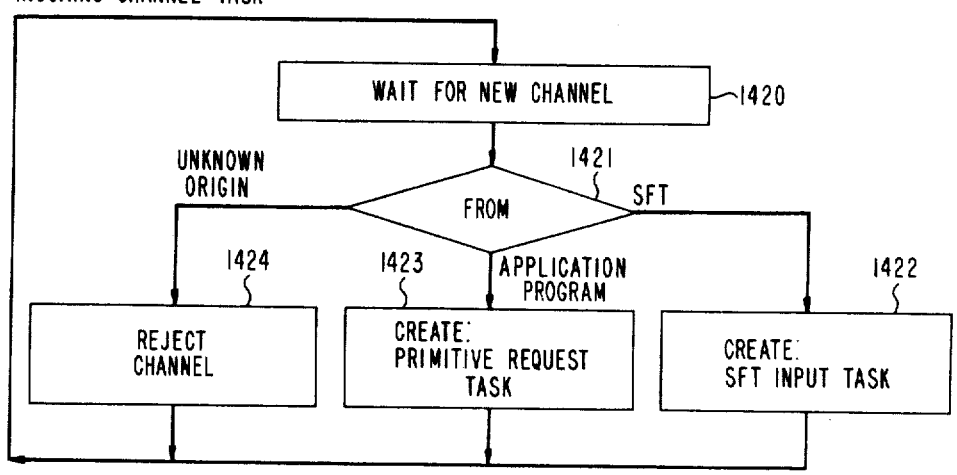

Incoming connection requests to Store and Forward Delivery process 131 are monitored by the Incoming Channel task (FIG. 70) of the process as depicted in step 1420. When a new channel request is received, the Incoming Channel task advances to decision 1421 to determine (from the received transaction) the origin of the connection request. If the origin of the connection request is unknown, that is, if it is not from the Store and Forward Transfer process in the same processor or from an application program in the same node, decision 1420 advances the task to step 1424. In step 1424, a denial of the connection request is made, the connection is disconnected and the task returns to step 1420.

Assume now that the incoming connection is the above-described request from the Store and Forward Transfer process to transfer the first message to this Store and Forward Delivery process. In this event, decision 1421 advances the Incoming Channel task to step 1422. Step 1422 thereupon creates the SFT Input task and the Incoming Channel task again loops back to step 1420 to wait for a new channel request. Of course, as previously noted, after the first message request is received from the Store and Forward Transfer process, the connection between the processes is permanently assigned and the SFT Input task consequently permanently exists after the first message.

Figure 71:
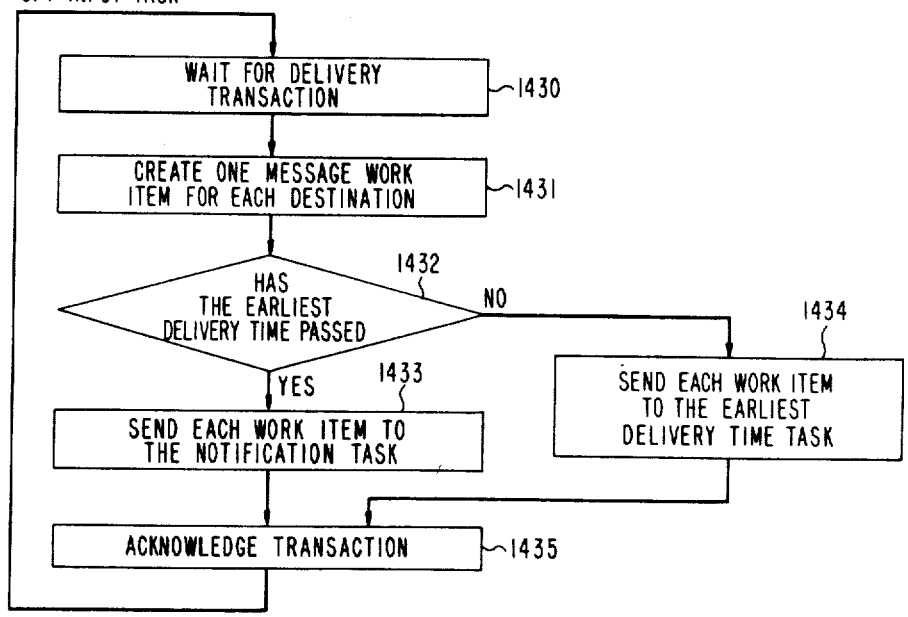

Initially, the SFT Input task (FIG. 71) issues an IPC-Read request to the IC Subsystem and then waits for the arrival of each "delivery" transaction from the Store and Forward Transfer process. The issuance of this IPC-Read request and the allocation of an internal buffer area to receive the "delivery" transaction is depicted as step 1430 of the SFT Input task. Upon the receipt of the transaction (which contains the file name and the destination NSAs) from the Store and Forward Transfer process and the copying of the transaction into the internal buffer space, the task advances to step 1431.

In step 1431, a "work item" is created for each destination NSA of the message. This work item will consist of structured data comprising, in part, certain parameters for the message such as the length of the message and the earliest delivery time to the destination as defined in the message header (which parameters are hereinafter called the "message ticket"), the message file name previously generated by the Store and Forward Transfer process and the destination NSA. The task then advances to decision 1432 which notes the earliest delivery time and determines whether this delivery time has passed. If the delivery time has passed, the task advances to step 1433 and, in this step, the Notification task is signaled and the work item is sent to this task. After signaling this event to the Notification task, the SFT Input task proceeds to step 1435.

Alternatively, in the event that the earliest delivery time has not passed, decision 1432 advances the SFT Input task to step 1434. In step 1434, the Earliest Delivery Time task is signaled and the work item is sent to this task. After this signaling, the SFT Input task advances to step 1435.

In step 1435, an acknowledgement is generated and inserted into an IPC-Write request which is passed back to the channel in the IC Subsystem to the Store and Forward Transfer process. The task then goes back to step 1430 where a new IPC-Read request is generated and buffer space is again allocated for the next transaction from the Store and Forward Transfer process.

Figure 72:
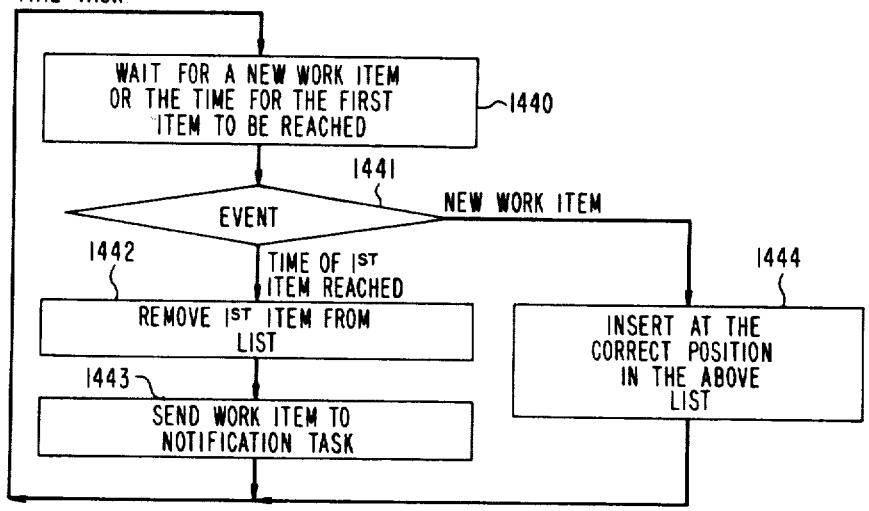

Assume now that the SFT Input task has signaled the Earliest Delivery Time task. The Earliest Delivery Time task (FIG. 72) presumably, at this time, is awaiting, in step 1440, the signal from the SFT Input task, which signal advances the Earliest Delivery Time task to decision 1441. Decision 1441 determines that a new work item has been delivered and advances the task to step 1444. In step 1444, the work item is inserted in a queue which is sorted to place each item in the queue in accordance with earliest delivery time, earlier delivery times being placed ahead of later delivery times. After this insertion, the task advances back to the wait state which constitutes step 1440.

Assume now that the time of delivery for a work item is reached. It is presumed that this item is at the head of the queue and when the delivery time has been reached, the task advances to decision 1441. Decision 1441, upon determining that the delivery time of this item has been reached, then advances this task to step 1442. In step 1442, this first item in the queue is removed and, in step 1443, the Notification task is signaled and the work item is sent to the Notification task. The Earliest Delivery Time task then goes back to the wait state identified as step 1440.

Figure 73:
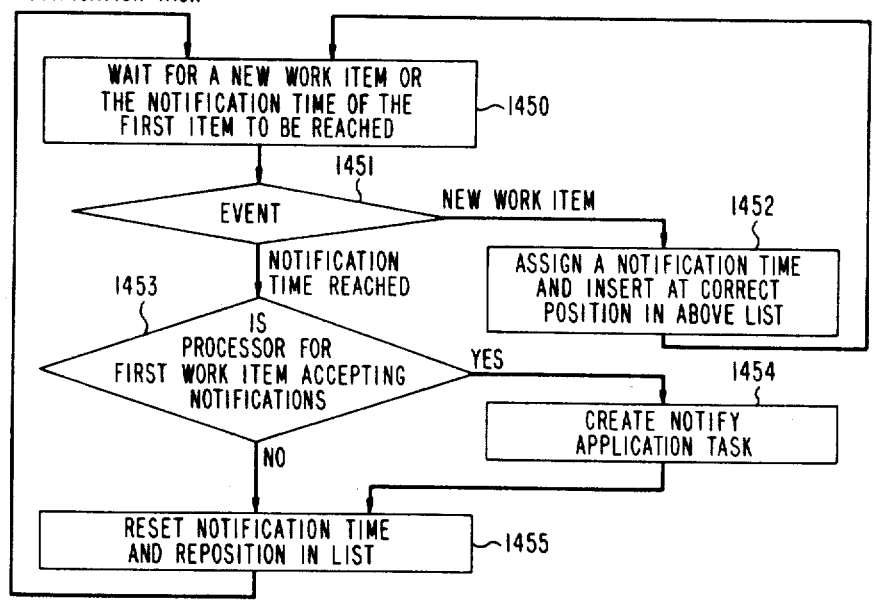

As previously described, the Notification task is signaled either by the SFT Input task or the Earliest Delivery Time task when the work item indicates that the time for delivery has been reached. The Notification task (FIG. 73) is initially in the wait state depicted as step 1450. The signaling of this task advances the task to decision 1451. Decision 1451 determines whether this is a new work item. Since in this portion of the scenario this is in fact a new work item, the task advances to step 1452. In step 1452, a notification time is assigned to the work item, which in the case of new work items, constitutes the present time. The work item is then placed in a queue which is sorted in accordance with the next notification time. The task then loops back to step 1450 awaiting the next event.

Since at least one work item in the queue contains a notification time coresponding to the present time, a signal event occurs and the Notification task in step 1450 advances the task to decision 1451. In decision 1451, a determination is made that a notification time has been reached, and this determination advances the task to decision 1453. In decision 1453, a determination is made as to whether the destination processor for this work item is accepting "notifications", that is, accepting incoming store and forward calls, which determination can, for example, be implemented by creating a list of processors not presently accepting messages. In the event that the processor is not accepting incoming calls at this time, the task advances to step 1455 which advances the notification time in the work item by a fixed interval, repositions the work item in the queue and then advances back to the wait state of step 1450. Assuming, however, that the destination processor is accepting messages, decision 1453 advances the task to step 1454. This creates a Notify Application task described hereinafter. The Notification task then advances to step 1455 to again reset the notification time and reposition the work item in the queue as previously described. The task then returns to step 1450 as previously described.

Figure 74:
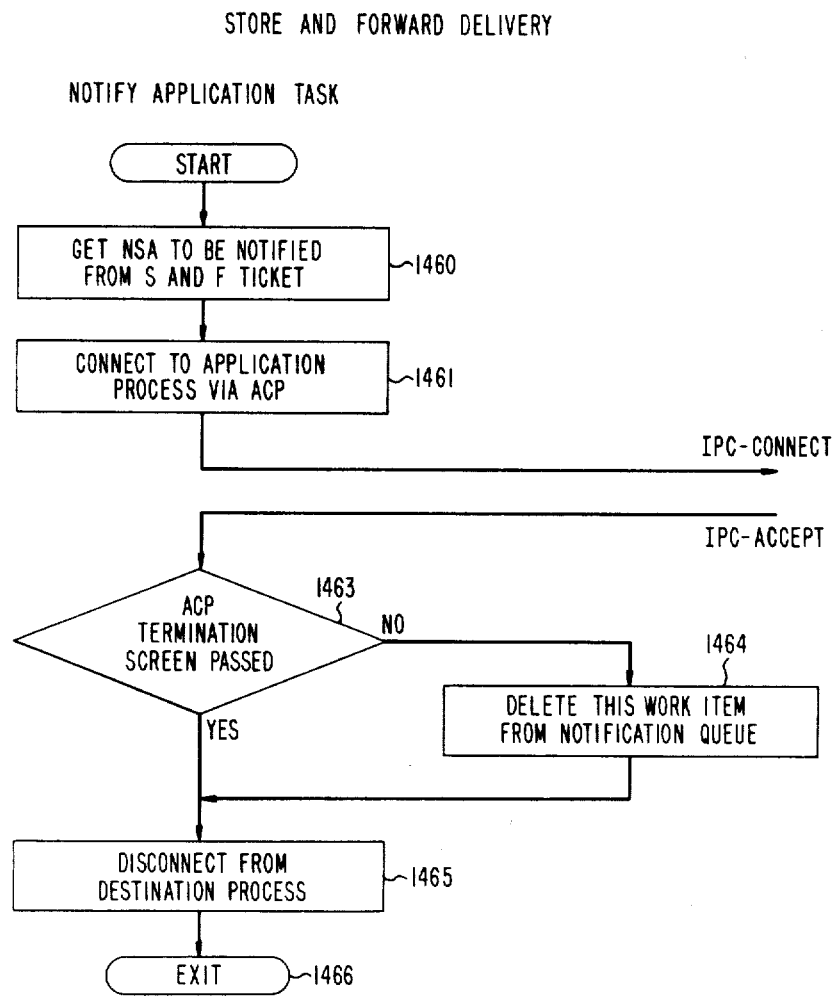

When the Notify Application task (FIG. 74) is created by the Notification task in step 1454, the Notify Application task is advanced to step 1460. In step 1460, the Notify Application task obtains the destination process NSA from the work item created in step 1431. The Notify Application task then generates an IPC-Connect in step 1461, attempting to extend the call to the destination application process. This attempted call, however, goes to the ACP process since, as previously described, all calls to application processes are initially routed to the ACP process. Accordingly, at this time, the ACP process creates the application process (assuming that the process is not running) and the destination application process is thereby initialized and the call is redirected to such process.

With the destination application process created, it returns an IPC-Accept. The Notify Application task advances to decision 1463 and a determination is made as to whether the ACP authorization screening was passed. If the screening was disapproved (and consequently the application program has not been created), decision 1463 advances the task to step 1464. In step 1464, the work item is deleted from the Notification task queue and the Notification Application task then advances to step 1465. Alternatively, if the authorization screening had been approved by the ACP process, decision 1463 advances the task direct to step 1465. In step 1465, the task issues a disconnect to the IC Subsystem, removing the connection from the Notify Application task to the destination application process and the task then retires in step 1466.

At the destination application process, the application program, in response to the connection from the Store and Forward Delivery process, allocates appropriate input buffers, starts up appropriate tasks and invokes appropriate primitives to receive the store and forward message. The first determination made by the (application) user process primitives (as described hereinafter) is whether a connection presently exists (for delivering a prior store and forward message to the user process). Assuming such connection does not exist, a user process primitive creates the connection to the Store and Forward Delivery process by issuing an IPC-Connect and this request is received by the Incoming Channel task which, as previously described, is monitoring for connection requests in step 1420. Decision 1421 thereupon determines that the connection request is from an application program and advances the task to step 1423. Step 1423 creates the Primitive Request task and the Incoming Channel task then loops back to step 1420 to wait for the next connection request.

Figure 75:
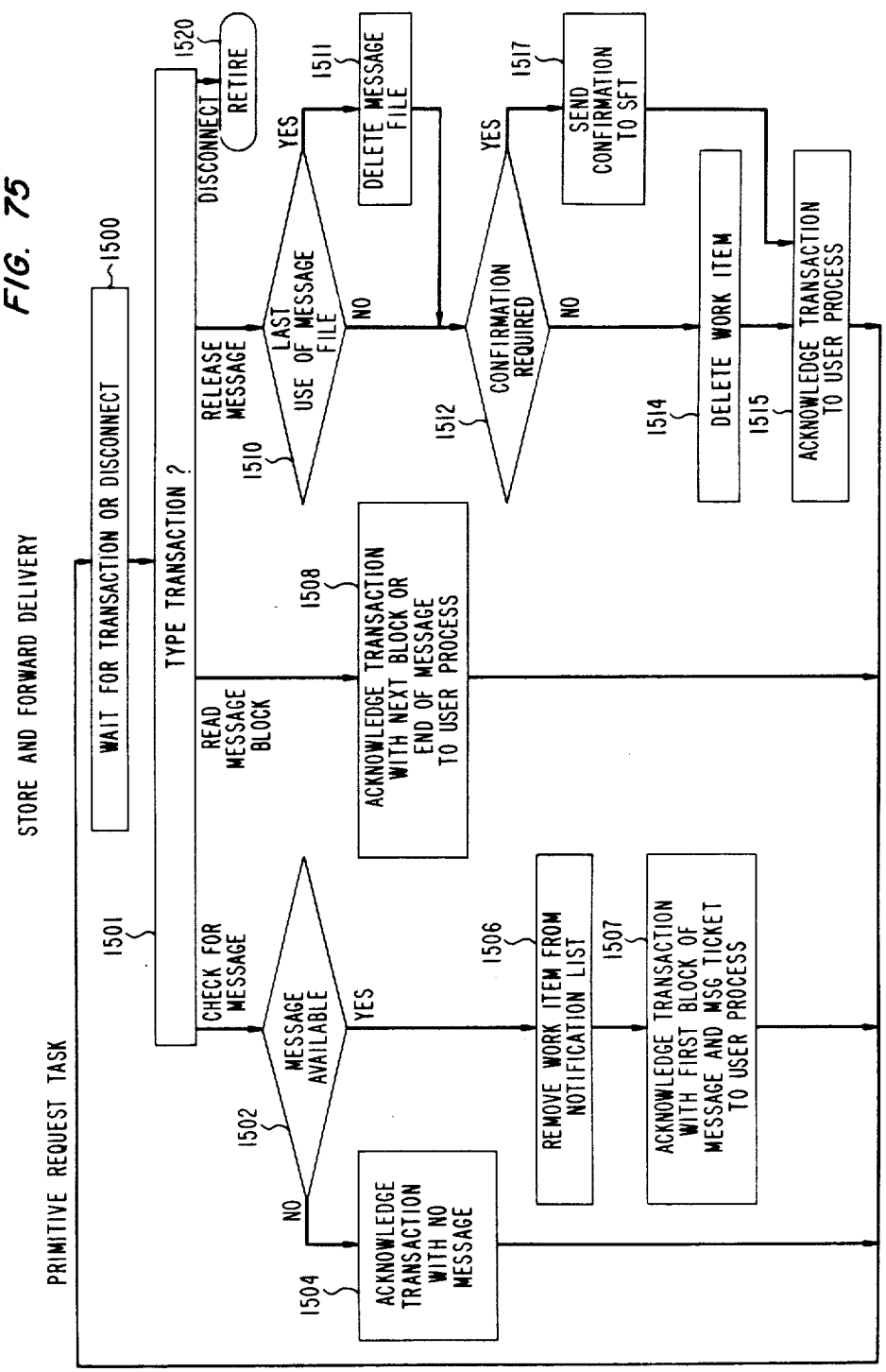

The Primitive Request task (FIG. 75), upon being created, advances to step 1500 to wait for incoming transactions from the destination application process. As described hereinafter, after the completion of the connection from the destination process to the Store and Forward Delivery process, a destination process primitive sends a "check" transaction to the Store and Forward Delivery process containing the NSA of the destination process. When the transaction is received by the Store and Forward Delivery process, the Primitive Request task advances to decision 1501 which determines that a "check" transaction has been received. This advances the task to decision 1502 which now determines if a store and forward message is, in fact, available for this destination process. In the event that no message is available for the destination process, decision 1502 advances the task to step 1504 and, in step 1504, an acknowledgement transaction containing a "no message" statement is returned to the destination process. This will presumably terminate the transactions with the destination process and presumably the destination process will disconnect. In the meantime, the Primitive Request task advances back to step 1500 to wait for the next transaction.

Assuming now, in accordance with our scenario, that a store and forward message is available for the destination process. Decision 1502 thereupon advances the Primitive Request task to step 1506. In step 1506, the work item is removed from the Notification task list and, in step 1507, an acknowledgement transaction is created containing the message ticket and message data. This transaction is then sent back through the connection to the destination process and the Primitive Request task returns to step 1500.

The destination process now having the message ticket determines the length of the store and forward message (as noted below) and, if the first transaction has not sent the full message, the destination process will normally send a "read" transaction to request that another data block be sent. The reception of this transaction from the destination process advances the Primitive Request task to decision 1501 and decision 1501, determining that a "read" transaction has been received from the destination process, advances the task to step 1508. Accordingly, in step 1508, the next data block of the message is read out (of the message file) and sent back through the channel to the destination process. Alternatively, if all the message data has been priorly sent and there is no further message data, step 1508 generates an end-of-message error transaction and sends this transaction back to the destination process. In either event, after the transaction is sent to the connection, the Primitive Request task loops back to step 1500.

When the destination process is satisfied that it has received the entire store and forward message, it returns a "release" transaction to the Store and Forward Delivery process. This advances the Primitive Request task to decision 1501 and the decision, upon determining that a release transaction has been received, advances the task to decision 1510. In decision 1510, a determination is made as to whether the store and forward message has been delivered to all of the appropriate destination processes. If it has been delivered to all destination processes, decision 1510 advances the task to step 1511 where the message file is deleted. The task then advances to decision 1512. Alternatively, if there are other destinations for the store and forward message and, therefore, further processes will be receiving the message, decision 1510 advances the task directly to decision 1512 without the message file deletion. Decision 1512 determines whether the originating terminal user requested a confirmation for the store and forward message. If such a confirmation was requested, decision 1512 advances the task to step 1517. In step 1517, a confirmation transaction is composed and a connection request is originated back to the Store and Forward Transfer process. This confirmation transaction is thus forwarded to the Store and Forward Transfer process by way of a new connection. The creation of this new connection is monitored by the Listen task in the Store and Forward Transfer process. The Listen task, upon reading the confirmation transaction, advances the task to decision 1331 and decision 1331, in turn, advances the task to step 1332. Step 1332 creates a Delivery Input task (not shown) which accepts the confirmation transaction and generates a message for forwarding to the process designated to receive confirmations.

Assume now that confirmation is not required for the store and forward messsage. In this event, decision 1512 of the Primitive Request task advances the task to step 1514 and, in step 1514, the work item is deleted from the SFT Input task list. The task then advances to step 1515. In step 1515, an acknowledgement transaction is composed and this transaction is sent to the destination process whereupon the destination process presumably disconnects from the Store and Forward Delivery process. The Primitive Request task then loops back to step 1500 and, if a disconnect has occurred, retires in step 1520.

At the destination user process, the application program examines the "connect" request from the Notify Application task and determines which process originated the call. Since, in this scenario, it is assumed that the Store and Forward Delivery process is setting up the call, the application process invokes the Store and Forward (S&F) Check primitive (FIG. 76) which, upon being invoked, advances to decision 1471 to determine whether other messages have been delivered to the application process (and therefore there is presently a connection to the Store and Forward Delivery process for delivering these messages) or whether this is a "first" message delivery and requires the creation of a connection. If there is presently a connection, the S&F Check primitive advances to step 1474. Assuming, however that this is a "first" message, the S&F Check primitive advances to step 1472. In step 1472, an IPC-Connect is issued to the Store and Forward Delivery process. When the IPC-Accept is returned from the IC Subsystem, the S&F Check primitive advances to step 1474.

In step 1474, a "check" transaction is generated, which transaction includes the NSA of this (the destination) process. An IPC-Write command is generated and the "check" transaction is sent to the Store and Forward Delivery process. When the message ticket and a part of the message is received from the Primitive Request task of the Store and Forward Delivery process (as described above), the S&F Check primitive advances to step 1476. In step 1476, an internal buffer, having the size of an information unit, is allocated and the message data is saved in the internal buffer and, in step 1477, the message ticket is provided to the destination application user process. In addition, a message ID is generated and also provided to the destination user process to enable the user process to subsequently refer to the store and forward message. Control is thereupon returned to the user process in step 1478.

When the user process receives the message ticket, it invokes the Store and Forward (S&F) Read primitive (FIG. 77). This advances the S&F Read primitive to step 1480 where it obtains the message ID, an address of a buffer internal to the destination user process for storing the message and a statement as to the number of bytes that the user process desires to read (out of the S&F Check primitive buffer). This number of bytes usually is based on two factors, namely, the size of the user's buffer and the size of the message as defined in the message ticket. Thus, the user process generally requests data, in "user" buffer quantities up to the "size" of the message. The Store and Forward Read primitive proceeds in step 1481 to read the designated number of bytes out of the S&F Check primitive buffer, copying the bytes into the internal buffer of the user process. The S&F Read primitive then proceeds to decision 1482 to determine whether the S&F Check primitive internal buffer was exhausted by the copying. If the internal buffer is not exhausted but the maximum number of bytes allocated by the user process have been read, the S&F primitive retires in step 1485 since no further data can be passed to the user process. Alternatively, if the S&F Check primitive buffer is exhausted by the copying, the S&F Read primitive advances to step 1483.

In step 1483, an IPC-Write is generated and a command is sent to the Store and Forward Delivery process (together with the message ID) to obtain more message data. When more message data is received from the Store and Forward Delivery process, the S&F Read primitive loops back to step 1481. Since more messsage data has now been stored in the S&F Check primitive buffer, copying of the data into the buffer of the user process is repeated until the message is complete, whereupon the user process (knowing the message length), terminates requesting further bytes and the primitive retires. The user process then invokes the Release Message primitive.

The Release Message primitive (FIG. 78), upon being invoked, advances to step 1487. In step 1487, the primitive obtains from the user process the message ID and a "user confirmation code" in the event that this message requires confirmation. A "release" transaction is then composed in step 1488 including, if appropriate, the confirmation code and this transaction is sent back to the Store and Forward Delivery process.

When an acknowledgement to the transaction is returned by the Store and Forward Delivery process, the Release Message primitive advances to decision 1490. In decision 1490, a determination is made as to whether there are other unreleased store and forward messages. If there are other unreleased messages, the primitive advances to step 1491 to maintain the channel to Store and Forward Delivery in existence and then the primitive exits in step 1494. Alternatively, if there are no further unreleased messages, the primitive advances to step 1492 which generates an IPC-Disconnect and this disconnect terminates the connection with the Store and Forward Delivery process. The task then proceeds to step 1494 where it exits.

The user process now in possession of the Store and Forward Delivery message including the header, which designates the ultimate destinations, now distributes the message as defined in the header. For example, the user process can extend a call to the Data Base Service (in a manner similar to the method of extending the call to such service, as described above) to place the store and forward message in the customer's file. Alternatively, the user process might extend the call to a Station Call Facility task as identified by an NSA in the message header. Passage of this data to the Station Call Facility Task will thus send the data to a terminal in the same manner as described above for passing data from an application process, such as MAP-ISP 126, to the terminal user. Thus, the store and forward message composed in response to the command from the originating terminal user is eventually delivered in accordance with the originating terminal user's command or in accordance with header information in the "header" file to ultimate destinations, such as the customer's files or other terminals.

Although a specific embodiment of this invention has been shown and described, it will be understood that various modifications may be made without departing from the spirit of this invention.

What is claimed is:

1. In a system for processing data calls from initiating end point users to terminating end point users, the system including at least one processor supporting a plurality of processes adaptable to the initiating and terminating end point users:

a process in the processor for interfacing an external communication link;

an internal communication subsystem for exchanging data between the processes through links internal to the processor in accordance with communication parameters defined by control data passed through the internal links during call initiation, at least one of the internal links extending to the interfacing process; and means invoked by the interfacing process during call initiation for applying the control data on the one internal link to the external communication link when the terminating end point user is accessed by way of the external communication link and for processing the control data when the terminating end point user is the interfacing process.

2. In a processing system, in accordance with claim 1, wherein the initiating end point user applies the control data to the internal link during call initiation and the means invoked by the interfacing process transfers the control data to the external link without the processing thereof when the terminating end point user is accessed by way of the external link.

3. In a processing system, in accordance with claims 1 or 2, wherein the means invoked by the interfacing process comprises program code executed by the interfacing process.

4. In a multiprocessor communication processing system wherein each processor supports a plurality of processes:

a process in each processor for interfacing a communication link extending to a remote processor;

an internal communication subsystem for transferring data between processes in the same processor through internal links in accordance with communication parameters;

means invoked by each process requesting a connection to a terminating process for selecting an internal link and passing data defining communication parameters to the selected link; and means invoked by the interfacing process in response to the selection of an internal link thereto for transferring the parameter data on the internal link to the communication link when the terminating process is in the remote processor and for processing the parameter data on the internal link when the terminating process is the interfacing process.

5. In a multiprocessor communication processing system, in accordance with claim 4, wherein the means invoked by each process comprises program code executed by the process and the means invoked by the interfacing process comprises program code executed by the interfacing process.

6. In a multiprocessor communication processing system, in accordance with claims 4 or 5, wherein the means invoked by each process requests a connection to a terminating process by applying a unique identification of the terminating process to the selected internal link and the means invoked by the interfacing process further includes means responsive to the unique identification applied to the internal link thereto for determining whether the terminating process is in the remote processor and whether the terminating process is the interfacing process.

* * * * *